US012485079B2

(12) United States Patent
Widgerow et al.

(10) Patent No.: US 12,485,079 B2
(45) Date of Patent: Dec. 2, 2025

(54) COMPOSITIONS AND METHODS RELATING TO PIGMENTATION

(71) Applicant: Alastin Skincare, Inc., Carlsbad, CA (US)

(72) Inventors: Alan David Widgerow, Carlsbad, CA (US); John A. Garruto, Carlsbad, CA (US)

(73) Assignee: Alastin Skincare, Inc., Carlsbad, CA (US)

( * ) Notice: Subject to any disclaimer, the term of this patent is extended or adjusted under 35 U.S.C. 154(b) by 355 days.

(21) Appl. No.: 17/954,214

(22) Filed: Sep. 27, 2022

(65) Prior Publication Data

US 2023/0190617 A1    Jun. 22, 2023

Related U.S. Application Data

(63) Continuation of application No. PCT/US2021/024400, filed on Mar. 26, 2021.

(60) Provisional application No. 63/001,095, filed on Mar. 27, 2020.

(51) Int. Cl.
| | |
|---|---|
| A61K 8/9789 | (2017.01) |
| A61K 8/14 | (2006.01) |
| A61K 8/44 | (2006.01) |
| A61K 8/49 | (2006.01) |
| A61K 8/55 | (2006.01) |
| A61K 8/64 | (2006.01) |
| A61Q 19/02 | (2006.01) |

(52) U.S. Cl.
CPC .................. *A61K 8/64* (2013.01); *A61K 8/14* (2013.01); *A61K 8/44* (2013.01); *A61K 8/4973* (2013.01); *A61K 8/498* (2013.01); *A61K 8/553* (2013.01); *A61K 8/9789* (2017.08); *A61Q 19/02* (2013.01)

(58) Field of Classification Search
CPC .......... A61K 8/64; A61K 8/9789; A61K 8/14; A61K 8/44; A61K 8/4973; A61K 8/498; A61K 8/553; A61Q 19/02
See application file for complete search history.

(56) References Cited

U.S. PATENT DOCUMENTS

| | | | |
|---|---|---|---|
| 5,214,028 A | 5/1993 | Tomita et al. | |
| 5,352,458 A | 10/1994 | Yarosh | |
| 8,034,385 B2 | 10/2011 | Golz-Berner et al. | |
| 9,403,884 B2 * | 8/2016 | Brock | A61P 19/02 |
| 2011/0305737 A1 | 12/2011 | Alexiades-Armenakas | |
| 2012/0128755 A1 | 5/2012 | Gruber et al. | |
| 2013/0078294 A1 | 3/2013 | Alexiades-Armenakas | |
| 2019/0038539 A1 * | 2/2019 | Garruto | A61K 8/64 |

FOREIGN PATENT DOCUMENTS

| | | | |
|---|---|---|---|
| CN | 107714590 A | 2/2018 | |
| CN | 110384650 A | 10/2019 | |
| DE | 10-2005-026357 A1 | 12/2006 | |
| EP | 1634576 A1 * | 3/2006 | ............. A61K 8/645 |
| FR | 2641696 A2 | 7/1990 | |
| JP | H11-302150 A | 11/1999 | |
| KR | 101822152 B1 | 1/2018 | |
| WO | WO1999025319 A1 * | 5/1999 | ............. A61K 9/127 |
| WO | WO-2012149110 A1 * | 11/2012 | ............. A61K 36/31 |
| WO | WO-2019/028275 A1 | 2/2019 | |
| WO | WO-2020/227526 A1 | 11/2020 | |

OTHER PUBLICATIONS

Decome, L., De Meo, M., Geffard, A., Doucet, O., Dumenil, G., Botta, A., "Evaluation of photolyase (Photosome) repair activity in human keratinocytes after a single dose of ultraviolet B irradiation . . ." 2005, Journ Photochem Photobiol B, 79, 2, 101-108. https://doi.org/10.1016/j.jphotobiol.2004.11.022 (Year: 2005).*
Ashtiani, H.R.A., Bishe, P., Lashgari, N., Nilforoushzadeh, M.A., Zare, S. "Liposomes in cosmetics" 2016, Journal of Skin and Stem Cells, 3, 3, e65815. https://doi.org/10.5812/jssc.65815. (Year: 2016).*
Widgerow, A.D., Wang, J.V., Ziegler, M.I., Fabi, S.G., Garruto, J.A., Robinson, D.M., Bell, M. "Advances in pigmentation management: a multipronged approach" 2022, Journal of Drugs in Dermatology, 21, 11, 1206-1220. https://doi.org/10.36849/jdd.7013 (Year: 2022).*
English Translation. EP 1634576 A1 "DNA repair enzymes and oligopeptides containing cosmetic and dermatological compositions" 2006 (Year: 2006).*
Rittie, L. and Fisher, G.J. "Natural and sun-induced aging of human skin" Cold Spring Harb Perspect Med. 5, 1, a015370, 2015. DOI: 10.1101/cshperspect.a015370 (Year: 2015).*
Beroza, M. "Determination of sesamin, sesamolin, and sesamol" Analytical chemistry. Vol. 26, issue 7. 1954. DOI: 10.1021/ac60091a021 (Year: 1954).*
International Search Report and Written Opinion on PCT Appl. Ser. No. PCT/2021/024400 dated Oct. 5, 2021 (15 pages).
Database GNPD "Advanced Cream", Mintel, Nov. 2019, retrieved from the internet: http://www.gnpd.com.
Fan et al., "Holistic Integrative Medicine Theory & Practice", Dengbeijin Wangdu Company, Apr. 2018, 8 pages.
Liu et al., "Basics of Practical Cosmetic Medicine", Hatsusemi Publishing, Aug. 2012, 8 pages.
Liu et al., "Study on the Metabolism and Analysis of Chinese Medicinal Ingredients in Vivo", China Traditional Chinese Medicine Publishing House, Beijing, Aug. 2011, 6 pages.
Zhang et al., "One Belt One Road Economics Plants", Nanjing Southeast University Press, Nov. 2017, 10 pages.
Zhao, Li, "Beauty Cosmetology", Northeastern University Press, Shenyang, May 2005, 7 pages.

* cited by examiner

*Primary Examiner* — Frederick F Krass
*Assistant Examiner* — Toriana N. Vigil
(74) *Attorney, Agent, or Firm* — Sunit Talapatra; Foley & Lardner LLP

(57) ABSTRACT

Disclosed herein are compositions and methods for improving pigmentation. Compositions as described herein comprise one or more peptides.

15 Claims, 22 Drawing Sheets

Specification includes a Sequence Listing.

COMPOSITIONS AND METHODS RELATING TO PIGMENTATION

CROSS-REFERENCE

This application is a continuation of PCT/US2021/024400, filed Mar. 26, 2021, which claims priority to U.S. Provisional Patent Application No. 63/001,095 filed on Mar. 27, 2020, the entire contents of which are incorporated herein by reference in their entireties.

REFERENCE TO SEQUENCE LISTING

The present application is filed along with a Sequence Listing in electronic format. The Sequence Listing is provided as a file entitled 105153-50502.xml, created on Dec. 17, 2022, which is 35,636 bytes in size. The information in the electronic format of the Sequence Listing is incorporated herein by reference in its entirety.

BACKGROUND

The color of skin, hair, and eyes is due to melanin which is produced within melanosomes. The amount of melanin produced in a given individual varies based on multiple genetic and environmental factors including exposure to UV light. Overproduction of melanin in the skin results in hyperpigmentation, which can result in melasma, freckles, and geriatric pigment spots. Therefore, understanding the regulation of and the mechanisms underlying melanin production are important in identifying targets for the prevention and treatment of pigmentation disorders.

BRIEF SUMMARY

Described herein are compositions and methods for modulating pigmentation. In some instances, the compositions and methods as described herein reduce melanocyte activation, inhibit melanin synthesis, reduce melanin transfer, cause exfoliation of keratinocytes containing melanosomes or autophagy of melanosomes, or combinations thereof.

An aspect described herein is a topical composition for improving pigmentation comprising: one or more photosomes; one or more liposomes; hexapeptide-11; and hexapeptide-12; wherein the topical composition improves pigmentation. In one feature, the one or more photosomes is present in a range of about 0.1 wt. % to about 2 wt. %. In one feature, the one or more photosomes is present in a range of about 0.25 wt. % to about 1 wt. %. In one feature, the one or more photosomes encapsulates the one or more liposomes. In one feature, the hexapeptide-11 is present at 50-150 ppm. In one feature, the hexapeptide-11 is present in a range of about 0.004 by weight (wt. %) to about 0.100 wt. %. In one feature, the hexapeptide-11 is encapsulated in a first liposome of the one or more liposomes. In one feature, the hexapeptide-12 is encapsulated in a second liposome of the one or more liposomes. In one feature, the hexapeptide-11 and hexapeptide-12 are encapsulated in a first liposome of the one or more liposomes. In one feature, the hexapeptide-12 comprises palmitoyl hexapeptide-12, myristoyl hexapeptide-12, or a combination thereof. In one feature, the hexapeptide-12 is present at 1-10 ppm. In one feature, the hexapeptide-12 is present in a range of about 0.001 by weight (wt. %) to about 0.025 wt. %. In one feature, the topical further comprises lactoferrin. In one feature, the lactoferrin is present at no more than about 0.25 wt. %. In one feature, the lactoferrin is present in a range of about 0.005 wt. % to about 0.25 wt. %. In one feature, the lactoferrin is encapsulated in a third liposome of the one or more liposomes. In one feature, the topical further comprises lactoferrin, and wherein the lactoferrin, hexapeptide-11, and hexapeptide-12 are encapsulated in a first liposome of the one or more liposomes. In one feature, the topical further comprises a peptide derived from lactoferrin. In one feature, the peptide derived from lactoferrin comprises at least 2, 3, 4, 5, 6, 7, 8, 9, 10, 12, 14, 16, 18, 20, 22, 24, 26, 28, 30, or more than 30 amino acids of SEQ ID NO: 1. In one feature, the topical further comprises phosphatidylserine. In one feature, the phosphatidylserine is present at no more than about 0.075 wt. %. In one feature, the phosphatidylserine is present in a range of about 0.005 wt. % to about 0.1 wt. %. In one feature, the phosphatidylserine is present at no more than 5.0 wt %. In one feature, the topical further comprises silymarin. In one feature, the silymarin is present in a range of about 0.1 wt. % to about 1.0 wt. %. In one feature, the silymarin is present in a range of about 0.2 wt. % to about 3.0 wt. %. In one feature, the topical further comprises sesamol. In one feature, the sesamol is present in a range of about 0.002 wt. % to about 0.050 wt. %. In one feature, the topical further comprises tranexamic acid. In one feature, the tranexamic acid is present in a range of about 1 wt. % to about 10 wt %. In one feature, the tranexamic acid is present in a range of about 0.25 wt. % to about 6.25 wt %. In one feature, the topical further comprises phytoene, phytofluene, or combination thereof. In one feature, the phytoene, phytofluene, or combination thereof is present in a range of about 1 wt. % to about 10 wt %. In one feature, the topical further comprises *Withania somnifera* extract. In one feature, the *Withania somnifera* extract is present in a range of about 0.020 wt. % to about 0.500 wt. %. In one feature, the topical further comprises gallic acid. In one feature, the gallic acid is present in a range of about 0.40 wt. % to about 10 wt. %. In one feature, the topical further comprises hesperidin. In one feature, the hesperidin is present in a range of about 0.020 wt. % to about 0.50 wt. %. In one feature, the topical further comprises *Pancratium maritimum* In one feature, the *Pancratium maritimum* is present in a range of about 0.50 wt. % to about 5.0 wt. %. In one feature, the topical further comprises niacinamide. In one feature, the niacinamide is present in a range of about 1 wt % to about 10 wt %. In one feature, the topical further comprises oleuropein. In one feature, the oleuropein is present in a range of about 0.030 wt % to about 0.750 wt %. In one feature, the topical further comprises *Thermus thermophilus* ferment. In one feature, the *Thermus thermophilus* ferment is present in a range of about 0.30 wt. % to about 7.5 wt. %. In one feature, the topical further comprises *Tremella fuciformis*. In one feature, the *Tremella fuciformis* is present in a range of about 0.20 wt. % to about 5.0 wt. %. In one feature, the topical further comprises heptasodium hexacarboxymethyl dipeptide-12. In one feature, the heptasodium hexacarboxymethyl dipeptide-12 is present in a range of about 0.1 wt. % to about 10 wt %. In one feature, the heptasodium hexacarboxymethyl dipeptide-12 is present in a range of about 0.2 wt. % to about 5 wt %. In one feature, the topical composition is aqueous.

An aspect described herein is a topical composition for improving pigmentation comprising: hexapeptide-11; hexapeptide-12; and a peptide derived from lactoferrin; wherein the topical composition improves pigmentation. In one feature, the hexapeptide-12 comprises palmitoyl hexapeptide-12, myristoyl hexapeptide-12, or a combination thereof. In one feature, the hexapeptide-12 is present at 1-10 ppm. In one feature, the hexapeptide-12 is present in a range of about 0.001 by weight (wt. %) to about 0.025 wt. %. In one feature, the hexapeptide-11 is present at 50-150 ppm. In one feature, the hexapeptide-11 is present in a range of about 0.004 by weight (wt. %) to about 0.100 wt. %. In one feature, the peptide derived from lactoferrin comprises at least 2, 3, 4, 5, 6, 7, 8, 9, 10, 12, 14, 16, 18, 20, 22, 24, 26, 28, 30, or more than 30 amino acids of SEQ ID NO: 1. In one feature, the topical composition further comprises phosphatidylserine. In one feature, the phosphatidylserine is present at no more than about 0.075% by wt. %. In one feature, the phosphatidylserine is present in a range of about 0.005 wt. % to about 0.1 wt. %. In one feature, the phosphatidylserine is present at no more than 5.0 wt %. In one feature, the topical composition further comprises lactoferrin. In one feature, the lactoferrin is present at no more than about 0.25 wt. %. In one feature, the lactoferrin is present in a range of about 0.005 wt. % to about 0.25 wt. %. In one feature, the topical composition further comprises a photosome. In one feature, the photosome is present in a range of about 0.1 wt. % to about 2 wt. %. In one feature, the topical composition further comprises silymarin, sesamol, tranexamic acid, phytoene, phytofluene, *Withania somnifera* extract, hesperidin, *Pancratium maritimum*, niacinamide, oleuropein, *Thermus thermophilus* ferment, *Tremella fuciformis*, heptasodium hexacarboxymethyl dipeptide-12, or combinations thereof. In one feature, the topical composition is aqueous.

An aspect described herein is a method of improving pigmentation as a result of a pigmentation disorder or disease comprising administering the topical composition described herein. In one feature, the topical composition further comprises the pigmentation disorder or disease is hyperpigmentation. In one feature, the topical composition further comprises the pigmentation disorder or disease is post-inflammatory hyperpigmentation (PIH). In one feature, the topical composition further comprises the pigmentation disorder or disease is focal hypopigmentation or diffuse hypopigmentation. In one feature, the topical composition further comprises the pigmentation disorder or disease is Acanthosis Nigricans, age spots, albinism, Incontinentia Pigmenti, Lentigines, melasma, Pityriasis Albam, or Progressive Pigmentary Purpura.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION

Definitions

Figure 1:
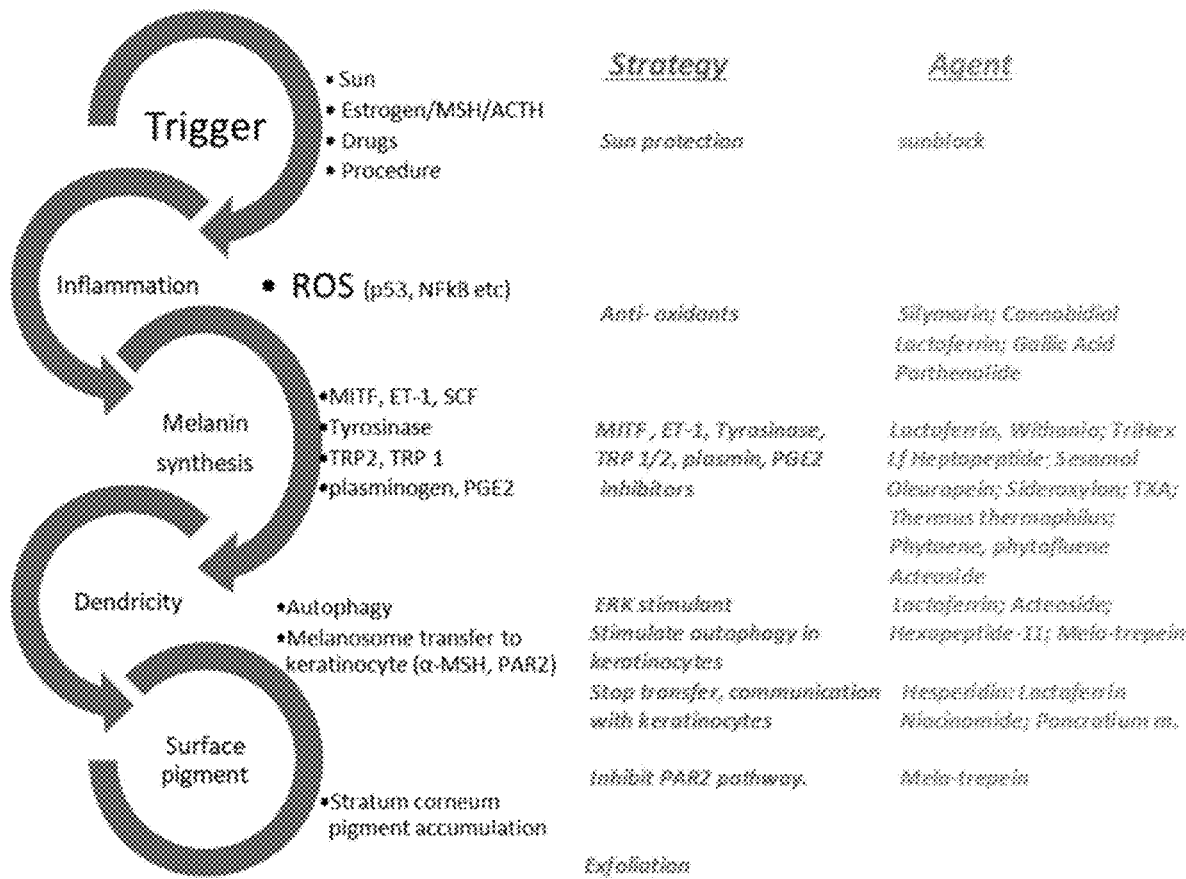
FIG. 1 illustrates factors that affect pigmentation and strategies and agents that can be used to treat pigmentation diseases or disorders.
Figure 2:
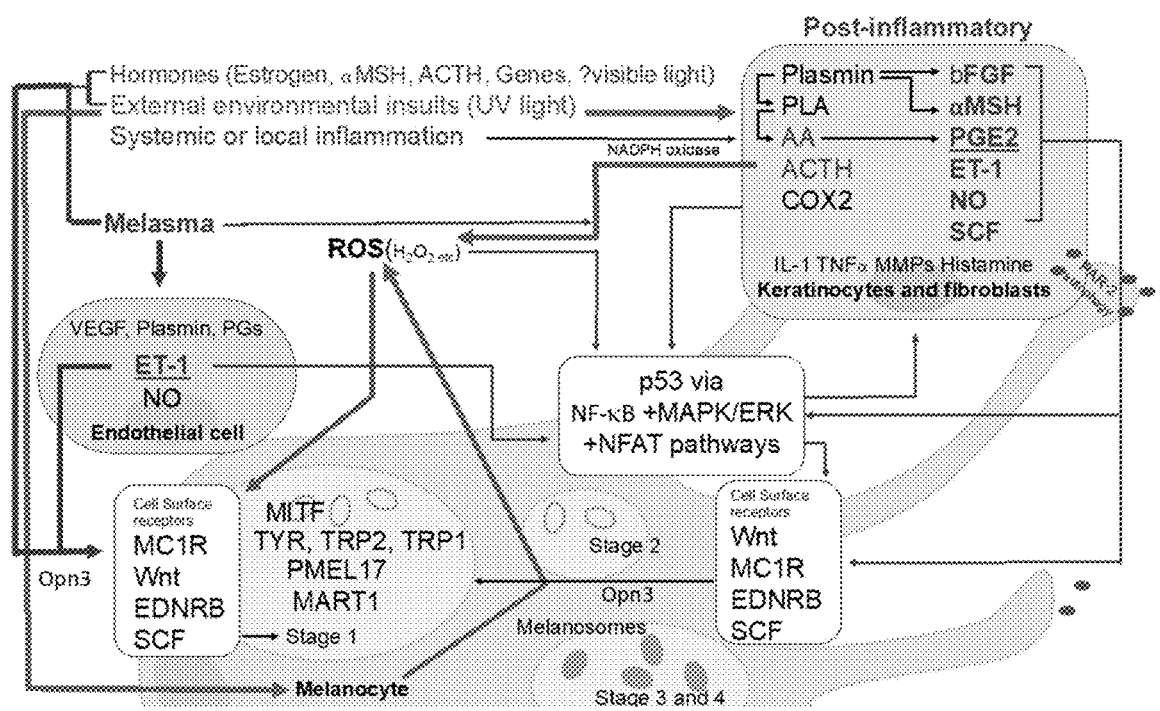
FIG. 2 illustrates the effect of extrinsic influences on different pigmentation pathways. Abbreviations listed are as follows: for surface receptors on melanocyte: EDNRB=Endothelin receptor B, MC1R=melanocortin-1 receptor-agonist is αMSH, Wnt pathway, SCF=Stem Cell Factor; for cytokines and mediators in Keratinocytes and fibroblasts: PLA=phospholipase A, AA=Arachidonic acid, PGE2=Prostaglandin E2, bFGF=Basic fibroblast Growth Factor, ET-1=Endothelin-1, αMSH=Alpha Melanocyte Stimulating Hormone, NO=Nitric oxide, Plasmin, COX2, IL-1, Histamine, MMPs; for Enzymes and transcription factors in the melanocyte: MITF=microphthalmia associated transcription factor, TYR=tyrosinase, TRP-2=tyrosinase-related protein 2, TRP-1=tyrosinase-related protein 1.
Figure 3A:
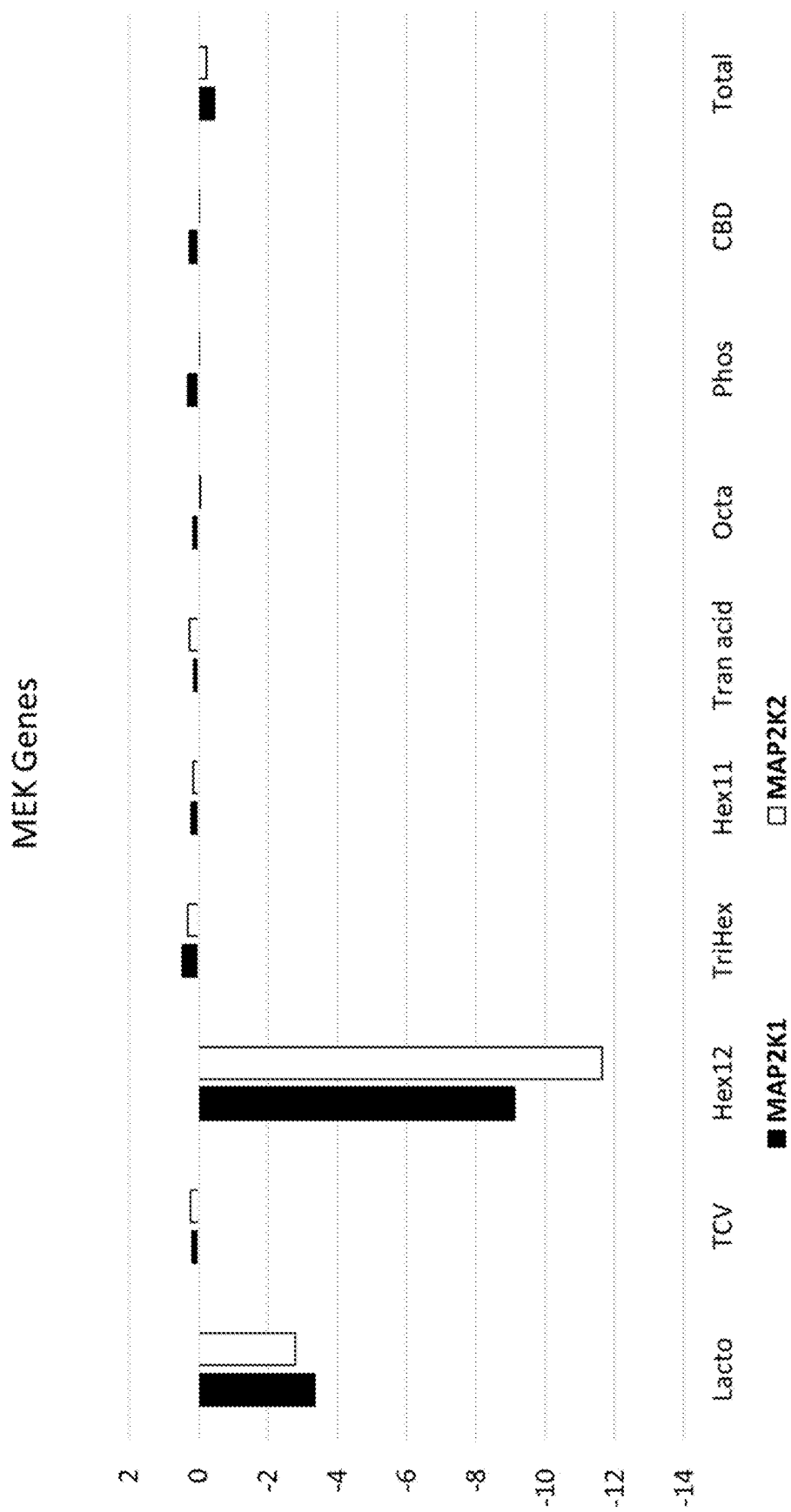
FIGS. 3A-3D illustrate the expression levels of MEK (FIG. 3A), ERK (FIG. 3B), POMC (FIG. 3C), and CTNNB1 (FIG. 3D) in melanocytes after treatment with lactoferrin (Lacto), peptide derived from lactoferrin (TCV), hexapeptide-12 (Hex12), tripeptide-1 and hexapeptide-12 (TriHex), hexapeptide-11 (Hex11), tranexamic acid (Tran acid), octapeptide (Octa), phosphatidylserine (phos), Cannabidiol (CBD), and all (total).
Figure 3B:
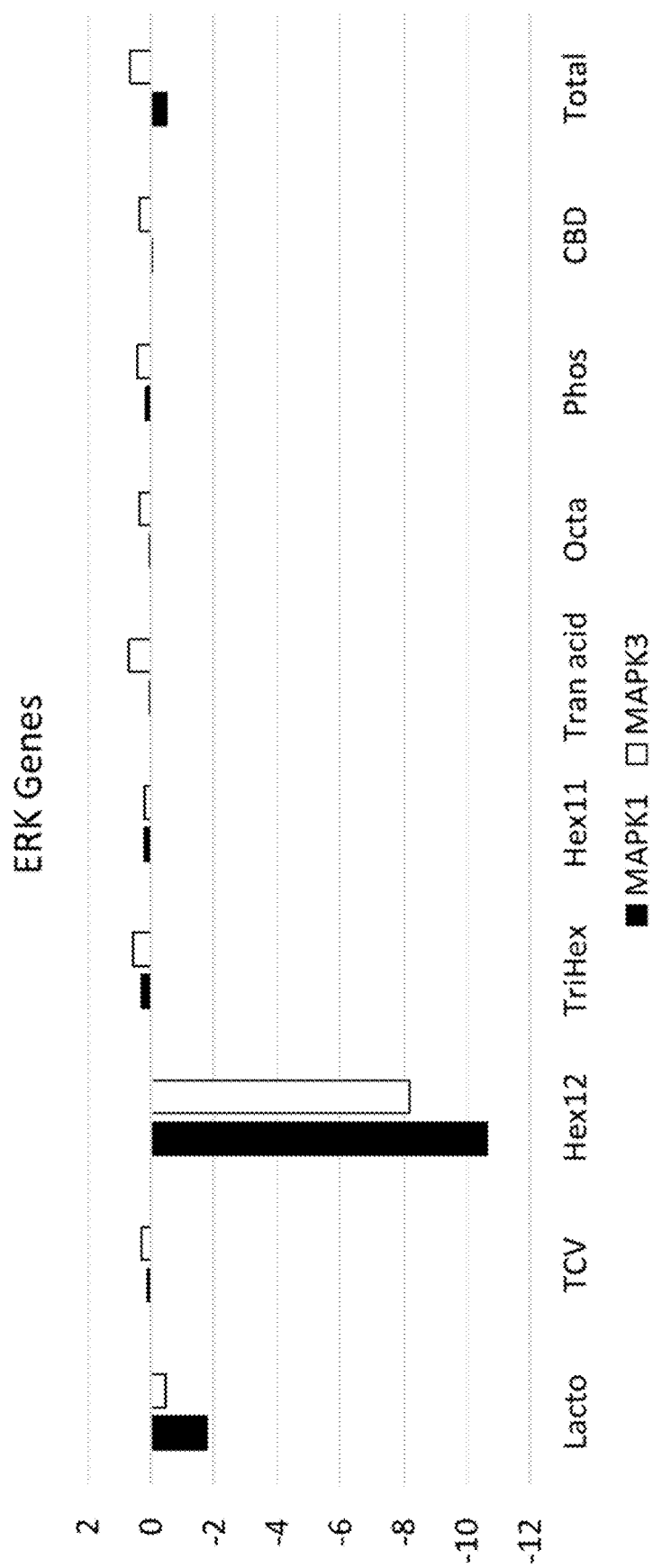
Figure 3C:
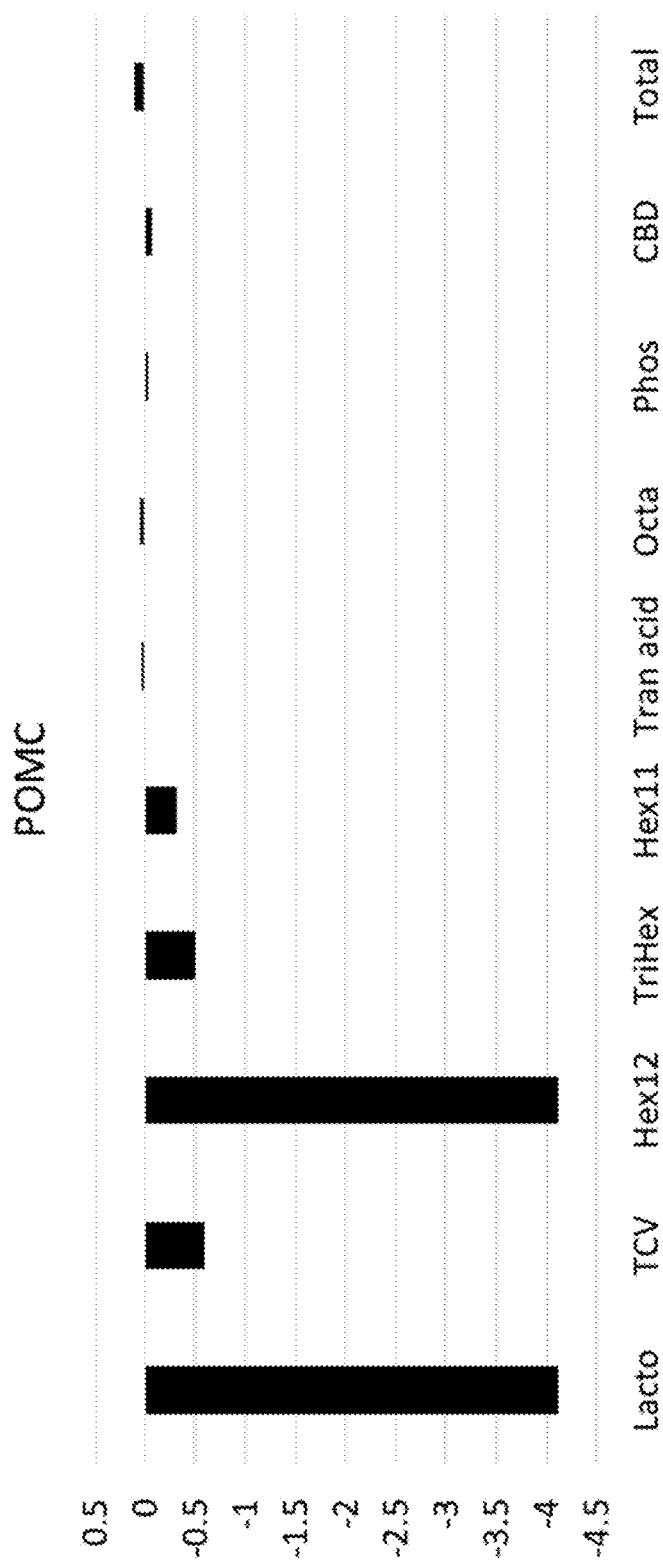
Figure 3D:
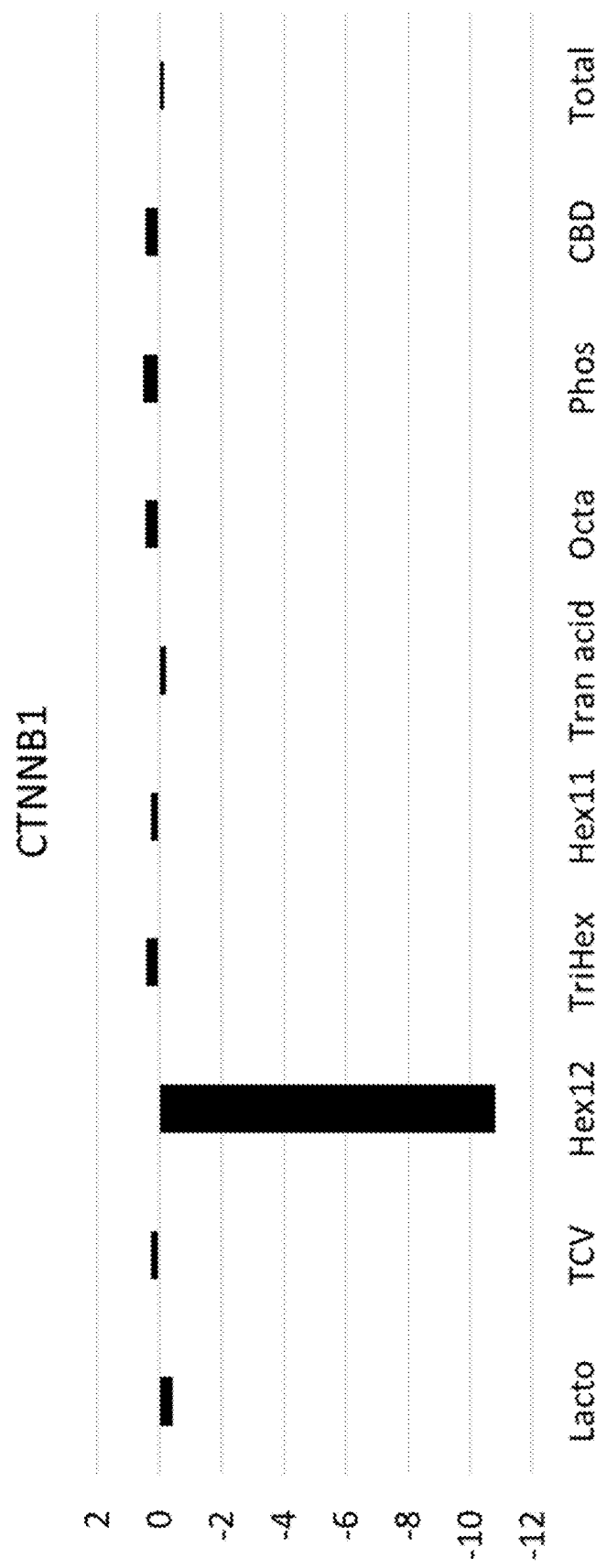

Throughout this disclosure, various embodiments are presented in a range format. It should be understood that the description in range format is merely for convenience and brevity and should not be construed as an inflexible limitation on the scope of any embodiments. Accordingly, the description of a range should be considered to have specifically disclosed all the possible subranges as well as individual numerical values within that range to the tenth of the unit of the lower limit unless the context clearly dictates otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual values within that range, for example, 1.1, 2, 2.3, 5, and 5.9. This applies regardless of the breadth of the range. The upper and lower limits of these intervening ranges may independently be included in the smaller ranges, and are also encompassed within the disclosure, subject to any specifically excluded limit in the stated range. Where the stated range includes one or both of the limits, ranges excluding either or both of those included limits are also included in the disclosure, unless the context clearly dictates otherwise.

The terminology used herein is for the purpose of describing particular embodiments only and is not intended to be limiting of any embodiment. As used herein, the singular forms "a," "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" in reference to a number or range of numbers is understood to mean the stated number and numbers +/−10% thereof, or 10% below the lower listed limit and 10% above the higher listed limit for the values listed for a range.

Compositions
Peptides

Compositions as described herein comprise one or more peptides. The one or more peptides as described herein, in some embodiments, improve pigmentation including hyperpigmentation. In some embodiments, the one or more peptides modulate post-inflammatory hyperpigmentation, melasma, or aging. In some embodiments, the hyperpigmentation due to aging is caused by UV exposure or inflammation.

In some embodiments, the one or more peptides comprises hexapeptide-11. In some embodiments, the hexapeptide-11 promotes activation of proteasome, autophagy, chaperones and antioxidant responses related genes. In some embodiments, the one or more peptides comprises hexapeptide-11, tripeptide-1, and hexapeptide-12.

In some embodiments, the hexapeptide-11, tripeptide-1, and hexapeptide-12 result in synergy on gene expression. In some instances, the hexapeptide-11, tripeptide-1, and hexapeptide-12 modulate MITF gene expression. In some instances, the hexapeptide-11, tripeptide-1, and hexapeptide-12 increase MITF downregulation by at least or about 0.5, 1, 2, 3, 4, 5, or more than 5-fold as compared to hexapeptide-11, tripeptide-1, and hexapeptide-12 individually.

Peptides as described herein, in some embodiments, in combination improve pigmentation, autophagy of melanosomes, reduction of MITF, or combinations thereof. For example, tripeptide-1 and hexapeptide-12 improve macrophage function. In some embodiments, tripeptide-1 and hexapeptide-11 improve macrophage function. In some embodiments, tripeptide-1, hexapeptide-11, and hexapeptide-12 improve macrophage function. For example, hexapeptide-11 in combination with one or more different peptides such as tripeptide-1, hexapeptide-12, or a combination thereof stimulate autophagy and macrophage clustering and can improve removal of melanosomes.

Compositions as described herein comprise a varying concentration of peptide. In some instances, a peptide is present at about 50 ppm or less to 1000, 5000, 10000, 50000, 100000, 500000 ppm or more, e.g., 100 ppm of the peptide. In some instances, a peptide is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, a peptide is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, a peptide is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, a peptide is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 microgram per milliliter. In some instances, a peptide is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %).

Compositions as described herein, in some embodiments, comprise one or more peptides. In some instances, a peptide of the one or more peptides is present at about 50 ppm or less to 1000, 5000, 10000, 50000, 100000, 500000 ppm or more, e.g., 100 ppm of the peptide, or any other suitable amount. In some instances, a peptide of the one or more peptides is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, a peptide of the one or more peptides is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, a peptide of the one or more peptides is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, a peptide of the one or more peptides is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 microgram per milliliter. In some instances, a peptide of the one or more peptides is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %). In some embodiments, a peptide of the one or more peptides is provided at least or about 0.00001%, 0.0003%, 0.0005%, 0.001%, 0.001%, 0.005%, 0.0055%, 0.01%, 0.02%, 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, a peptide of the one or more peptides is provided in a range of about 0.25% to about 10%, about 0.5% to about 8%, about 0.75% to about 6%, or about 1% to about 4% by weight. In some embodiments, each peptide of the one or more peptides is provided in a range of about 0.001% to about 6%, about 0.002% to about 4%, about 0.01% to about 3%, or about 0.02% to about 2% by weight. In some embodiments, the peptide is tripeptide-1, hexapeptide-12, hexapeptide-11, octapeptide, or combinations thereof.

In compositions, the tripeptide is typically present in an amount of from about 50 ppm or less to about 100, 200, 300, 400, or 500 ppm or more, e.g., 50 ppm to 150 ppm. In compositions, the hexapeptide is typically present in an amount of from about 50 ppm or less to about 100, 200, 300, 400, or 500 ppm or more, e.g., 50 ppm to 150 ppm.

In some embodiments, the tripeptide-1 is provided at least or about 0.00001%, 0.0003%, 0.0005%, 0.001%, 0.001%, 0.005%, 0.0055%, 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, the tripeptide-1 is provided in a range of about 0.25% to about 10%, about 0.5% to about 8%, about 0.75% to about 6%, or about 1% to about 4% by weight. In some embodiments, the tripeptide-1 is provided at least or about 0.25, 0.5, 0.75, 1, 1.5, 2, 2.5, 3, 3.5, 4, 5, 6, 7, 8, 9, 10, 15, 20, 25, or more than 25 ppm. In some embodiments, the tripeptide-1 is provided in a range of about 0.25 to about 10, about 0.5 to about 8, about 1 to about 6, or about 2 to about 4 ppm. In some embodiments, the tripeptide-1 is provided in a range of about 1 to about 10 ppm. In some embodiments, the tripeptide-1 is provided at least or about 0.25, 0.5, 0.75, 1, 1.5, 2, 2.5, 3, 3.5, 4, 5, 6, 7, 8, 9, 10, 15, 20, 25, or more than 25 microgram per milliliter (ug/mL). In some embodiments, the tripeptide-1 is provided in a range of about 0.25 to about 10, about 0.5 to about 8, about 1 to about 6, or about 2 to about 4 microgram per milliliter.

In some embodiments, the hexapeptide-12 is provided at least or about 0.00001%, 0.0003%, 0.0005%, 0.001%, 0.005%, 0.0055%, 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, the hexapeptide-12 is provided in a range of about 0.00001% to about 10%, about 0.0003%, to about 9%, about 0.0005% to about 8%, or about 0.001% to about 4% by weight (wt. %). In some embodiments, the hexapeptide-12 is provided at least or about 0.25, 0.5, 0.75, 1, 1.5, 2, 2.5, 3, 3.5, 4, 5, 6, 7, 8, 9, 10, 15, 20, 25, or more than 25 ppm. In some embodiments, the hexapeptide-12 is provided in a range of about 1 to about 10 ppm. In some embodiments, the hexapeptide-12 is provided in a range of about 0.25 to about 10, about 0.5 to about 8, about 1 to about 6, or about 2 to about 4 ppm. In some embodiments, the hexapeptide-12 is provided at least or about 0.25, 0.5, 0.75, 1, 1.5, 2, 2.5, 3, 3.5, 4, 5, 6, 7, 8, 9, 10, 15, 20, 25, or more than 25 microgram per milliliter (ug/mL). In some embodiments, the hexapeptide-12 is provided in a range of about 0.25 to about 10, about 0.5 to about 8, about 1 to about 6, or about 2 to about 4 microgram per milliliter.

In some embodiments, the hexapeptide-12 is provided at least or about 30, 40, 50, 60, 70, 80, 90, 100, 200, 300, 400, 500, 600, 700, 800, 900, 1000, 2000, or more than 2000 microgram (ug). In some embodiments, the hexapeptide-12 is provided in a range of about 30 to about 2000 μg. In some embodiments, the hexapeptide-12 is provided in a range of about 40 to about 1000, about 50 to about 900, about 60 to about 800, about 70 to about 700, about 80 to about 600, or about 90 to about 500 μg. In some embodiments, the hexapeptide-12 is provided at least or about 0150 μg. In some embodiments, the hexapeptide-12 is provided at least or about 450 ug.

In some embodiments, the hexapeptide-11 is provided at least or about 0.00001%, 0.0003%, 0.0005%, 0.001%, 0.005%, 0.0055%, 0.01%, 0.02%, 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, the hexapeptide-11 is provided in a range of about 0.00001% to about 10%, about 0.0003%, to about 8%, about 0.0005%, to about 6%, or about 0.001% to about 4%, about 0.005% to about 2%, or about 0.01% to about 1% by weight (wt. %). In some embodiments, the hexapeptide-11 is provided in a range of about 0.001% to about 6%, about 0.002% to about 4%, about 0.01% to about 3%, or about 0.02% to about 2%. In some embodiments, the hexapeptide-11 is provided in a range of about 0.005% to about 0.02% by weight. In some embodiments, the hexapeptide-11 is provided at least or about 0.1 ppm, 3 ppm, 5 ppm, 10 ppm, 50 ppm, 55 ppm, 500 ppm, 1,000 ppm, 2,500 ppm, 5,000 ppm, or more than 5,000 ppm. In some embodiments, the hexapeptide-11 is provided in a range of about 5 ppm to about 100 ppm, about 10 ppm to about 1000 ppm, about 50 ppm to about 1500 ppm, or about 500 ppm to about 5,000 ppm. In some embodiments, the hexapeptide-11 is about 1000 ppm. In some embodiments, the hexapeptide-11 is provided at least or about 5, 10, 20, 25, 50, 75, 100, 150, 200, 250, 300, 350, 400, 450, 500, or more than 500 microgram per milliliter (ug/mL). In some embodiments, the hexapeptide-11 is provided in a range of about 25 to about 250, about 50 to about 200, about 75 to about 150, about 200 to about 300, or about 200 to about 400 microgram per milliliter.

In some embodiments, the hexapeptide-11 is provided at least or about 1, 2, 3, 4, 5, 6, 7, 8, 9, 10, 20, 30, 40, 50, 60, 70, 80, 90, or about 100 milligram (mg). In some embodiments, the hexapeptide-11 is provided in a range of about 1 to about 100 mg. In some embodiments, the hexapeptide-11 is provided in a range of about 2 to about 90, about 3 to about 80, about 4 to about 70, or about 5 to about 60 mg. In some embodiments, the hexapeptide-11 is provided at least or about 6 mg. In some embodiments, the hexapeptide-11 is provided at least or about 18 mg.

In some embodiments, the octapeptide is provided at least or about 0.00001%, 0.0003%, 0.0005%, 0.001%, 0.001%, 0.005%, 0.0055%, 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, the octapeptide is provided in a range of about 0.25% to about 10%, about 0.5% to about 8%, about 0.75% to about 6%, or about 1% to about 4% by weight. In some embodiments, the octapeptide is provided in a concentration of at least about 10, 20, 30, 40, 50, 60, 70, 80, 90, 100, 110, 120, 130, 140, 150, 160, 170, 180, 190, 200, or more than 200 parts per million (ppm). In some embodiments, the octapeptide is provided in a concentration of about 10 to about 190 ppm, about 20 to about 180 ppm, about 30 to about 170 ppm, about 40 to about 160 ppm, about 50 to about 150 ppm, about 60 to about 140 ppm, about 70 to about 130 ppm, about 80 to about 120 ppm, or about 90 to about 110 ppm. In some embodiments, the octapeptide is provided in a concentration of about 100 ppm. In some embodiments, the octapeptide is provided in a concentration of at least about 10, 20, 30, 40, 50, 60, 70, 80, 90, 100, 110, 120, 130, 140, 150, 160, 170, 180, 190, 200, or more than 200 ug/mL In some embodiments, the octapeptide is provided in a concentration of about 10 to about 190 ug/mL, about 20 to about 180 ug/mL, about 30 to about 170 ug/mL, about 40 to about 160 ug/mL, about 50 to about 150 ug/mL, about 60 to about 140 ug/mL, about 70 to about 130 ug/mL, about 80 to about 120 ug/mL, or about 90 to about 110 ug/mL. In some embodiments, the octapeptide is provided in a concentration of about 100 ug/mL.

The peptide can be functionalized. For example, the peptide can be functionalized with a fatty acid, e.g., myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, caprylic acid, capric acid, lauric acid, palmitic acid, stearic acid, arachidic acid, behenic acid, lignoceric acid, cerotic acid, or the like. Examples include palmitoyl hexapeptide-12 (Pal-VGVAPG), palmitoyl tripeptide-1 (Pal-GHK), myristoyl hexapeptide-12 (Myr-VGVAPG), and myristoyl tripeptide-1 (Myr-GHK). Palmitoyl or myristoyl functionalization can be desirable in certain embodiments as it exhibits enhanced penetration when compared to other fatty acids. In some embodiments, the peptide is functionalized with a chemical group. For example, the peptide is functionalized with acetyl. In some instances, the peptide is functionalized with a functional group comprising no more than 14 carbons. In some instances, the peptide is functionalized with a functional group comprising no more than 3, 4, 5, 6, 7, 8, 9, 10, 11, 12, 13, 14, 15, 16, 17, 18, 19, 20, or more than 20 carbons. In some instances, the peptide is non-palmitoylated. Without wishing to be limited to a particular theory, incorporation of the peptide in a liposome, in some embodiments, increases the lipophilicity of a peptide that is functionalized or is not functionalized.

Some embodiments of the methods and compositions provided herein include as a first peptide glycine-histidine-lysine (GHK). GHK is a peptide sequence that is rarely found in the class of proteins in general, but is frequently found in extracellular matrix proteins. The small size of GHK permits it to approach membrane receptors far more easily than larger peptides. Further, its unique, copper-binding structure enhances copper transport into and out of cells and promotes wound healing through several different but related pathways. Due to its strong copper binding structure, GHK can be provided in the form of GHK-Cu (copper-bound GHK form).

Silymarin

Silymarin is derived from the milk thistle plant *Silybum marianum*. Silibinin, the main component of silymarin, can have antioxidant and photoprotective effects by minimizing UV radiation effects such as oxidative stress, inflammation, edema, erythema, and DNA damage. In some instances, silibinin prevents melanin production without effecting cell viability and decreases the expression of tyrosinase protein. Silymarin cream was found to be more effective than intradermal tranexamic acid in a study on patients with melasma. In some instances, silymarin suppressed the production of interleukin-1 beta (IL-1β) and PGE-2 produced by cyclooxygenase-2 (COX-2) in keratinocytes and macrophages. In some instances, silibinin decreases inducible nitric oxide synthase (iNOS) and COX-2, as well as NF-κB.

Compositions as described herein, in some embodiments, comprise silymarin. In some embodiments, the silymarin comprises silibinin. In some embodiments, silymarin is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the silymarin is provided in a range of about 0.25% to about 10%, about 0.1% to about 2.5%, about 0.5% to about 8% by weight (wt. %). In some embodiments, the silymarin is provided in a range of about 0.001% to about 6%, about 0.002% to about 4%, about 0.01% to about 3%, about 0.02% to about 2% by weight, or about 0.2% to about 3% by weight (wt. %). In some embodiments, the silymarin comprises about or no more than about 0.7% by weight. In some embodiments, silymarin is provided at least or about 10, 50, 100, 200, 500, 1000, 2000, 2500, 5000, 7500, 10000, 15000, 20000, 25000, 30000, 35000, 40000, or more than 40000 ppm. In some embodiments, the silymarin is provided in a range of about 2500 ppm to about 100000 ppm, about 1000 ppm to about 25000 ppm, about 5000 ppm to about 80000 ppm, about 75000 ppm to about 60000 ppm, or about 1000 ppm to about 40000 ppm. In some embodiments, the silymarin is provided in a range of about 10 ppm to about 60000 ppm, about 20 ppm to about 40000 ppm, about 100 ppm to about 30000 ppm, or about 200 ppm to about 20000 ppm. In some embodiments, silymarin is provided at least or about 5, 10, 15, 20, 25, 30, 35, or 40 micrograms per mL (ug/mL). In some embodiments, the silymarin is provided in a range of about 1 to about 50, of about 5 to about 45, of about 10 to about 40, or about 15 to about 35 ug/mL.

In some embodiments, the silymarin is provided at least or about at least 1, 2, 3, 4, 5, 6, 7, 8, 9, 10, 20, 30, 40, 50, 60, 70, 80, 90, or about 100 milligrams (mg). In some embodiments, the silymarin is provided in a range of about 1 to about 100, about 2 to about 90, about 3 to about 80, about 4 to about 70, or about 5 to about 60 milligrams (mg). In some embodiments, the silymarin is provided at about 6 milligrams (mg). In some embodiments, the silymarin is provided at about 18 milligrams (mg).

Tranexamic Acid

Tranexamic acid (TXA) is a plasmin inhibitor used to prevent fibrinolysis to reduce blood loss. It is a synthetic derivative of lysine and exerts its effect by reversibly blocking the lysine binding sites on the plasminogen molecule, preventing plasminogen from binding to basal keratinocytes, thereby inhibiting the conversion of plasminogen to plasmin and thus decreasing the production of prostaglandins (PGE-2 in particular). UV light exposure, in some instances, is involved in the pathogenesis of melasma. UV irradiation can induce plasminogen activator synthesis and increases plasmin activity in keratinocytes, which stimulates the release of arachidonic acid (AA) via phospholipase. Free AA can stimulate melanogenesis via its metabolite, PGE-2. In some instances, the release of AA is increased by plasmin in endothelial cells. Increased plasmin itself can elevate α-MSH, which activates melanin synthesis in melanocyte. Plasmin can also increase the release of basic fibroblast growth factor (bFGF), which is a potent melanocyte growth factor. All of these processes can result in more melanin production in the skin. In some instances, plasmin plays an important angiogenesis. Plasmin converts extracellular matrix-bound VEGF into freely diffusible forms. TXA, a plasmin inhibitor, can suppress angiogenesis, and also inhibits neovascularization induced by bFGF. In addition, TXA is similar to tyrosine in its structure, which means that it can competitively inhibit the enzymatic activity of tyrosinase. In some instances, TXA decreases the levels of VEGF and ET-1, which may be responsible for increased vascularity in melasma injuries.

Compositions as described herein, in some embodiments, comprise tranexamic acid (TXA). In some embodiments, the TXA is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, or more than 10.0% by weight (wt %). In some embodiments, the TXA is provided in a range of about 0.25% to about 10%, about 0.1% to about 2.5%, about 0.5% to about 8%, about 0.75% to about 6%, or about 1% to about 4% by weight (wt %). In some embodiments, the TXA is provided in a range of about 0.001% to about 6%, about 0.002% to about 4%, about 0.01% to about 3%, about 0.02% to about 2%, or about 0.25% to about 6.25% by weight (wt %). In some embodiments, the TXA is provided at about or no more than about 1.25% by weight (wt %). In some embodiments, the TXA is provided at least or about 10 ppm, 50 ppm, 100 ppm, 200 ppm, 500 ppm, 1000 ppm, 2000 ppm, 2500 ppm, 5000 ppm, 7500 ppm, 10000 ppm, 15000 ppm, 2000 ppm, 25000 ppm, 3000 ppm, 35000 ppm, 4000 ppm, 45000 ppm, 5000 ppm, 55000 ppm, 6000 ppm, 65000 ppm, 7000 ppm, 75000 ppm, 8000 ppm, 85000 ppm, 9000 ppm, 95000 ppm, 10000 ppm, or more than 10000 ppm. In some embodiments, the TXA is provided in a range of about 2500 ppm to about 10000 ppm, about 1000 ppm to about 25000 ppm, about 5000 ppm to about 8000 ppm, about 7500 ppm to about 6000 ppm, or about 10000 ppm to about 4000 ppm. In some embodiments, the TXA is provided in a range of about 10 ppm to about 6000 ppm, about 20 ppm to about 4000 ppm, about 100 ppm to about 3000 ppm, or about 200 ppm to about 2000 ppm. In some embodiments, the TXA is about 5000 ppm. In some embodiments, the TXA is provided at least or about 10, 50, 100, 200, 500, 1000, 2000, 2500, or 5000 micrograms per milliliter (ug/mL). In some embodiments, the TXA is provided in a range of about 10 to about 5000 ug/mL, of about 50 to about 4000 ug/mL, of about 100 to about 3000 ug/mL, of about 150 to about 2000 ug/mL, or of about 500 to about 1500 ug/mL.

In some embodiments, the TXA is provided at least or about at least 5, 10, 15, 20, 25, 30, 35, 40, 45, 50, 55, 60, 65, 70, 75, 80, 85, 90, 95, 100, 200, 300, 400, 500 or more than 500 milligrams (mg). In some embodiments, the TXA is provided in a range of about 5 to about 500, about 10 to about 400, about 15 to about 300, about 20 to about 200, or about 25 to about 100 milligrams (mg). In some embodiments, the TXA is provided at about 30 milligrams (mg). In some embodiments, the TXA is provided at about 90 milligrams (mg).

Lactoferrin

Lactoferrin (Lf) is an 80 kDa iron binding glycoprotein of the transferrin family, found in exocrine secretions (tears, saliva, milk, nasal and bronchial secretions, gastrointestinal fluids and others). Lactoferrin effects range from antimicrobial to anti-inflammatory and immune modulator activities with high iron binding affinity. Lactoferrin can downregulate TNFα and other cytokine production (IL-1) by local skin cells and may be involved bruising resolution and in the prevention of post inflammatory pigmentation. Lactoferrin can also have a positive effect on wound healing. Lactoferrin is also a plasmin inhibitor and may have effect on endothelial cell induced pigmentation, particularly melasma.

In some instances, a trypsinized peptide fragment derived from lactoferrin facilitate receptor-mediated MITF degradation. In some instances, the trypsinized peptide fragment has an inhibitory effect on pigmentation.

Compositions as described herein, in some embodiments, comprise a transferrin. In some embodiments, the transferrin is a lactoferrin. In some embodiments, the composition comprises a trypsinized fragment of lactoferrin. In some embodiments, the compositions comprise a peptide derived from lactoferrin. In some embodiments, the compositions comprise a variant or fragment of lactoferrin. In some instances, the peptide derived from lactoferrin comprises at least 2, 3, 4, 5, 6, 7, 8, 9, 10, 12, 14, 16, 18, 20, 22, 24, 26, 28, 30, or more than 30 amino acids of SEQ ID NO: 1. Exemplary peptides derived from lactoferrin include, but are not limited to, PRKNVRWCT (SEQ ID NO: 2), LGFLRIP (SEQ ID NO: 3), GYSGAFKC (SEQ ID NO: 4), TCVRR (SEQ ID NO: 5), TCVRRAF (SEQ ID NO: 6), WNSLKDKKSCH (SEQ ID NO: 7), LFNDNTECLAKLG (SEQ ID NO: 8), TTLKNLR (SEQ ID NO: 9), QGLDKCVPNSKE (SEQ ID NO: 10), VKKANE (SEQ ID NO: 11), LAKLGGRP (SEQ ID NO: 12), GDVAFVK (SEQ ID NO: 13), NLNREDFRL (SEQ ID NO: 14), ALGFLRI (SEQ ID NO: 15), TTLKNLR (SEQ ID NO: 16), DALNLDG (SEQ ID NO: 17), LAEDV (SEQ ID NO: 18), RAFALEC (SEQ ID NO: 19), GAVAKFFS (SEQ ID NO: 20), NLRETA (SEQ ID NO: 21), EEQKKC (SEQ ID NO: 22), CVPNSKEKY (SEQ ID NO: 23), and QAYPNL (SEQ ID NO: 24).

| SEQ ID NO | Amino Acid Sequence |
|---|---|
| 1 | APRKNVRWCTISQPEWFKCRRWQWRMKKLGAPSITCVRRAF ALECIRAIAEKKADAVTLDGGMVFEACRDPYKLRPVAAEIY GTKESPQTHYYAVAVVKKGSNFQLDQLQGRKSCHTGLGRSA GWIIPMGILRPYLSWTESLEPLQGAVAKFFSASCVPCIDRQ AYPNLCQLCKGEGENQCACSSREPYFGYSGAFKCLQDGAGD VAFVKETTVFENLPEKADRDQYELLCLNNSRAPVDAFKECH LAQVPSHAVVARSVDGKEDLIWKLLSKAQEKFGKNKSRSFQ LFGSPPGQRDLLFKDSALGFLRIPSKVDSALYLGSRYLTTL KNLRETAEEVKARYTRVVWCAVGPEEQKKCQQWSQQSGQNV TCATASTTDDCIVLVLKGEADALNLDGGYIYTAGKCGLVPV LAENRKSSKHSSLDCVLRPTEGYLAVAVVKKANEGLTWNSL KDKKSCHTAVDRTAGWNIPMGLIVNQTGSCAFDEFFSQSCA PGADPKSRLCALCAGDDQGLDKCVPNSKEKYYGYTGAFRCL AEDVGDVAFVKNDTVWENTNGESTADWAKNLNREDFRLLCL DGTRKPVTEAQSCHLAVAPNHAVVSRSDRAAHVKQVLLHQQ ALFGKNGKNCPDKFCLFKSETKNLLFNDNTECLAKLGGRPT YEEYLGTEYVTAIANLKKCSTSPLLEACAFLTR |

In some instances, the lactoferrin has antimicrobial activity. In some instances, the lactoferrin has antimicrobial activity against bacteria, fungi, yeasts, viruses, parasites, or combinations thereof. Lactoferrin, in some instances, comprises antibiofilm activity. In some instances, lactoferrin interacts with the bacterial surface and destabilizes the microbial membrane. In some instances, lactoferrin chelates iron to disrupt the microbial membrane.

In some embodiments, lactoferrin is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the lactoferrin is provided in a range of about 0.005% to about 0.1%, about 0.25% to about 10%, about 0.5% to about 8%, about 0.75% to about 6%, or about 1% to about 4% by weight. In some embodiments, the lactoferrin is provided in a range of about 0.001% to about 6%, about 0.002% to about 4%, about 0.01% to about 2.5%, or about 0.02% to about 2% by weight (wt. %). In some embodiments, the lactoferrin is provided at about or no more than about 0.025% by weight (wt. %). In some embodiments, the lactoferrin is provided at about or no more than about 0.05% by weight (wt. %). In some embodiments, the lactoferrin is provided at about or no more than about 0.10% by weight (wt. %). In some embodiments, the lactoferrin is provided at least or about 5, 10, 20, 25, 50, 75, 100, 150, 200, 250, 300, 350, 400, 450, 500, 550, 600, 650, 700, 750, 800, 850, 900, 950, 1000 or more than 1000 microgram per milliliter (ug/mL). In some embodiments, the lactoferrin is provided in a range of about 5 to about 1000, about 10 to about 900, about 30 to about 800, about 50 to about 700, about 60 to about 600, or about 100 to about 500 microgram per milliliter (ug/mL). In some embodiments, the lactoferrin is provided at least of about 1 part per million (ppm), 2 ppm, 3, ppm, 4, ppm, 5 ppm, 6 ppm, 7 ppm, 8 ppm, 9 ppm, 10 ppm, or more than 10 ppm. In some embodiments, the lactoferrin is provided in about 5 ppm. In some embodiments, the lactoferrin is provided in a range of about 1 to about 10, about 2 to about 9, about 3 to about 8, or about 4 to about 6 ppm.

In some embodiments, the lactoferrin is provided at least or about at least 5, 10, 15, 20, 25, 30, 35, 40, 45, 50, 55, 60, 65, 70, 75, 80, 85, 90, 95, 100, 200, 300, 400, 500 or more than 500 milligrams (mg). In some embodiments, the lactoferrin is provided in a range of about 5 to about 500, about 10 to about 400, about 15 to about 300, about 20 to about 200, or about 25 to about 100 milligrams (mg). In some embodiments, the lactoferrin is provided at about 30 milligrams (mg). In some embodiments, the lactoferrin is provided at about 90 milligrams (mg).

In some embodiments, peptide derived from lactoferrin is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the peptide derived from lactoferrin is provided in a range of about 0.005% to about 0.1%, about 0.25% to about 10%, about 0.5% to about 8%, about 0.75% to about 6%, or about 1% to about 4% by weight. In some embodiments, the peptide derived from lactoferrin is provided in a range of about 0.001% to about 6%, about 0.002% to about 4%, about 0.01% to about 2.5%, or about 0.02% to about 2% by weight (wt. %). In some embodiments, the peptide derived from lactoferrin is provided at about or no more than about 0.025% by weight (wt. %). In some embodiments, the peptide derived from lactoferrin is provided at about or no more than about 0.05% by weight (wt. %). In some embodiments, the peptide derived from lactoferrin is provided at about or no more than about 0.10% by weight (wt. %). In some embodiments, the peptide derived from lactoferrin is provided at least or about 5, 10, 20, 25, 50, 75, 100, 150, 200, 250, 300, 350, 400, 450, 500, 550, 600, 650, 700, 750, 800, 850, 900, 950, 1000, 2000, 3000, 4000, 5000 or more than 5000 microgram per milliliter (ug/mL). In some embodiments, the peptide derived from lactoferrin is provided in a range of about 5 to about 5000, about 10 to about 4000, about 20 to about 3000, about 25 to about 2000, about 50 to about 1000, or about 75 to about 950 ug/mL. In some embodiments, the peptide derived from lactoferrin is provided at about 100 ug/mL. In some embodiments, the peptide derived from lactoferrin is provided at about 1000 ug/mL. In some embodiments, the peptide derived from lactoferrin is provided at least of about 100 part per million (ppm), 200 ppm, 300 ppm, 400 ppm, 500 ppm, 600 ppm, 700 ppm, 800 ppm, 900 ppm, 1000 ppm, 1100 ppm, 1200 pm, 1300 ppm, 1400 ppm, 1500 ppm, 1600 ppm, 1700 ppm, 1800 ppm, 1900 ppm, 2000 ppm, or more than 2000 ppm. In some embodiments, the peptide derived from lactoferrin is provided in a range 100 ppm to about 1900 ppm, about 200 ppm to about 1800 ppm, about 200 ppm to about 1700 ppm, about 400 ppm, to about 1600 ppm, about 500 ppm to about 1500 ppm, about 600 ppm to about 1400 ppm, about 700 ppm to about 1300 ppm, about 800 ppm to about 1200 ppm, or about 900 ppm to about 1100 ppm. In some embodiments, the peptide derived from lactoferrin is provided in a range of about 10 ppm to 1000 ppm, in a range of about 50 ppm to about 1000 ppm, about 100 ppm to about 1000 ppm, or about 500 ppm to about 1000 ppm.

In some embodiments, the peptide derived from lactoferrin is provided at least or about at least 5, 10, 20, 25, 30, 35, 40, 45, 50, 55, 60, 65, 60, 75, 80, 85, 90, 100, 200, 300, 400, 500, or more than 500 milligrams (mg). In some embodiments, the peptide derived from lactoferrin is provided in a range of about 5 to about 500, about 10 to about 400, about 15 to about 300, about 20 to about 200, or about 25 to about 100 milligrams (mg). In some embodiments, the peptide derived from lactoferrin is provided at about 30 milligrams (mg). In some embodiments, the peptide derived from lactoferrin is provided at about 90 milligrams (mg).

Cannabidiol

Cannabidiol (CBD), can reduce the activity of the NF-κB pathway, a primary pathway regulating the expression of proinflammatory genes. Moreover, CBD, up-regulates the activation of the STAT3 transcription factor, an element of homeostatic mechanism(s) inducing anti-inflammatory events. NF-κB can regulate IL-1 beta and IL-6 cytokines. CBD can decrease the ongoing pro-inflammatory processes as well as intensify events counteracting inflammation. In carrageenan-induced inflammation model in rats, CBD reduced PGE2, nitric oxide (NO), and malondialdehyde production, together with COX activity.

Compositions as described herein, in some embodiments, comprise cannabidiol (CBD). In some embodiments, the CBD is provided at least or about 10, 20, 30, 40, 50, 60, 70, 80, 90, 100, 110, 120, 130, 140, 150, 160, 170, 180, 190, 200, or more than 200 ug/mL. In some embodiments, the CBD is provided in a range of about 10 to about 190 ug/mL, about 20 to about 180 ug/mL, about 30 to about 170 ug/mL, about 40 to about 160 ug/mL, about 50 to about 150 ug/mL, about 60 to about 140 ug/mL, about 70 to about 130 ug/mL, about 80 to about 120 ug/mL, or about 90 to about 110 ug/mL. In some embodiments, the CBD is provided at about 100 ug/mL. In some embodiments, CBD is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the CBD is provided in a range of about 0.25% to about 10%, about 0.1% to about 2.5%, about 0.5% to about 8%, about 0.75% to about 6%, or about 1% to about 4% by weight. In some embodiments, the CBD is provided in a range of about 0.001% to about 6%, about 0.002% to about 4%, about 0.01% to about 3%, or about 0.02% to about 2% by weight. In some embodiments, CBD is provided at least or about 10, 50, 100, 200, 500, 1000, 2000, 2500, 5000, 7500, 10000, 15000, 20000, 25000, 30000, 35000, 40000, or more than 40000 ppm. In some embodiments, the CBD is provided in a range of about 2500 ppm to about 100000 ppm, about 1000 ppm to about 25000 ppm, about 5000 ppm to about 80000 ppm, about 75000 ppm to about 60000 ppm, or about 1000 ppm to about 40000 ppm. In some embodiments, the CBD is provided in a range of about 10 ppm to about 60000 ppm, about 20 ppm to about 40000 ppm, about 100 ppm to about 30000 ppm, or about 200 ppm to about 20000 ppm.

*Withania somnifera* Extract

While other depigmenting agents generally inhibit tyrosinase, the *Withania somnifera* extract (10 ug/mL) functions by interrupting the ET-1-triggered intracellular signaling cascade which mainly consists of the PKC and MAPK pathways, which in turn leads to down-regulation of the melanocyte master transcription factor MITF. The decrease in MITF function can then suppresses the expression and function of its downstream targets which results in the attenuated synthesis of melanin. *Withania somnifera* extract can serve as a therapeutic tool for ET-1 associated hyperpigmentary disorders such as UVB-melanosis and *Lentigo senilis*.

Compositions as described herein, in some embodiments, comprise *Withania somnifera* extract. In some embodiments, the *Withania somnifera* extra is provided in at least about 0.5, 1, 2, 3, 4, 5, 6, 7, 8, 9, 10, 11, 12, 13, 14, 15, 16, 17, 18, 19, 20, 25, 30, 35, 40, or more than 40 micrograms per milliliter (ug/mL). In some embodiments, the *Withania somnifera* extract is provided in a range of about 0.5 to about 20, about 1 to about 19, about 2 to about 18, about 3 to about 17, about 4 to about 16, about 5 to about 15, about 6 to about 14, about 7 to about 13, about 8 to about 12, or about 9 to about 11 ug/mL. In some embodiments, the *Withania somnifera* extract is provided in at least about 10 ug/mL. In some embodiments, the *Withania somnifera* extract is provided in at least about 20 ug/mL. In some embodiments, the *Withania somnifera* extract is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the *Withania somnifera* extract is provided in a range of about 0.005% to about 0.1%, about 0.25% to about 10%, about 0.5% to about 8%, about 0.75% to about 6%, or about 1% to about 4% by weight (wt. %). In some embodiments, the *Withania somnifera* extract is provided in a range of about 0.001% to about 6%, about 0.002% to about 4%, about 0.01% to about 2.5%, about 0.02% to about 2%, about 0.02% to about 0.5% by weight (wt. %). In some embodiments, the *Withania somnifera* extract is provided at about or no more than about 0.025 wt. %. In some embodiments, the *Withania somnifera* extract is provided at about or no more than about 0.05 wt. %. In some embodiments, the *Withania somnifera* extract is provided at about or no more than about 0.10 wt. %.

In some embodiments, the *Withania somnifera* extract is provided at least or about at least 0.5, 0.75, 1.0, 1.2, 1.4, 1.6, 1.8, 2, 4, 6, 8, or more than 10 micrograms (ug). In some embodiments, the *Withania somnifera* extract is provided in a range of about 0.5 to about 2, about 0.75 to about 5, or about 1.0 to about 4 micrograms (ug).

Gallic Acid

Gallic acid (GA), a dietary phenolic, present in plants and fruits, can provide beneficial effects against hyperpigmentation possibly through its antioxidant properties. Gallic acid is a phenolic compound, which can suppress melanogenesis in melanoma cells. Gallic acid can down-regulate melanogenic regulatory genes including TYR, TRP-1, and Dct expression at transcriptional and translational level. In some instances, GA effectively suppressed MITF expression by down-regulating the CAMP mediated PKA/CREB signaling cascades. UV-B-induced hyperpigmentation in mice skin was significantly rescued by topical application of GA for 4 weeks.

Compositions as described herein, in some embodiments, comprise gallic acid. In some instances, GA is present at about 50 ppm or less to 1000, 5000, 10000, 50000, 100000, 500000 ppm or more, e.g., 100 ppm of the GA. In some instances, GA is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, GA is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, GA is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, GA is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some instances, GA is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %). In some instances, GA is present at about or no more than about 2.0 wt. %.

Sesamol

Sesamol is an active lignin isolated from *Sesamum indicum*. In melan-a cells, sesamol can inhibit melanin biosynthesis and the activity of intracellular tyrosinase by decreasing cyclic adenosine monophosphate (cAMP) accumulation. Sesamol can decrease the expression of melanogenesis-related genes, such as TYR, TRP-1, TRP-2, MITF and MC1R. Sesamol can inhibit melanin biosynthesis.

Compositions as described herein, in some embodiments, comprise sesamol. In some embodiments, the sesamol is provided in a concentration at least about 5, 10, 20, 30, 40, 50, 60, 70, 80, 90, 100, or more than 100 µM. In some embodiments, the sesamol is provided in a concentration in a range of about 5 to about 100 µM, about 10 to about 90 µM, about 20 to about 80 µM, about 30 to about 70 µM, about 40 to about 60 µM. In some embodiments the sesamol is provided in a concentration of about 50 µM. In some instances, sesamol is present at about 50 ppm or less to 1000, 5000, 10000, 50000, 100000, 500000 ppm or more, e.g., 100 ppm of the sesamol. In some instances, sesamol is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, sesamol is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, sesamol is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, sesamol is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some embodiments, sesamol is provided at about 100 ug/mL. In some instances, sesamol is present at least or about at least 0.001%, 0.002%, 0.003%, 0.004%, 0.005%, 0.01%, 0.05%, 0.1%, 0.2%, 0.3%, 0.4%, 0.5%, or more than 0.5% by weight (wt. %). In some instances, sesamol is present from about 0.002% to about 0.05%, about 0.001% to about 0.5%, about 0.002% to about 0.4%, about 0.003% to about 0.3%, about 0.004% to about 0.2%, or about 0.005% to about 0.05% by weight (wt. %). In some instances, sesamol is present at least or about 0.01 wt. %.

In some embodiments, the sesamol is provided at least or about at least 0.25, 0.5, 0.75, 1, 2, 3, 4, 5, 6, 7, 8, 9, 10, 20, 30, 40, 50 or more than 50 milligrams (mg). In some embodiments, the sesamol is provided in a range of about 5 to about 50, about 10 to about 40, or about 20 to about 30 milligrams (mg). In some embodiments, the sesamol is provided at about 3 milligrams (mg). In some embodiments, the sesamol is provided at about 9 milligrams (mg).

Acteoside

Acteoside is a phenylpropanoid glycoside extracted from the leaves of *Rehmannia glutinosa*. Acteoside can inhibit tyrosinase activity and melanin synthesis in both cell-free assay systems and cultured B16F10 melanoma cells. Acteoside can decrease levels of TYR, TRP-1, and MITF proteins and increase ERK phosphorylation. In some instances, acteoside suppressed melanogenesis induced by α-MSH and showed UV-absorbing effects.

Compositions as described herein, in some embodiments, comprise acteoside. In some embodiments, the acteoside is provided in a concentration of at least about 50, 100, 200, 300, 400, 500, 600, 700, 800, 900, 1000, or more than 1000 μM. In some embodiments, the acteoside is provided in a concentration in a range of about 50 to about 1000 μM, about 100 to about 900 μM, about 200 to about 800 μM, about 300 to about 700 μM, about 400 to about 60 μM. In some embodiments, the acteoside is provided in a concentration of about 500 μM. In some instances, acteoside is present at about 50 ppm or less to 1000, 5000, 10000, 50000, 100000, 500000 ppm or more, e.g., 100 ppm of the acteoside. In some instances, acteoside is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, acteoside is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, acteoside is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, acteoside is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 microgram per milliliter. In some instances, acteoside is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %).

Oleuropein

Oleuropein, a potent anti-inflammatory, anti-oxidant derived from olive trees, showed 90% tyrosinase inhibitory activity and inhibition type was non-competitive competition.

Compositions as described herein, in some embodiments, comprise oleuropein. In some instances, oleuropein is present at about 50 ppm or less to 1000, 5000, 10000, 50000, 100000, 500000 ppm or more, e.g., 100 ppm of the oleuropein. In some instances, oleuropein is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, oleuropein is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, oleuropein is present at about 1, 2, 3, 4, 5, 6, 7, 8, 9, 10, 15, 20, 25, 50, 75, 100, 200, 300, 400, 500, 600, 700, 800, 900, 1000, 1200, 1400, 1600, 1800, 2000 or more than 2000 microgram per milliliter (ug/mL). In some instances, oleuropein is present in a range of about 10 to about 1000, about 10 to about 500, about 10 to about 400, about 10 to about 300, about 10 to about 200, about 100 to about 1000, about 200 to about 800, about 300 to about 600, or about 200 to about 1200 ug/mL. In some instances, oleuropein is present from about 0.01 wt. % to about 10 wt. %, about 0.01 wt. % to about 0.02 wt. %, about 0.01 wt. % to about 0.03 wt. %, about 0.01 wt. % to about 0.04 wt. %, about 0.01 wt. % to about 0.05 wt. %, about 0.01 wt. % to about 0.1 wt. %, about 0.03 wt. % to about 0.750 wt. %, about 0.1 wt. % to about 5 wt. %, or about 0.1 wt. % to about 10 wt. %. In some instances, oleuropein is present at about or no more than about 0.15 wt. %.

In some embodiments, the oleuropein is provided at least or about at least 5, 10, 15, 20, 25, 30, 35, 40, 45, 50, 55, 60, 65, 70, 75, 80, 85, 90, 95, 100, 200, 300, 400, 500 or more than 500 milligrams (mg). In some embodiments, the oleuropein is provided in a range of about 5 to about 500, about 10 to about 400, about 15 to about 300, about 20 to about 200, or about 25 to about 100 milligrams (mg). In some embodiments, the oleuropein is provided at about 30 milligrams (mg). In some embodiments, the oleuropein is provided at about 90 milligrams (mg).

Hesperidin

Hesperidin is one of the citrus flavonoids shown to be active against various oxidative stress mediated diseases. Hesperidin can inhibit melanosome transport in melanocytes and showed skin lightening effect in pigmented reconstructed epidermis model. Rab27A, melanophilin, and myosin Va make a complex to link melanosomes with phosphatidylserine, thereby docking melanosomes at the plasma membrane. Darkly-pigmented melanocytes with significantly higher RAB27A expression can transfer significantly more melanosomes to keratinocytes than lightly-pigmented melanocytes in co-culture and in vivo. Hesperidin can have a depigmenting effect by blocking the Rab27A-melanophilin interaction.

Compositions as provided herein, in some embodiments, comprise hesperidin. In some instances, hesperidin is present at about 50 ppm or less to 1000, 5000, 10000, 50000, 100000, 500000 ppm or more, e.g., 100 ppm of the hesperidin. In some instances, hesperidin is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, hesperidin is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, hesperidin is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, hesperidin is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some instances, hesperidin is present from about 0.01 wt. % to about 10 wt. %, about 0.01 wt. % to about 0.02 wt. %, about 0.01 wt. % to about 0.03 wt. %, about 0.01 wt. % to about 0.04 wt. %, about 0.01 wt. % to about 0.05 wt. %, about 0.01 wt. % to about 0.1 wt. %, about 0.020 to about 0.50 wt. %, about 1 wt. % to about 5 wt. %, or about 1 wt. % to about 10 wt. %. In some instances, the hesperidin is present at about or no more than about 0.10 wt. %.

*Sideroxylon inerme* L. Stem Bark

Compositions as described herein, in some embodiments, comprise *Sideroxylon inerme* extract. In some instances, *Sideroxylon inerme* extract is present at about 50 ppm or less to 1000, 5000, 10000, 50000, 100000, 500000 ppm or more, e.g., 100 ppm of the *Sideroxylon inerme* extract. In some instances, *Sideroxylon inerme* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, *Sideroxylon inerme* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, *Sideroxylon inerme* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, *Sideroxylon inerme* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some instances, *Sideroxylon inerme* extract is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %).

Parthenolide

Parthenolide is a sesquiterpene lactone compound and an active substance in medical herb Feverfew (*Tanacetum parthenium*) that can be used in inflammation. Parthenolide is a NF-κB inhibitor, which can block UVB-mediated skin changes by inhibiting NF-κB mediated gene expression decreasing the production of bFGF and MMP-1 from cells. In some instances, bFGF production is induced by UV and promotes the proliferation of skin keratinocytes and melanocytes.

Compositions as described herein, in some embodiments, comprise parthenolide. In some embodiments, parthenolide is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the parthenolide is provided in a range of about 0.25% to about 10%, about 0.1% to about 2.5%, about 0.5% to about 8%, about 0.75% to about 6%, or about 1% to about 4% by weight. In some embodiments, the parthenolide is provided in a range of about 0.001% to about 6%, about 0.002% to about 4%, about 0.01% to about 3%, or about 0.02% to about 2% by weight (wt. %). In some embodiments, parthenolide is provided at least or about 10, 50, 100, 200, 500, 1000, 2000, 2500, 5000, or more than 5000 ppm. In some embodiments, the parthenolide is provided in a range of about 25 ppm to about 100 ppm, about 100 ppm to about 250 ppm, about 50 ppm to about 800 ppm, about 75 ppm to about 600 ppm, or about 10 ppm to about 400 ppm. In some embodiments, the parthenolide is provided in a range of about 10 ppm to about 60 ppm, about 20 ppm to about 40 ppm, about 100 ppm to about 300 ppm, or about 200 ppm to about 2000 ppm.

*Pancratium Maritimum*

In some instances, melanin release by melanocytes to keratinocytes is stimulated by neuropeptides released by nerve fibers present in the epidermis including substance P. *Pancratium maritimum* extract (PME; Sea Lily extract) can inhibit melanin transfer, at least in part via its action on the substance P receptor, present on melanocyte dendrites providing an effective and original solution for the treatment of pigment spots.

Compositions as described herein, in some embodiments, comprise *Pancratium maritimum* extract. In some instances, *Pancratium maritimum* extract is present at about 50 ppm or less to 1000, 5000, 10000, 50000, 100000, 500000 ppm or more, e.g., 100 ppm of the *Pancratium maritimum* extract. In some instances, *Pancratium maritimum* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, *Pancratium maritimum* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, *Pancratium maritimum* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, *Pancratium maritimum* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some instances, *Pancratium maritimum* extract is present from about 0.01 wt. % to about 10 wt. %, about 0.01 wt. % to about 0.02 wt. %, about 0.01 wt. % to about 0.03 wt. %, about 0.01 wt. % to about 0.04 wt. %, about 0.01 wt. % to about 0.05 wt. %, about 0.01 wt. % to about 0.1 wt. %, about 0.5 wt. % to about 5 wt. %, about 1 wt. % to about 5 wt. %, or about 1 wt. % to about 10 wt. %. In some instances, *Pancratium maritimum* extract is present at least or about at least 1.5 wt. %.

Autophagy Agent

In some instances, compositions as described herein comprise an autophagy agent for degrading melanosomes. In some instances, the autophagy agent is present at about 50 ppm or less to 1000, 5000, 10000, 50000, 100000, 500000 ppm or more, e.g., 100 ppm of the autophagy agent is. In some instances, the autophagy agent is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, the autophagy agent is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, the autophagy agent is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, the autophagy agent is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 microgram per milliliter. In some instances, the autophagy agent is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %). In some instances, the autophagy agent is Melatrepein™.

Niacinamide

Once synthesized, melanin pigment is packaged in melanosomes and transferred from the melanocyte to its neighboring basal keratinocyte via melanocyte dendrites. To inhibit this transfer, niacinamide can reduce the formation of dendrites.

Compositions as described herein, in some embodiments, comprise niacinamide. In some embodiments, the niacinamide is provided in at least about 0.25%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10% or more than 10% by weight (wt. %). In some embodiments, the niacinamide is provided in a range of about 0.25 wt. % to about 10 wt. %, about 0.5 wt. % to about 9.5 wt. %, about 1 wt. % to about 9 wt. %, about 1.5 wt. % to about 8.5 wt. %. In some embodiments, the niacinamide is provided at least or about at least 2.0 wt. %.

*Tremella fuciformis*

*Tremella fuciformis* can inhibit melanin production. Compositions as described herein, in some embodiments, comprise *Tremella fuciformis* extract. In some embodiments, the *Tremella fuciformis* extract is derived from an edible mushroom. In some embodiments, *Tremella fuciformis* extract provides moisture and antioxidant properties.

In some embodiments, *Tremella fuciformis* extract is provided at least or about 0.001% by weight (wt. %), 0.005 wt. %, 0.01 wt. %, 0.02 wt. %, 0.05 wt. %, 0.10 wt. %, 0.20 wt. %, 0.25 wt. %, 0.50 wt. %, 0.75 wt. %, 1.0 wt. %, 1.5 wt. %, 2.0 wt. %, 2.5 wt. %, 3.0 wt. %, 3.5 wt. %, 4.0 wt. %, or more than 4 wt. %. In some embodiments, the *Tremella fuciformis* extract is provided in a range of about 0.25 wt. % to about 10 wt. %, about 0.1 wt. % to about 2.5 wt. %, about 0.5 wt. % to about 8 wt. %, about 0.75 wt. % to about 6 wt. %, or about 1 wt. % to about 4 wt. %. In some embodiments, the *Tremella fuciformis* extract is provided in a range of about 0.001 wt. % to about 6 wt. %, about 0.002 wt. % to about 4 wt. %, about 0.01 wt. % to about 3 wt. %, about 0.02 wt. % to about 2 wt. %, or about 0.20 wt. % to about 5.0 wt. %. In some embodiments, the *Tremella fuciformis* extract is provided at least or about at least 1.0 wt %.

*Thermus thermophilus* Extract

*Thermus thermophilus* ferment can act as an antioxidant, particularly against PGE2. Compositions as described herein, in some embodiments, comprises *Thermus thermophilus* ferment. In some instances, *Thermus thermophilus* extract is present at about 50 ppm or less to 1000, 5000, 10000, 50000, 100000, 500000 ppm or more, e.g., 100 ppm of the *Thermus thermophilus* extract. In some instances, *Thermus thermophilus* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, *Thermus thermophilus* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, *Thermus thermophilus* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, *Thermus thermophilus* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some instances, *Thermus thermophilus* extract is present from about 0.01% by weight (wt. %) to about 10 wt. %, about 0.01 wt. % to about 0.02 wt. %, about 0.01 wt. % to about 0.03 wt. %, about 0.01 wt. % to about 0.04 wt. %, about 0.01 wt. % to about 0.05 wt. %, about 0.01 wt. % to about 0.1 wt. %, about 0.3 wt. % to about 7.5 wt. %, about 1 wt. % to about 5 wt. %, or about 1 wt. % to about 10 wt. %. In some instances, *Thermus thermophilus* extract is present at least or at least about 1.5 wt. %.

Phytoene and Phytofluene

Compositions as described herein, in some embodiments, comprise phytoene, phytofluene, or combinations thereof. Phytoene and phytofluene are colorless carotenoids derived from saltwater microalgae that modulate Prostaglandin E-2 (PGE-2).

In some embodiments, the phytoene, phytofluene, or combinations thereof is provided at least or about 0.5%, 1.0%, 2.0%, 3.0%, 4.0%, 5.0%, 6.0%, 7.0%, 8.0%, 9.0%, 10%, 11%, 12%, 13%, 14%, 15%, 16%, 17%, 18%, 19%, 20% or more than 20% by weight (wt. %). In some embodiments, the phytoene, phytofluene, or combinations thereof is provided in a range of about 0.5% to about 20%, about 1.0% to about 15%, about 2.0% to about 12%, about 3.0% to about 10%, or about 4.0% to about 8% by weight (wt. %). In some instances, the phytoene, phytofluene, or combinations thereof is provided at least or about 5.0 wt. %. In some instances, phytoene, phytofluene, or combinations thereof is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, phytoene, phytofluene, or combinations thereof is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL.

White Horehound

White horehound (*Marrubium vulgare*) may decrease levels of ET-1. Compositions as described herein, in some embodiments, comprise white horehound extract. In some instances, white horehound extract is present at about 50 ppm or less to 1000, 5000, 10000, 50000, 100000, 500000 ppm or more, e.g., 100 ppm of the white horehound extract. In some instances, white horehound extract is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, white horehound extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, white horehound extract is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, white horehound extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some instances, white horehound extract is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %).

*Polypodium leucotomos*

*Polypodium leucotomos* or *Phlebodium aureum* comprises compounds that may fight inflammation and prevent skin damage. Compositions as described herein, in some embodiments, comprise *Polypodium leucotomos* extract. In some instances, *Polypodium leucotomos* extract is present at about 50 ppm or less to 1000, 5000, 10000, 50000, 100000, 500000 ppm or more, e.g., 100 ppm of the *Polypodium leucotomos* extract. In some instances, *Polypodium leucotomos* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 ppm. In some instances, *Polypodium leucotomos* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ppm. In some instances, *Polypodium leucotomos* extract is present at about 1, 2, 3, 4, 5, 6, 7, 8, 9, 10, 15, 20, 25, 50, 75, 100, 200, 300, 400, 500, 600, 700, 800, 900, 1000, or more than 1000 microgram per milliliter (ug/mL). In some instances, *Polypodium leucotomos* extract is present in a range of about 1 to about 100, about 1 to about 50, about 1 to about 40, about 1 to about 30, about 1 to about 20, about 1 to about 10, about 5 to about 90, about 10 to about 80, about 20 to about 60, or about 30 to about 50 ug/mL. In some instances, *Polypodium leucotomos* extract is present from about 0.01% to about 10%, about 0.01% to about 0.02%, about 0.01% to about 0.03%, about 0.01% to about 0.04%, about 0.01% to about 0.05%, about 0.01% to about 0.1%, about 1% to about 5%, or about 1% to about 10% by weight (wt. %).

Phosphatidylserine

Compositions as described herein, in some embodiments, comprise phosphatidylserine. In some embodiments, the phosphatidylserine is provided in a concentration of at least about or no more than about 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, or more than 0.20% by weight (wt. %). In some embodiments, the phosphatidylserine is provided in a concentration of about 0.01% to about 0.2%, about 0.02% to about 0.15%, about 0.03% to about 0.1%, about 0.04% to about 0.1% by weight (wt. %). In some embodiments, the phosphatidylserine is present at about or no more than about 0.075% by weight (wt. %). In some embodiments, the phosphatidylserine is provided in a concentration of about or no more than about 0.05% by weight (wt. %). In some embodiments, the phosphatidylserine is provided in a concentration of at least about 100, 200, 300, 400, 500, 600, 700, 800, 900, 1000, 1100, 1200, 1300, 1400, 1500, 1600, 1700, 1800, 1900, 2000, or more than 2000 parts per million (ppm). In some embodiments, the phosphatidylserine is provided in a concentration of about 100 to about 1900 ppm, about 200 to about 1800 ppm, about 300 to about 1700 ppm, about 400 to about 1600 ppm, about 500 to about 1500 ppm, about 600 to about 1400 ppm, about 700 to about 1300 ppm, about 800 to about 1200 ppm, or about 900 to about 1100 ppm. In some embodiments, the phosphatidylserine is provided in a concentration of about 1000 ppm. In some embodiments, the phosphatidylserine is provided in a concentration of at least about 100, 200, 300, 400, 500, 600, 700, 800, 900, 1000, 1100, 1200, 1300, 1400, 1500, 1600, 1700, 1800, 1900, 2000, or more than 2000 micrograms per milliliter (ug/mL). In some embodiments, the phosphatidylserine is provided in a concentration of about 100 to about 1900 ug/mL, about 200 to about 1800 ug/mL, about 300 to about 1700 ug/mL, about 400 to about 1600 ug/mL, about 500 to about 1500 ug/mL, about 600 to about 1400 ug/mL, about 700 to about 1300 ug/mL, about 800 to about 1200 ug/mL, or about 900 to about 1100 ug/mL. In some embodiments, the phosphatidylserine is provided in a concentration of about 500 to about 1000 ug/mL.

In some embodiments, the phosphatidylserine is provided at least or about at least 2, 3, 4, 5, 6, 7, 8, 9, 10, 15, 20, 25, 30, 35, 40, 45, 50, 55, 60, 65, 70, 75, 80, 85, 90, 95, 100, 200, 300, 400, 500, or more than 500, milligrams (mg). In some embodiments, the phosphatidylserine is provided in a range of about 20 to about 500, about 30 to about 400, about 40 to about 300, about 50 to about 200, about 60 to about 100, about 70 to about 95, or about 80 to about 90 milligrams (mg). In some embodiments, the phosphatidylserine is provided at about 15 milligrams (mg). In some embodiments, the phosphatidylserine is provided at about 20 milligrams (mg). In some embodiments, the lactoferrin is provided at about 45 milligrams (mg).

Heptasodium Hexacarboxymethyl Dipeptide-12 (HHD) 12)

HHD12 can stimulate autophagy in keratinocytes. Melanosomes are usually transferred to neighboring keratinocytes and then naturally degraded by autophagy. However, when the skin is constantly exposed to sunlight, pathogens, and hormone changes, the autophagic processes are disturbed and melanosomes cannot be degraded. Accumulation of undegraded melanosomes in keratinocytes results in skin pigmentation. HHD12 activates autophagy to break down melanosomes in keratinocytes and by inhibiting melanosome uptake into keratinocytes at the same time.

In some embodiments, HHD12 is present at about or at least about 0.01% by weight (wt. %), 0.05 wt. %, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, or 10 wt. %. In some embodiments, HHD12 is present in a range of about 0.01 wt. % to about 10 wt. %, of about 0.05 wt. % to about 9 wt. %, of about 0.1 wt. % to about 8 wt. %, of about 0.5 wt. % to about 7 wt. %, or about 1 wt. % to about 6 wt. %. In some embodiments, HHD12 is present in a range of about 0.2 wt. % to about 5 wt %. In some embodiments, HHD12 is present at about or no more than about 1.0 wt. %.

Liposomes

Described herein are liposomal compositions for improved distribution, efficacy, bioavailability, and/or activity. Liposomal compositions may improve distribution, efficacy, bioavailability, and/or activity of the active ingredient by improving delivery and tissue (e.g. skin) penetration. In some instances, improved delivery and skin penetration result from the active ingredient being incorporated (e.g. encapsulated) in a liposome. In some instances, the active ingredient is a peptide that is encapsulated in a liposome. In some instances, the peptide encapsulated in a liposome allows for efficient interfollicular transdermal delivery.

Liposomal compositions as described herein may comprise a peptide encapsulated in a liposome. In some embodiments, the peptide is hexapeptide-12. In some embodiments, the peptide is hexapeptide-11 In some embodiments, the peptide is functionalized with a palmitoyl group. In some embodiments, the peptide is functionalized with an acetyl group. In some embodiments, the peptide encapsulated in a liposome is lactoferrin.

In some embodiments, the peptide encapsulated in a liposome is about or at about 10, 25, 50, 100, 200, 300, 400, 500, 600, 700, 800, 900, 1000, 1500, 2000, 3000, 4000, 5000, or above 5000 Da. In some embodiments, the peptide encapsulated in a liposome is present in a range of about 10 to about 5000, about 25 to about 4000, about 50 to about 3000, about 100 to about 2000, or about 200 to about 1000 Da. In some embodiments, the peptide encapsulated in a liposome is about 500 to about 800 Da.

In some embodiments, the average particle size of a liposome is 10, 20, 30, 40, 50, 60, 70, 80, 90, 100, 200, 300, 400, or 500 nanometers (nm). In some embodiments, the average particle size of a liposome is present in a range of about 10 to about 500, about 20 to about 400, about 30 to about 300, or about 40 to about 200 nm. In some embodiments, the average particle size of a liposome is about 110 nm.

In some embodiments, the liposome is a photosome. Photosomes, in some embodiments, comprise DNA repair technology and/or repair broken UV induced dimers using DNA repair enzyme photolyase. In some instances, compositions described herein comprise one or more photosomes. In some instances, the photosome is present at least or about 0.01%, 0.1%, 0.2%, 0.3%, 0.4%, 0.5%, 0.6%, 0.7%, 0.8%, 0.9%, 1%, 2%, 3%, 4% or 5% by weight (wt. %). In some instances, the photosome is present in a range of about 0.01% to about 5%, about 0.1% to about 4%, about 0.2% to about 3%, or about 0.3% to about 2% by weight (wt. %). In some instances, the photosome is present in a range of about 0.1 wt. % to about 2 wt. %.

Compositions described herein, in some embodiments, comprise one or more photosomes and one or more liposomes. In some embodiments, each liposome of the one more liposomes encapsulates at least one peptide. In some embodiments, each liposome of the one more liposomes encapsulates different peptides. In some embodiments, each liposome of the one more liposomes encapsulates different peptides comprising hexapeptide-11, hexapeptide-12, lactoferrin, a peptide derived from lactoferrin, or combinations thereof. In some embodiments, the one or more liposomes encapsulate one or more peptides, wherein the one or more peptides comprises hexapeptide-11, hexapeptide-12, lactoferrin, a peptide derived from lactoferrin, or combinations thereof.

In some embodiments, a first liposome of the one or more liposomes encapsulates at least one peptide. In some embodiments, the first liposome of the one or more liposomes encapsulates a non-palmitoylated hexapeptide. In some embodiments, the first liposome of the one or more liposomes encapsulates hexapeptide-11. In some embodiments, the first liposome of the one or more liposomes encapsulates hexapeptide-12. In some embodiments, the first liposome of the one or more liposomes encapsulates lactoferrin. In some embodiments, the first liposome of the one or more liposomes encapsulates a peptide derived from lactoferrin. In some embodiments, the first liposome of the one or more liposomes encapsulates a non-palmitoylated hexapeptide and lactoferrin. In some embodiments, the first liposome of the one or more liposomes encapsulates hexapeptide-11 and hexapeptide-12. In some embodiments, the first liposome of the one or more liposomes encapsulates hexapeptide-11 and lactoferrin. In some embodiments, the first liposome of the one or more liposomes encapsulates hexapeptide-11 and a peptide derived from lactoferrin. In some embodiments, the first liposome of the one or more liposomes encapsulates hexapeptide-12 and lactoferrin. In some embodiments, the first liposome of the one or more liposomes encapsulates hexapeptide-12 and a peptide derived from lactoferrin. In some embodiments, the first liposome of the one or more liposomes encapsulates hexapeptide-11, hexapeptide-12, and lactoferrin. In some embodiments, the first liposome of the one or more liposomes encapsulates hexapeptide-11, hexapeptide-12, and a peptide derived from lactoferrin. In some embodiments, the first liposome of the one or more liposomes encapsulates hexapeptide-11, lactoferrin, and a peptide derived from lactoferrin. In some embodiments, the first liposome of the one or more liposomes encapsulates hexapeptide-12, lactoferrin, and a peptide derived from lactoferrin. In some embodiments, the first liposome of the one or more liposomes encapsulates hexapeptide-11, hexapeptide-12, lactoferrin, and a peptide derived from lactoferrin.

In some embodiments, a first liposome of the one or more liposomes encapsulates hexapeptide-11 and a second liposome of the one or more liposomes encapsulates lactoferrin. In some embodiments, a first liposome of the one or more liposomes encapsulates hexapeptide-11 and a second liposome of the one or more liposomes encapsulates hexapeptide-12. In some embodiments, a first liposome of the one or more liposomes encapsulates hexapeptide-11 and a second liposome of the one or more liposomes encapsulates a peptide derived from lactoferrin. In some embodiments, a first liposome of the one or more liposomes encapsulates hexapeptide-12 and a second liposome of the one or more liposomes encapsulates lactoferrin. In some embodiments, a first liposome of the one or more liposomes encapsulates hexapeptide-12 and a second liposome of the one or more liposomes encapsulates a peptide derived from lactoferrin. In some embodiments, a first liposome of the one or more liposomes encapsulates lactoferrin and a second liposome of the one or more liposomes encapsulates a peptide derived from lactoferrin.

In some embodiments, a first liposome of the one or more liposomes encapsulates hexapeptide-11, a second liposome of the one or more liposomes encapsulates hexapeptide-12, and a third liposome of the one or more liposomes encapsulates a lactoferrin. In some embodiments, a first liposome of the one or more liposomes encapsulates hexapeptide-11, a second liposome of the one or more liposomes encapsulates hexapeptide-12, and a third liposome of the one or more liposomes encapsulates a peptide derived from lactoferrin. In some embodiments, a first liposome of the one or more liposomes encapsulates hexapeptide-11, a second liposome of the one or more liposomes encapsulates lactoferrin, and a third liposome of the one or more liposomes encapsulates a peptide derived from lactoferrin. In some embodiments, a first liposome of the one or more liposomes encapsulates hexapeptide-12, a second liposome of the one or more liposomes encapsulates lactoferrin, and a third liposome of the one or more liposomes encapsulates a peptide derived from lactoferrin.

In some embodiments, a first liposome of the one or more liposomes encapsulates hexapeptide-11, a second liposome of the one or more liposomes encapsulates hexapeptide-12, a third liposome of the one or more liposomes encapsulates lactoferrin, and a fourth liposome of the one or more liposomes encapsulates a peptide derived from lactoferrin.

Compositions described herein, in some embodiments, comprise one or more photosomes encapsulating one or more liposomes encapsulating one or more peptides. In some embodiments, the photosome encapsulates the liposome encapsulating one peptide. In some embodiments, the photosome encapsulates the liposome encapsulating hexapeptide-11. In some embodiments, the photosome encapsulates the liposome encapsulating hexapeptide-12. In some embodiments, the photosome encapsulates the liposome encapsulating lactoferrin. In some embodiments, the photosome encapsulates the liposome encapsulating a peptide derived from lactoferrin. In some embodiments, the photosome encapsulates the liposome encapsulating two or more peptides. In some embodiments, the photosome encapsulates the liposome encapsulating two or more peptides, wherein the two or more peptides comprise hexapeptide-11, hexapeptide-12, lactoferrin, a peptide derived from lactoferrin, or combinations thereof. In some embodiments, the photosome encapsulates one or more liposomes, wherein each liposome of the one more liposomes encapsulates different peptides. In some embodiments, the photosome encapsulates one or more liposomes, wherein each liposome of the one more liposomes encapsulates different peptides comprising hexapeptide-11, hexapeptide-12, lactoferrin, a peptide derived from lactoferrin, or combinations thereof.

Compositions described herein, in some embodiments, comprise one or more photosomes encapsulating one or more liposomes. In some embodiments, the one or more photosomes encapsulates the one or more liposomes encapsulating one or more peptides. In some embodiments, the one or more photosomes encapsulates one or more liposomes, wherein each liposome of the one more liposomes encapsulates different peptides comprising hexapeptide-11, hexapeptide-12, lactoferrin, a peptide derived from lactoferrin, or combinations thereof. In some embodiments, one or more photosomes encapsulates one or more liposomes encapsulating one or more peptides, wherein the one or more peptides comprises hexapeptide-11, hexapeptide-12, lactoferrin, a peptide derived from lactoferrin, or combinations thereof.

In some embodiments, one or more photosomes encapsulates one or more liposomes, wherein a first liposome of the one or more liposomes encapsulates hexapeptide-11. In some embodiments, one or more photosomes encapsulates one or more liposomes, wherein a first liposome of the one or more liposomes encapsulates hexapeptide-12. In some embodiments, one or more photosomes encapsulates one or more liposomes, wherein a first liposome of the one or more liposomes encapsulates lactoferrin. In some embodiments, one or more photosomes encapsulates one or more liposomes, wherein a first liposome of the one or more liposomes encapsulates a peptide derived from lactoferrin.

In some embodiments, one or more photosomes encapsulates one or more liposomes, wherein a first liposome of the one or more liposomes encapsulates hexapeptide-11 and a second liposome of the one or more liposomes encapsulates lactoferrin. In some embodiments, one or more photosomes encapsulates one or more liposomes, wherein a first liposome of the one or more liposomes encapsulates hexapeptide-11 and a second liposome of the one or more liposomes encapsulates hexapeptide-12. In some embodiments, one or more photosomes encapsulates one or more liposomes, wherein a first liposome of the one or more liposomes encapsulates hexapeptide-11 and a second liposome of the one or more liposomes encapsulates a peptide derived from lactoferrin. In some embodiments, one or more photosomes encapsulates one or more liposomes, wherein a first liposome of the one or more liposomes encapsulates hexapeptide-12 and a second liposome of the one or more liposomes encapsulates lactoferrin. In some embodiments, one or more photosomes encapsulates one or more liposomes, wherein a first liposome of the one or more liposomes encapsulates hexapeptide-12 and a second liposome of the one or more liposomes encapsulates a peptide derived from lactoferrin. In some embodiments, one or more photosomes encapsulates one or more liposomes, wherein a first liposome of the one or more liposomes encapsulates lactoferrin and a second liposome of the one or more liposomes encapsulates a peptide derived from lactoferrin.

In some embodiments, one or more photosomes encapsulates one or more liposomes, wherein a first liposome of the one or more liposomes encapsulates hexapeptide-11, a second liposome of the one or more liposomes encapsulates hexapeptide-12, and a third liposome of the one or more liposomes encapsulates a lactoferrin. In some embodiments, one or more photosomes encapsulates one or more liposomes, wherein a first liposome of the one or more liposomes encapsulates hexapeptide-11, a second liposome of the one or more liposomes encapsulates hexapeptide-12, and a third liposome of the one or more liposomes encapsulates a peptide derived from lactoferrin. In some embodiments, one or more photosomes encapsulates one or more liposomes, wherein a first liposome of the one or more liposomes encapsulates hexapeptide-11, a second liposome of the one or more liposomes encapsulates lactoferrin, and a third liposome of the one or more liposomes encapsulates a peptide derived from lactoferrin. In some embodiments, one or more photosomes encapsulates one or more liposomes, wherein a first liposome of the one or more liposomes encapsulates hexapeptide-12, a second liposome of the one or more liposomes encapsulates lactoferrin, and a third liposome of the one or more liposomes encapsulates a peptide derived from lactoferrin.

In some embodiments, one or more photosomes encapsulates one or more liposomes, wherein a first liposome of the one or more liposomes encapsulates hexapeptide-11, a second liposome of the one or more liposomes encapsulates hexapeptide-12, a third liposome of the one or more liposomes encapsulates lactoferrin, and a fourth liposome of the one or more liposomes encapsulates a peptide derived from lactoferrin.

In some embodiments, the average particle size of each of the liposomes of the one or more liposomes or each photosome of the one or more photosomes is 10, 20, 30, 40, 50, 60, 70, 80, 90, 100, 200, 300, 400, or 500 nanometers (nm). In some embodiments, the average particle size of each of the liposomes of the one or more liposomes or each photosome of the one or more photosomes is in a range of about 10 to about 500, about 20 to about 400, about 30 to about 300, or about 40 to about 200 nm. In some embodiments, the average particle size of each of the liposomes of the one or more liposomes or each photosome of the one or more photosomes is about 110 nm.

In some embodiments, the average particle size of each of the liposomes of the one or more liposomes or each photosome of the one or more photosomes is about or at least about 10, 20, 30, 40, 50, 60, 70, 80, 90, 100, 200, 300, 400, 500, 600, 700, 800, 900, or 1000 nanometers (nm). In some embodiments, the average particle size of each of the liposomes of the one or more liposomes or each photosome of the one or more photosomes is in a range of about 10 to about 1000, about 20 to about 900, about 30 to about 800, about 40 to about 700, about 50 to about 600, about 60 to about 500, about 70 to about 400, or about 80 to about 300 nm. In some embodiments, the average particle size of each of the liposomes of the one or more liposomes or each photosome of the one or more photosomes is about or at least about 220 nm.

In some embodiments, compositions described herein comprising one or more photosomes and one or more liposomes are prepared in one or more steps. In some embodiments, in a first step, one or more peptides, lactoferrin, a peptide derived from lactoferrin, or combinations thereof are combined. In some embodiments, the one or more peptides is hexapeptide-11. In some embodiments, the one or more peptides is hexapeptide-12. In some embodiments, the one or more peptides is hexapeptide-11 and hexapeptide-12. In some embodiments, in a second step, a second liposome is added. In some embodiments, the second liposome is a photosome.

Lecithin and other phospholipids may be used to prepare liposomes containing the peptide compositions as described herein. In some embodiments, liposomes are used to prepare one or more peptides. In some embodiments, the peptide is functionalized with an acetyl group. Formation of lipid vesicles occurs when phospholipids such as lecithin are placed in water and consequently form one bilayer or a series of bilayers, each separated by water molecules, once enough energy is supplied. Liposomes can be created by sonicating phospholipids in water. Low shear rates create multilamellar liposomes. Continued high-shear sonication tends to form smaller unilamellar liposomes. Hydrophobic chemicals can be dissolved into the phospholipid bilayer membrane. The lipid bilayers of the liposomes deliver the peptide compositions as described herein.

The phospholipids used to prepare the liposomal compositions described herein may comprise a transition phase temperature of about 10° C. to about 25° C. In some instances, the phospholipids comprise a transition phase temperature of about 10° C., 12° C., 14° C., 16° C., 18° C., 20° C., 22° C., 24° C., 26° C., 28° C., 30° C., 32° C., 34° C., 36° C., 38° C., 40° C., or more than 40° C. In some instances, the phospholipids comprise a transition phase temperature in a range of about 10° C. to about 40° C., about 12° C. to about 36° C., about 14° C. to about 32° C., about 16° C. to about 20° C., or about 21° C. to about 25° C.

The topical composition may contain micelles, or an aggregate of surfactant molecules dispersed in an aqueous solution. Micelles may be prepared by dispersing an oil solvent in an aqueous solution comprising a surfactant, where the surfactant concentration exceeds the critical micelle concentration. The resulting composition contains micelles, i.e., spherical oil droplets.

The liposomal composition may contain micelles, or an aggregate of surfactant molecules dispersed in an aqueous solution. Micelles may be prepared by dispersing an oil solvent in an aqueous solution comprising a surfactant, where the surfactant concentration exceeds the critical micelle concentration. The resulting formulation contains micelles, i.e., spherical oil droplets surrounded by a membrane of polar surfactant molecules, dispersed in the aqueous solvent.

Described herein, in some embodiments, are methods for preparing a composition comprising a peptide encapsulated in a liposome, comprising: combining the peptide and a solvent to form a mixture; and contacting the mixture with an aqueous solution comprising liposomes. In some instances, the contacting occurs at a temperature between about 10° C. and about 25° C. In some instances, the contacting occurs at a temperature of about 10° C., 12° C., 14° C., 16° C., 18° C., 20° C., 22° C., 24° C., 26° C., 28° C., 30° C., 32° C., 34° C., 36° C., 38° C., 40° C., or more than 40° C. In some instances, the contacting occurs at a temperature in a range of about 10° C. to about 40° C., about 12° C. to about 36° C., about 14° C. to about 32° C., about 16° C. to about 20° C., or about 21° C. to about 25° C.

Methods for preparing a composition comprising a peptide encapsulated in a liposome may comprise use of a solvent. In some instances, the solvent is water. In some instances, the solvent is an organic solvent. Exemplary organic solvents include, but are not limited to, petroleum ether, cyclohexane, toluene, carbon tetrachloride, dichloromethane, chloroform, diethyl ether, diisopropyl ether, ethyl acetate, butanol, n-propanol, ethanol, methanol, polyethylene glycol, propylene glycol, and pyridine. In some instances, the solvent is a glycol. In some instances, the solvent is butylene glycol. In some instances, the solvent is caprylyl glycol. In some instances, the solvent is propanediol (propylene glycol).

The solvent may be used at various percentages. In some instances, the solvent is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10%. The solvent may be propanediol, butylene glycol, or caprylyl glycol.

Methods as described herein, in some embodiments, comprises combining the peptide and a solvent to form a mixture; and contacting the mixture with an aqueous solution comprising liposomes, wherein the aqueous solution comprises a percentage of water and a percentage of liposomes. In some instances, the aqueous solution comprises at least or about 20%, 30%, 40%, 50%, 60%, 70%, 80%, 90%, or more than 90% water. In some instances, the aqueous solution comprises water in a range of about 10% to about 95%, about 20% to about 90%, about 30% to about 85%, about 40% to about 80%, or about 50% to about 60%. In some instances, the aqueous solution comprises at least or about 20%, 30%, 40%, 50%, 60%, or more than 60% liposomes. In some instances, the aqueous solution comprises liposomes in a range of about 10% to about 80%, about 20% to about 70%, or about 30% to about 60%. A ratio of liposomes to water may be in a range of about 1:9 to about 3:7. In some instances, the ratio of liposomes to water may be at least or about 1:10, 1:9, 1:8, 1:7, 1:6, 1:5, 1:4, 1:3, or 1:2.

Methods for generation of liposomal compositions as described herein may result in an entrapment efficacy of no more than 100%. In some instances, the entrapment efficacy is no more than 50%, 60%, 70%, 80%, 90%, 95%, 99%, or 99.5%.

Described herein are liposomal compositions, wherein the peptide comprises a percentage of the composition. In some embodiments, the peptide is provided at least or about 0.0001%, 0.0005%, 0.00055%, 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% of the composition. In some embodiments, the peptide is provided at least or about 10%, 11%, 12%, 13%, 14%, 15%, 16%, 17%, 18%, 19%, 20%, 22%, 24%, 26%, 28%, 30% or more than 30% of the composition. In some embodiments, the peptide is provided in a range of about 0.001% to about 6%, about 0.002% to about 4%, about 0.01% to about 5%, or about 0.02% to about 2% by weight. In some embodiments, the peptide is provided at about 0.03% of the composition.

Described herein are liposomal compositions, wherein the liposomes comprise a percentage of the composition. In some embodiments, the liposomes are provided at least or about 10%, 11%, 12%, 13%, 14%, 15%, 16%, 17%, 18%, 19%, 20%, 22%, 24%, 26%, 28%, 30% or more than 30% of the composition. In some embodiments, the liposomes are provided in a range of about 5% to about 90%, about 10% to about 80%, about 20% to about 70%, about 30% to about 60%, about 10% to about 30%, or about 20% to about 40%.

Liposomal compositions as described herein, in some embodiments, comprise an average particle size of at most 220 nanometers (nm). In some instances, the average particle size is at most 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, 200 nm, 205 nm, 210 nm, 215 nm, 220 nm, 230 nm, 240 nm, 250 nm, 260 nm, 270 nm, 280 nm, 290 nm, 300 nm, 320 nm, 340 nm, 360 nm, 380 nm, or 400 nm. In some instances, the average particle size is about 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, 200 nm, 205 nm, 210 nm, 215 nm, 220 nm, 230 nm, 240 nm, 250 nm, 260 nm, 270 nm, 280 nm, 290 nm, 300 nm, 320 nm, 340 nm, 360 nm, 380 nm, or 400 nm. In some instances, the average particle size is in a range of about 50 nm to about 500 nm, about 100 nm to about 400 nm, about 150 nm to about 220 nm, about 180 nm to about 220 nm, or about 190 nm to about 210 nm.

In some instances, the liposomal compositions comprise an active agent that has a molecular weight of no more than about 600 Daltons (Da). In some instances, the active agent has a molecular weight of at least or about 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, or more than 1000 Daltons (Da). In some instances, the active agent has a molecular weight of at least or about 1000, 1100, 1200, 1300, 1400, 1500, 1600, 1700, 1800, 1900, 2000, 2100, 2200, 2300, 2400, 2500, 2600, 2700, 2800, 2900, 3000, 4000, 5000, 6000, or more than 6000 Daltons (Da). In some instances, the active agent has a molecular weight in a range of about 50 to about 1000, about 100 to about 900, about 200 to about 800, about 300 to about 700, or about 400 to about 600 Daltons (Da). In some instances, the active agent is a peptide. In some instances, the active agent is a peptide encapsulated in a liposome.

A polydispersity index (PdI) of a liposomal composition as described herein, in some embodiments, is in a range of 0 to about 0.2. In some instances, the polydispersity index is about 0.01, 0.025, 0.05, 0.1, 0.25, 0.3, 0.35, 0.4, 0.45, 0.5, 0.55, 0.6, 0.65, 0.7, 0.75, or 0.8. In some instances, the polydispersity index is in a range of about 0.01 to about 0.8, about 0.025 to about 0.75, about 0.05 to about 0.6, or about 0.1 to about 0.3.

In some instances, an intercept of a liposomal composition as described herein is in a range of about 0.85 to about 0.95. In some instances, the intercept is the amplitude. In some instances, the intercept is at least or about 0.65, 0.70, 0.75, 0.80, 0.85, 0.90, or 0.95.

In some embodiments, the liposomes comprise propanediol, lecithin, or a combination thereof. In some embodiments, the propanediol is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, the propanediol is provided in a range of about 0.001% to about 6%, about 0.002% to about 4%, about 0.01% to about 3%, or about 0.02% to about 2% by weight. In some embodiments, the lecithin is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, the lecithin is provided in a range of about 0.001% to about 6%, about 0.002% to about 4%, about 0.01% to about 3%, or about 0.02% to about 2% by weight. In some embodiments, the liposomes comprise propanediol and lecithin. In some embodiments, the propanediol and lecithin are provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, the propanediol and lecithin are provided in a range of about 0.001% to about 6%, about 0.002% to about 4%, about 0.01% to about 3%, or about 0.02% to about 2% by weight. In some embodiments, the propanediol and lecithin are provided at about 0.90% by weight.

Described herein are liposomal compositions comprising improved distribution, efficacy, bioavailability, and/or activity. The liposomal compositions may comprise improved distribution, efficacy, bioavailability, and/or activity as compared to compositions not comprising liposomes. In some instances, the distribution is improved by at least or about 0.5×, 1.0×, 1.5×, 2.0×, 2.5×, 3.0×, 4.0×, 4.5×, 5×, or more than 5× as compared to compositions not comprising liposomes. In some instances, the efficacy is improved by at least or about 0.5×, 1.0×, 1.5×, 2.0×, 2.5×, 3.0×, 4.0×, 4.5×, 5×, or more than 5× as compared to compositions not comprising liposomes. In some instances, the bioavailability is improved by at least or about 0.5×, 1.0×, 1.5×, 2.0×, 2.5×, 3.0×, 4.0×, 4.5×, 5×, or more than 5× as compared to compositions not comprising liposomes. In some instances, the activity is improved by at least or about 0.5×, 1.0×, 1.5×, 2.0×, 2.5×, 3.0×, 4.0×, 4.5×, 5×, or more than 5× as compared to compositions not comprising liposomes. The distribution, efficacy, bioavailability, and/or activity may be improved by at least or about 10%, 15%, 20%, 25%, 30%, 35%, 40%, 45%, 50%, 55%, 60%, 65%, 70%, 75%, 80%, 85%, 90%, or more than 90% as compared to compositions not comprising liposomes.

Liposomal compositions and methods as described herein, in some embodiments, are topical compositions. In some instances, the liposomal compositions are oil free. In some instances, the liposomal compositions are preservative free. In some embodiments, the liposomal formulation is an aqueous formulation. In some embodiments, the liposomal formulation is an anhydrous formulation. In some instances, the liposomal composition comprises a pH in a range of about 5 to about 8. In some instances, the liposomal composition comprises a pH of at least or about 2, 3, 4, 5, 6, 7, 8, 9, or 10.

Methods and compositions as described herein may result in improved follicular penetration. In some instances, the follicular penetration is improved by at least or about 0.5×, 1.0×, 1.5×, 2.0×, 2.5×, 3.0×, 4.0×, 4.5×, 5×, or more than 5×. The follicular penetration may be improved by at least or about 10%, 15%, 20%, 25%, 30%, 35%, 40%, 45%, 50%, 55%, 60%, 65%, 70%, 75%, 80%, 85%, 90%, or more than 90%. In some instances, compositions result in follicular penetration of a depth of at least or about 0.5, 0.75, 1, 1.25, 1.5, 2, 2.5, 3, 3.5, 4, 4.5, 5, 5.5, 6, 7, 8, 9, 10, or more than 10 millimeters.

Other Components

Other components can include anti-inflammatory agents, antioxidants, and solubility enhancers. Exemplary anti-irritation agents include, but are not limited to, panthenyl triacetate and naringenin. Panthenyl triacetate and naringenin are natural plant extracts that reduce redness and water loss through the skin. Typical amounts for anti-irritation agents when employed in compositions are from 1% by weight to 4% by weight (wt. %).

Exemplary antioxidant agents include, but are not limited to, *Dunaliella salina* extract and squalane. *Dunaliella salina* extract includes components such as beta carotenes. It can exhibit an antioxidant effect. Typical amounts for anti-inflammatory agents when employed in compositions are from 0.1% by weight to 2.5% by weight (wt. %). In some embodiments, the *Dunaliella salina* extract is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight. In some embodiments, the *Dunaliella salina* extract is provided in a range of about 0.001% to about 4.0%, about 0.01% to about 3.0%, about 0.1% to about 2.5%, or about 0.50% to about 1.5%. In some embodiments, the squalane is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight. In some embodiments, the squalane is provided in a range of about 0.001% to about 4.0%, about 0.01% to about 3.0%, about 0.1% to about 2.5%, or about 0.50% to about 1.5%. In some embodiments, the *Dunaliella salina* extract and the squalane is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight. In some embodiments, the *Dunaliella salina* and the squalane extract is provided in a range of about 0.001% to about 4.0%, about 0.01% to about 3.0%, about 0.1% to about 2.5%, or about 0.50% to about 1.5%.

In some embodiments, the peptides are in admixture with a suitable carrier, diluent, or excipient, and can contain auxiliary substances such as wetting or emulsifying agents, pH buffering agents, gelling or viscosity enhancing additives, preservatives, scenting agents, colors, and the like, depending upon the route of administration and the preparation desired. See, e.g., "Remington: The Science and Practice of Pharmacy", Lippincott Williams & Wilkins; 20th edition (Jun. 1, 2003) and "Remington's Pharmaceutical Sciences," Mack Pub. Co.; 18th and 19th editions (December 1985, and June 1990, respectively). Such preparations can include complexing agents, metal ions, polymeric compounds such as polyacetic acid, polyglycolic acid, hydrogels, dextran, and the like, liposomes, microemulsions, micelles, unilamellar or multilamellar vesicles, erythrocyte ghosts or spheroblasts. Suitable lipids for compositions include, without limitation, monoglycerides, diglycerides, sulfatides, lysolecithin, phospholipids, saponin, bile acids, and the like. In some embodiments, compositions described herein comprise, phosphatidylserine, phospholipids, tocopherol, ascorbyl palmitate, or combinations thereof. In some embodiments, phosphatidylserine, phospholipids, tocopherol, ascorbyl palmitate, or combinations thereof is provided at 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the phosphatidylserine, phospholipids, tocopherol, ascorbyl palmitate, or combinations thereof is provided in a range of about 0.25% to about 10%, about 0.5% to about 8%, about 0.75% to about 6%, or about 1% to about 4% by weight. In some embodiments, the phosphatidylserine, phospholipids, tocopherol, ascorbyl palmitate, or combinations thereof is provided in a range of about 0.001% to about 6%, about 0.002% to about 4%, about 0.01% to about 3%, or about 0.02% to about 5% by weight. In some embodiments, the additive is betaine. Betaine, in some embodiments, is provided in a range of about 0.001% to about 6%, about 0.002% to about 4%, about 0.01% to about 3%, or about 0.02% to about 5% by weight. In some embodiments, the compositions as described herein comprise caprylyl glycol. In some embodiments, the caprylyl glycol provided in a range of about 0.001% to about 6%, about 0.002% to about 4%, about 0.01% to about 3%, or about 0.02% to about 5% by weight. In some embodiments, the compositions as described herein comprise caprylhydroxamic acid. In some embodiments, the caprylhydroxamic acid provided in a range of about 0.001% to about 6%, about 0.002% to about 4%, about 0.01% to about 3%, or about 0.02% to about 5% by weight. The presence of such additional components can influence the physical state, solubility, stability, rate of release, rate of clearance, and penetration of active ingredients.

The compositions for topical administration comprise the peptide compositions as described herein and a dermatologically acceptable vehicle. The vehicle may be aqueous or nonaqueous. The dermatologically acceptable vehicle used in the topical composition may be in the form of a lotion, a gel, an ointment, a liquid, a cream, or an emulsion. If the vehicle is an emulsion, the emulsion may have a continuous aqueous phase and a discontinuous nonaqueous or oil phase (oil-in-water emulsion), or a continuous nonaqueous or oil phase and a discontinuous aqueous phase (water-in-oil emulsion). When administered topically in liquid or gel form, a liquid carrier such as water, petroleum, oils of animal or plant origin such as peanut oil, mineral oil, soybean oil, or sesame oil, or synthetic oils can be added to the active ingredient(s). Physiological saline solution, dextrose, or other saccharide solution, or glycols such as ethylene glycol, propylene glycol, or polyethylene glycol are also suitable liquid carriers. The pharmaceutical compositions can also be in the form of oil-in-water emulsions. The oily phase can be a vegetable oil, such as olive or arachis oil, a mineral oil such as liquid paraffin, or a mixture thereof. Suitable emulsifying agents include naturally-occurring gums such as gum acacia and gum tragacanth, naturally occurring phosphatides, such as soybean lecithin, esters or partial esters derived from fatty acids and hexitol anhydrides, such as sorbitan mono-oleate, and condensation products of these partial esters with ethylene oxide, such as polyoxyethylene sorbitan mono-oleate. The emulsions can also contain coloring and scenting agents.

In certain embodiments, a silicone elastomer (e.g., dimethicone crosspolymer) is employed to increase delivery and penetration of the peptides into the skin. An alternative to increasing molecular weight (as with silicone gums) or adding filler (as with silicone compounds) is to partially crosslink siloxane polymers and disperse this material in an appropriate silicone carrier fluid. The resulting dimethicone crosspolymers (also known as silicone elastomers in the personal care industry) differ from basic polydimethylsiloxane (PDMS) because of the cross-linking between the linear polymers. These materials can be employed in peptide compositions, and also offer benefits in scar treatment, periwound protection and enzyme delivery. In skin care applications, the aesthetics of silicone elastomers (including those with functional groups) and their ability to absorb various oils (e.g., with a dimethicone/vinyl dimethicone crosspolymer such as Dow Corning® 9506 Elastomer Powder) are two of the elastomer's desirable properties. Silicone elastomers have a skin feel different from any of the silicone fluids, described as "smooth," "velvety," and "powdery." It can be modified by controlling the amount of liquid phase in the formula, and therefore the degree of swelling. Due to their film-forming properties, dimethicone crosspolymers can be used as delivery systems for active ingredients such as the peptides described herein, or other composition components such as oil-soluble vitamins and sunscreens. Sunscreens such as octyl methoxycinnamate can be more efficiently delivered from a composition containing a silicone elastomer, producing a higher sun protection factor (SPF). Silicone elastomer blends can be used to enhance SPF in oil-in-water compositions containing organic sunscreens. For example, in testing conducted regarding SPF, the addition of 4% silicone elastomer blend to a sun care composition containing organic sunscreens increased the SPF from 5.7 to 18. This property of the silicone elastomer allows the effectiveness of sunscreen agents in a composition to be maximized while reducing the amount needed to achieve a desired SPF. As a result, composition costs can be reduced along with potential irritation caused by sunscreen actives. Accordingly, a higher SPF can be achieved with the same amount of UV absorber, resulting in enhanced performance with no added composition cost. Silicone elastomers can be produced from linear silicone polymers by a variety of crosslinking reactions, e.g., by a hydrosilylation reaction in which a vinyl group reacts with a silicon hydride. The general process involves linear silicone polymers with reactive sites along the polymer chain reacting with a crosslinker. The dimethicone crosspolymer can be produced either as a gel made of a suspension of elastomer particles swollen in a carrier fluid (e.g., a mixture of high molecular weight silicone elastomer in cyclopentasiloxane such as Dow Corning® 9040 Silicone Elastomer Blend), or as a spray-dried powder (a dimethicone/vinyl dimethicone crosspolymer such as Dow Corning® 9506 Elastomer Powder). The gel form having desirable attributes is cyclomethicone, but low viscosity dimethicones and organic fluids can also be used. Examples of dimethicone crosspolymers in the suspension or gel form are high molecular weight silicone elastomer (12%) in decamethylcyclopentasiloxane (e.g., Dow Corning® ST-Elastomer 10) and a mixture of high molecular weight silicone elastomer in cyclopentasiloxane (e.g., Dow Corning® 9040 Silicone Elastomer Blend), which typically have an elastomer content ranging from 10 to 20% by weight.

In some embodiments, the composition comprises a siloxane polymer. In some embodiments, the siloxane polymer is caprylyl methicone. In some embodiments, caprylyl methicone is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4.0% by weight (wt. %). In some embodiments, the caprylyl methicone is provided at about 0.5% by weight. In some embodiments, the caprylyl methicone is provided in a range of about 0.001% to about 4.0%, about 0.01% to about 3.0%, about 0.1% to about 2.5%, or about 0.50% to about 1.5% by weight. In some embodiments, the caprylyl methicone is provided at about 0.25% by weight. In some embodiments, the caprylyl methicone is provided at about 1% by weight.

Bentonite clays can be employed in conjunction with the peptides to provide impart penetration and adsorption properties to the compositions, and can aid in stabilizing emulsions. Other clays, such as hectorite and magnesium aluminum silicate can also be employed. Bentonite or other clays can be modified to yield an organic modified clay compound. Salts (e.g., quaternary ammonium salts) of fatty acids (e.g., hydrogenated fatty acids) can be reacted with hectorite or other clays. As provided herein, fatty acids are referred to and described using conventional nomenclature as is employed by one of skill in the art. A saturated fatty acid includes no carbon-carbon double bonds. An unsaturated fatty acid includes at least one carbon-carbon double bond. A monounsaturated fatty acid includes only one carbon-carbon double bond. A polyunsaturated fatty acid includes two or more carbon-carbon double bonds. Double bonds in fatty acids are generally cis; however, trans double bonds are also possible. The position of double bonds can be indicated by $\Delta n$, where n indicates the lower numbered carbon of each pair of double-bonded carbon atoms. A shorthand notation specifying total #carbons: #double bonds, $\Delta_{double\ bond\ positions}$ can be employed. For example, $20:4\Delta_{5,8,11,14}$ refers to a fatty acid having 20 carbon atoms and four double bonds, with the double bonds situated between the 5 and 6 carbon atom, the 8 and 9 carbon atom, the 11 and 12 carbon atom, and the 14 and 15 carbon atom, with carbon atom 1 being the carbon of the carboxylic acid group. Stearate (octadecanoate) is a saturated fatty acid. Oleate (cis-$\Delta$9-octadecenoate) is a monounsaturated fatty acid, linolenate (all-cis-$\Delta$9,12,15-octadecatrienoate) is a polyunsaturated fatty acid. Fatty acids suitable for use can comprise from 5 to 30 carbon atoms, e.g., 5, 6, 7, 8, 9, 10, 11, 12, 13, 14, 15, 16, 17, 18, 19, 20, 21, 22, 23, 24, 25, 26, 27, 28, 29, or 30 carbon atoms. The fatty acid can be fully saturated, or can include as many double bonds as are feasible for the chain length. Fatty acids suitable for functionalizing hectorite or other clays include palmitic acid and stearic acid. Dialkyl quaternary cationic modifiers include dipalmoyldimonium chloride and distearyldimonium chloride. Amidoamine quaternary cationic modifiers include palmitamidopropyltrimonium chloride cetearyl alcohol and palmitamidopropyltrimonium chloride.

The pharmaceutical excipients used in the topical preparations of the peptide compositions may be selected from the group consisting of solvents, emollients and/or emulsifiers, oil bases, preservatives, antioxidants, tonicity adjusters, penetration enhancers and solubilizers, chelating agents, buffering agents, surfactants, one or more polymers, and combinations thereof.

Suitable solvents for an aqueous or hydrophilic liposomal composition include water; ethyl alcohol; isopropyl alcohol; mixtures of water and ethyl and/or isopropyl alcohols; glycerin; ethylene, propylene or butylene glycols; DMSO; and mixtures thereof. In some embodiments, glycerin is provided at least or about 1%, 2%, 3%, 4%, 5%, 6%, 7%, 8%, 9%, 10%, 11%, 12%, or more than 12% by weight (wt. %). In some embodiments, glycerin is provided at least or about 7%. In some embodiments, glycerin is provided in a range of about 1% to about 12%, about 2% to about 11%, or about 3% to about 10% by weight. In some embodiments, butylene glycol is provided at least or about 0.0025%, 0.005%, 0.075%, 0.01%, 0.025%, 0.05%, 0.75%, 1%, 2%, 3%, 4%, 5%, 6%, 7%, 8%, 9%, 10%, 11%, 12%, or more than 12% by weight. In some embodiments, butylene glycol is provided in a range of about 0.01% to about 10%, about 0.025% to about 5%, or about 0.05% to about 1.25% by weight. Suitable solvents for hydrophobic compositions include mineral oils, vegetable oils, and silicone oils. If desired, the peptide compositions as described herein may be dissolved or dispersed in a hydrophobic oil phase, and the oil phase may then be emulsified in an aqueous phase comprising water, alone or in combination with lower alcohols, glycerin, and/or glycols. In some embodiments, an anhydrous composition is applied as the presence of water can result in stinging upon administration to skin tissues subject to laser treatment, chemical peel, dermabrasion, or the like. Anhydrous compositions may also act to prevent the development of water-based irritant contact dermatitis in damaged or sensitive skin, which may produce rashes and skin irritation that may retard wound healing and improvement in skin quality. Tsai, T. F., Maibach, H. I. How irritant is water? An overview. Contact Dermatitis 41(6) (1999): 311-314 (describing contact dermatitis caused by water as an irritant). However, in certain embodiments it may be acceptable to provide water based compositions, or to permit a limited amount of water to be present. For example, water may be present, but at amounts below the threshold at which a stinging sensation when applied to damaged skin may result. Osmotic shock or osmotic stress is a sudden change in the solute concentration around a cell, causing a rapid change in the movement of water across its cell membrane. Under conditions of high concentrations of either salts, substrates or any solute in the supernatant, water is drawn out of the cells through osmosis. This also inhibits the transport of substrates and cofactors into the cell thus "shocking" the cell. Alternatively, at low concentrations of solutes, water enters the cell in large amounts, causing it to swell and either burst or undergo apoptosis. Certain of the compositions as described herein can be advantageously employed where it is desirable to minimize osmotic shock.

Compositions as described herein may comprise varying amounts of solvent. In some embodiments, the solvent is water. In some embodiments, the solvent is at least or about 10%, 15%, 20%, 25%, 30%, 35%, 40%, 45%, 50%, 55%, 60%, 65%, 70%, 75%, 80%, 85%, 90%, 95%, or more than 95% by weight (wt. %). In some embodiments, the solvent is in a range of about 10% to about 95%, about 20% to about 90%, about 30% to about 85%, about 40% to about 80%, or about 50% to about 75% by weight.

Viscosity of the compositions can be maintained at the selected level using a pharmaceutically acceptable thickening agent. Suitable viscosity enhancers or thickeners which may be used to prepare a viscous gel or cream with an aqueous base include sodium polyacrylate, xanthan gum, polyvinyl pyrrolidone, acrylic acid polymer, carrageenans, hydroxyethyl cellulose, hydroxypropyl cellulose, methyl cellulose, ethyl cellulose, propyl cellulose, hydroxypropyl methyl cellulose, polyethoxylated polyacrylamides, polyethoxylated acrylates, and polyethoxylated alkane thiols. Methylcellulose is preferred because it is readily and economically available and is easy to work with. Other suitable thickening agents include, for example, xanthan gum, carboxymethyl cellulose, hydroxypropyl cellulose, carbomer, and the like. The preferred concentration of the thickener will depend upon the thickening agent selected. An amount is preferably used that will achieve the selected viscosity. Viscous compositions are normally prepared from solutions by the addition of such thickening agents, or by employing a base that has an acceptable level of viscosity.

The viscosity of the compositions as described herein, in some embodiments, are in a range of about 8,000 centipoise (cps) to about 30,000 cps. In some embodiments, the viscosity is at least or about 4,000; 5,000; 6,000; 7,000; 8,000; 9,000; 10,000; 11,000; 12,000; 13,000; 14,000; 15,000; 16,000; 17,000; 18,000; 19,000; 20,000; 21,000; 22,000; 23,000; 24,000; 25,000; 26,000; 27,000; 28,000; 29,000; 30,000; 31,000; 32,000; 33,000; 34,000, 35,000; 36,000; 37,000; 38,000; 39,000; 40,000; or more than 40,000 cps. In some embodiments, the composition comprises a viscosity in a range of about 4,000 to about 40,000, about 6,000 to about 38,000, about 8,000 to about 36,000, about 10,000 to about 34,000 cps, about 12,000 to about 32,000 cps, or about 14,000 to about 30,000 cps.

Suitable emollients include hydrocarbon oils and waxes such as mineral oil, petrolatum, paraffin, ceresin, ozokerite, microcrystalline wax, polyethylene, squalene, perhydrosqualene, silicone oils, triglyceride esters, acetoglyceride esters, such as acetylated monoglycerides; ethoxylated glycerides, such as ethoxylated glyceryl monostearate; alkyl esters of fatty acids or dicarboxylic acids. In some embodiments, the emollient is caprylic/capric triglyceride.

In some embodiments, the emollient is provided at least or about 0.0025%, 0.005%, 0.075%, 0.01%, 0.025%, 0.05%, 0.75%, 1%, 2%, 3%, 4%, 5%, 6%, 7%, 8%, 9%, 10%, 11%, 12%, or more than 12% by weight. In some embodiments, the emollient is provided in a range of about 0.01% to about 10%, about 0.01% to about 2.5%, about 0.025% to about 5%, or about 0.05% to about 1.25% by weight. In some embodiments, the caprylic/capric triglyceride is provided at least or about 0.0025%, 0.005%, 0.075%, 0.01%, 0.025%, 0.05%, 0.75%, 1%, 2%, 3%, 4%, 5%, 6%, 7%, 8%, 9%, 10%, 11%, 12%, or more than 12% by weight. In some embodiments, the caprylic/capric triglyceride is provided in a range of about 0.01% to about 10%, about 0.01% to about 2.5%, about 0.025% to about 5%, or about 0.05% to about 1.25% by weight.

Suitable silicone oils for use as emollients include dimethyl polysiloxanes, methyl(phenyl) polysiloxanes, and water-soluble and alcohol-soluble silicone glycol copolymers. Suitable triglyceride esters for use as emollients include vegetable and animal fats and oils including castor oil, safflower oil, cotton seed oil, corn oil, olive oil, cod liver oil, almond oil, avocado oil, palm oil, sesame oil, and soybean oil.

Suitable esters of carboxylic acids or diacids for use as emollients include methyl, isopropyl, and butyl esters of fatty acids. Specific examples of alkyl esters including hexyl laurate, isohexyl laurate, iso-hexyl palmitate, isopropyl palmitate, decyl oleate, isodecyl oleate, hexadecyl stearate, decyl stearate, isopropyl isostearate, dilauryl lactate, myristyl lactate, and cetyl lactate; and alkenyl esters of fatty acids such as oleyl myristate, oleyl stearate, and oleyl oleate. Specific examples of alkyl esters of diacids include diisopropyl adipate, diisohexyl adipate, bis(hexyldecyl) adipate, and diisopropyl sebacate.

Other suitable classes of emollients or emulsifiers which may be used in the compositions include fatty acids, fatty alcohols, fatty alcohol ethers, ethoxylated fatty alcohols, fatty acid esters of ethoxylated fatty alcohols, and waxes.

Specific examples of fatty acids for use as emollients include pelargonic, lauric, myristic, palmitic, stearic, isostearic, hydroxystearic, oleic, linoleic, ricinoleic, arachidic, behenic, and erucic acids. Specific examples of fatty alcohols for use as emollients include lauryl, myristyl, cetyl, hexadecyl, stearyl, isostearyl, hydroxystearyl, oleyl, ricinoleyl, behenyl, and erucyl alcohols, as well as 2-octyl dodecanol.

Specific examples of waxes suitable for use as emollients include lanolin and derivatives thereof including lanolin oil, lanolin wax, lanolin alcohols, lanolin fatty acids, isopropyl lanolate, ethoxylated lanolin, ethoxylated lanolin alcohols, ethoxolated cholesterol, propoxylated lanolin alcohols, acetylated lanolin, acetylated lanolin alcohols, lanolin alcohols linoleate, lanolin alcohols recinoleate, acetate of lanolin alcohols recinoleate, acetate of lanolin alcohols recinoleate, acetate of ethoxylated alcohols esters, hydrogenolysates of lanolin, hydrogenated lanolin, ethoxylated hydrogenated lanolin, ethoxylated sorbitol lanolin, and liquid and semi-solid lanolin. Also usable as waxes include hydrocarbon waxes, ester waxes, and amide waxes. Useful waxes include wax esters such as beeswax, spermaceti, myristyl myristate and stearyl stearate; beeswax derivatives, e.g., polyoxyethylene sorbitol beeswax; and vegetable waxes including carnauba and candellila waxes.

Polyhydric alcohols and polyether derivatives may be used as solvents and/or surfactants in the compositions. Suitable polyhydric alcohols and polyethers include propylene glycol, dipropylene glycol, polypropylene glycols 2000 and 4000, poly(oxyethylene-co-oxypropylene) glycols, glycerol, sorbitol, ethoxylated sorbitol, hydroxypropylsorbitol, polyethylene glycols 200-6000, methoxy polyethylene glycols 350, 550, 750, 2000 and 5000, poly[ethylene oxide] homopolymers (100,000-5,000,000), polyalkylene glycols and derivatives, hexylene glycol, 2-methyl-2,4-pentanediol, 1,3-butylene glycol, 1,2,6-hexanetriol, 2-ethyl-1,3-hexanediol, vicinal glycols having 15 to 18 carbon atoms, and polyoxypropylene derivatives of trimethylolpropane.

Polyhydric alcohol esters may be used as emulsifiers or emollients. Suitable polyhydric alcohol esters include ethylene glycol mono- and di-fatty acid esters, diethylene glycol mono- and di-fatty acid esters, polyethylene glycol (200-6000) mono- and di-fatty acid esters, propylene glycol mono- and di-fatty esters, polypropylene glycol 2000 monooleate, polypropylene glycol 2000 monostearate, ethoxylated propylene glycol monostearate, glyceryl mono- and di-fatty acid esters, polyglycerol poly-fatty acid esters, ethoxylated glyceryl monostearate, 1,3-butylene glycol monostearate, 1,3-butylene glycol distearate, polyoxyethylene polyol fatty acid ester, sorbitan fatty acid esters, and polyoxyethylene sorbitan fatty acid esters.

Suitable emulsifiers for use in compositions include anionic, cationic, nonionic, and zwitterionic surfactants. Preferred ionic emulsifiers include phospholipids, such as lecithin and derivatives.

Sterols including, for example, cholesterol and cholesterol fatty acid esters; amides such as fatty acid amides, ethoxylated fatty acid amides, and fatty acid alkanolamides may also be used as emollients and/or penetration enhancers.

A pharmaceutically acceptable preservative can be employed to increase the shelf life of the composition. Other suitable preservatives and/or antioxidants for use in compositions include benzalkonium chloride, benzyl alcohol, phenol, urea, parabens, butylated hydroxytoluene (BHT), butylated hydroxyanisole (BHA), tocopherol, thimerosal, chlorobutanol, or the like, and mixtures thereof, can be employed. If a preservative, such as an antioxidant, is employed, the concentration is typically from about 0.02% to about 2% based on the total weight of the composition, although larger or smaller amounts can be desirable depending upon the agent selected. Reducing agents, as described herein, can be advantageously used to maintain good shelf life of the composition. It is generally observed that the anhydrous compositions of the embodiments exhibit satisfactory stability, such that a preservative can be omitted from the composition.

Suitable chelating agents for use in compositions include ethylene diamine tetraacetic acid, alkali metal salts thereof alkaline earth metal salts thereof, ammonium salts thereof, and tetraalkyl ammonium salts thereof. In some embodiments, the chelating agent is disodium ethylenediaminetetraacetic acid (EDTA). In some embodiments, the disodium EDTA is provided at least or about 0.001%, 0.005%, 0.01%, 0.02%, 0.05%, 0.10%, 0.20%, 0.25%, 0.50%, 0.75%, 1.0%, 1.5%, 2.0%, 2.5%, 3.0%, 3.5%, 4.0%, or more than 4% by weight (wt. %). In some embodiments, the disodium EDTA is provided in a range of about 0.25% to about 10%, about 0.1% to about 2.5%, about 0.5% to about 8%, about 0.75% to about 6%, or about 1% to about 4% by weight. In some embodiments, the disodium EDTA is provided in a range of about 0.001% to about 6%, about 0.002% to about 4%, about 0.01% to about 3%, or about 0.02% to about 2% by weight.

The carrier preferably has a pH of between about 4.0 and 10.0, more preferably between about 4.8 and about 7.8, more preferably between about 5.0 to about 6.5. The pH may be controlled using buffer solutions or other pH modifying agents. Suitable pH modifying agents include phosphoric acid and/or phosphate salts, citric acid and/or citrate salts, hydroxide salts (i.e., calcium hydroxide, sodium hydroxide, potassium hydroxide) and amines, such as triethanolamine. Suitable buffer solutions include a buffer comprising a solution of monopotassium phosphate and dipotassium phosphate, maintaining a pH of between 5.8 and 8; and a buffer comprising a solution of monosodium phosphate and disodium phosphate, maintaining a pH of between 6 and 7.5. Other buffers include citric acid/sodium citrate, and dibasic sodium phosphate/citric acid. The peptide compositions of the embodiments are preferably isotonic with the blood or other body fluid of the recipient. The isotonicity of the compositions can be attained using sodium tartrate, propylene glycol or other inorganic or organic solutes. Sodium chloride is particularly preferred. Buffering agents can be employed, such as acetic acid and salts, citric acid and salts, boric acid and salts, and phosphoric acid and salts. It can be desirable to include a reducing agent in the composition, such as vitamin C, vitamin E, or other reducing agents as are known in the pharmaceutical arts.

Surfactants can also be employed as excipients, for example, anionic detergents such as sodium lauryl sulfate, dioctyl sodium sulfosuccinate and dioctyl sodium sulfonate, cationic such as benzalkonium chloride or benzethonium chloride, or nonionic detergents such as polyoxyethylene hydrogenated castor oil, glycerol monostearate, polysorbates, sucrose fatty acid ester, methyl cellulose, or carboxymethyl cellulose.

In certain embodiments, it can be advantageous to include additional agents having pharmacological activity. Anti-infective agents include, but are not limited to, anthelmintic (mebendazole), antibiotics including aminoglycosides (gentamicin, neomycin, tobramycin), antifungal antibiotics (amphotericin b, fluconazole, griseofulvin, itraconazole, ketoconazole, nystatin, micatin, tolnaftate), cephalosporins (cefaclor, cefazolin, cefotaxime, ceftazidime, ceftriaxone, cefuroxime, cephalexin), beta-lactam antibiotics (cefotetan, meropenem), chloramphenicol, macrolides (azithromycin, clarithromycin, erythromycin), penicillins (penicillin G sodium salt, amoxicillin, ampicillin, dicloxacillin, nafcillin, piperacillin, ticarcillin), tetracyclines (doxycycline, minocycline, tetracycline), bacitracin, clindamycin, colistimethate sodium, polymyxin b sulfate, vancomycin, antivirals including acyclovir, amantadine, didanosine, efavirenz, foscarnet, ganciclovir, indinavir, lamivudine, nelfinavir, ritonavir, saquinavir, stavudine, valacyclovir, valganciclovir, zidovudine, quinolones (ciprofloxacin, levofloxacin), sulfonamides (sulfadiazine, sulfisoxazole), sulfones (dapsone), furazolidone, metronidazole, pentamidine, sulfanilamidum crystallinum, gatifloxacin, and sulfamethoxazole/trimethoprim. Anesthetics can include, but are not limited to, ethanol, bupivacaine, chloroprocaine, levobupivacaine, lidocaine, mepivacaine, procaine, ropivacaine, tetracaine, desflurane, isoflurane, ketamine, propofol, sevoflurane, codeine, fentanyl, hydromorphone, marcaine, meperidine, methadone, morphine, oxycodone, remifentanil, sufentanil, butorphanol, nalbuphine, tramadol, benzocaine, dibucaine, ethyl chloride, xylocaine, and phenazopyridine. Anti-inflammatory agents include but are not limited to, nonsteroidal anti-inflammatory drugs (NSAIDs) such as aspirin, celecoxib, choline magnesium trisalicylate, diclofenac potassium, diclofenac sodium, diflunisal, etodolac, fenoprofen, flurbiprofen, ibuprofen, indomethacin, ketoprofen, ketorolac, melenamic acid, nabumetone, naproxen, naproxen sodium, oxaprozin, piroxicam, rofecoxib, salsalate, sulindac, and tolmetin; and corticosteroids such as cortisone, hydrocortisone, methylprednisolone, prednisone, prednisolone, betamethesone, beclomethasone dipropionate, budesonide, dexamethasone sodium phosphate, flunisolide, fluticasone propionate, triamcinolone acetonide, betamethasone, fluocinonide, betamethasone dipropionate, betamethasone valerate, desonide, desoximetasone, fluocinolone, triamcinolone, clobetasol propionate, and dexamethasone.

In certain embodiments, the addition of emollients, emulsion stabilizers, moisturizers, excipients, and other compounds may be modified to enhance the sensory properties of the topical compositions, including but not limited to: skin feel (such as silkiness, lightness, creaminess), absorbency (required time at which product loses wet feel and is no longer perceived on skin), consistency, firmness, spreadability (e.g. viscosity, flow onset, shear rates), stickiness, integrity of shape, glossiness, hydrophilicity or hydrophobicity, and others. Preferably, compositions will have high spreadability and low viscosity properties. Compositions with such properties have been demonstrated to have an enhanced "silky" or "light" skin feel rating (see e.g. Bekker, M. Webber, G., Louw, N. Relating rheological measurements to primary and secondary skin feeling when mineral-based and Fischer-Tropsch wax-based cosmetic emulsions and jellies are applied to the skin, International Journal of Cosmetic Science 2013, 35 (4), pp. 354-61).

In some embodiments, compositions comprise phenoxyethanol, ethylhexylglycerin, or combinations thereof. In some embodiments, phenoxyethanol is provided at least or about 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, phenoxyethanol is provided in a range of about 0.25% to about 10%, about 0.5% to about 8%, about 0.75% to about 6%, or about 1% to about 4% by weight. In some embodiments, ethylhexylglycerin is provided at least or about 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, ethylhexylglycerin is provided in a range of about 0.25% to about 10%, about 0.5% to about 8%, about 0.75% to about 6%, or about 1% to about 4% by weight. In some embodiments, phenoxyethanol and ethylhexylglycerin are provided at least or about 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, phenoxyethanol and ethylhexylglycerin are provided in a range of about 0.25% to about 10%, about 0.1% to about 4%, about 0.5% to about 8%, about 0.75% to about 6%, or about 1% to about 4% by weight.

In some embodiments, compositions comprise polyacrylate-13, polyisobutene, polysorbate 20, or combinations thereof. In some embodiments, polyacrylate-13 is provided at least or about 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, polyacrylate-13 is provided in a range of about 0.25% to about 10%, about 0.5% to about 8%, about 0.75% to about 6%, or about 1% to about 4% by weight. In some embodiments, polyisobutene is provided at least or about 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, polyisobutene is provided in a range of about 0.25% to about 10%, about 0.5% to about 8%, about 0.75% to about 6%, or about 1% to about 4% by weight. In some embodiments, polyacrylate-13 is provided in a range of about 0.25% to about 10%, about 0.5% to about 8%, about 0.75% to about 6%, or about 1% to about 4% by weight. In some embodiments, polysorbate 20 is provided at least or about 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, polysorbate 20 is provided in a range of about 0.25% to about 10%, about 0.5% to about 8%, about 0.75% to about 6%, or about 1% to about 4% by weight. In some embodiments, polyacrylate-13, polyisobutene, and polysorbate 20 are provided at least or about 0.05%, 0.10%, 0.25%, 0.50%, 0.75%, 1.0%, 1.5%, 2.0%, 2.5%, 3.0%, 3.5%, 4.0%, 4.5%, 5.0%, 5.5%, 6.0%, 6.5%, 7.0%, 8%, 9%, 10%, or more than 10% by weight (wt. %). In some embodiments, polyacrylate-13, polyisobutene, and polysorbate 20 are provided in a range of about 0.25% to about 10%, about 0.1% to about 4%, about 0.5% to about 8%, about 0.75% to about 6%, or about 1% to about 4% by weight (wt. %).

The topical composition may contain micelles, or an aggregate of surfactant molecules dispersed in an aqueous solution. Micelles may be prepared by dispersing an oil solvent in an aqueous solution comprising a surfactant, where the surfactant concentration exceeds the critical micelle concentration. The resulting composition contains micelles, i.e., spherical oil droplets Penetration Enhancers Fatty acids and alcohols can be employed to enhance penetration of the peptides, and to provide a silky feel to compositions, e.g., methanoic acid, ethanoic acid, propanoic acid, butanoic acid, isobutyric acid, pentanoic acid, hexanoic acid, heptanoic acid, octanoic acid, nonanoic acid, decanoic acid, myristoleic acid, isovaleric acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, caprylic acid, capric acid, lauric acid, palmitic acid, stearic acid, arachidic acid, behenic acid, lignoceric acid, cerotic acid, medium chain fatty acids, e.g., $C_{6-12}$ fatty acids, or the like. Typical amounts when employed in compositions are from 1% by weight to 4% by weight.

Methods of Use

Described herein are compositions and methods for improving pigmentation including hyperpigmentation. In some embodiments, the hyperpigmentation is due to post-inflammatory hyperpigmentation, melasma, or aging. In some embodiments, the hyperpigmentation is due to aging is caused by UV exposure or inflammation.

Also described herein are compositions and methods for reducing melanocyte activity, inhibiting melanin synthesis, reducing of melanin transfer, increasing melanosome autophagy, reducing inflammation, or combinations thereof. In some embodiments, the reduction in melanocyte activity is due to inhibiting MITE, TYR, TRP1, TRP2, or combinations thereof. In some embodiments, the reduction in melanocyte activity is due to activating ERK signaling, JNK signaling, or combinations thereof. In some embodiments, the increased melanosome autophagy is due to increased expression, activity, or both of PAR-2, ET-1 or SCF.

Compositions as described herein comprise peptides, silymarin, tranexamic acid, lactoferrin, cannabidiol, *Withania somnifera* extract, gallic acid, sesamol, acteoside, oleuropein, hesperidin, *Sideroxylon inerme* extract, parthenolide, Melatrepein™, niacinamide, *Tremella fuciformis* extract, *Thermus thermophilus* extract, phytoene, phytofluene, white horehound, *Polypodium leucotomos* extract, or combinations thereof for treating a pigmentation disease or disorder.

Various pigmentation disorders or disease can be improved using the compositions and methods as described herein. In some embodiments, the pigmentation disorder or disease is hyperpigmentation. In some embodiments, the pigmentation disorder or disease is focal hypopigmentation or diffuse hypopigmentation. In some embodiments, the disorder or disease is post-inflammatory hyperpigmentation (PIH). In some embodiments, the PIH is the epidermal form of PIH. In some embodiments, the PIH is the determal form of PIH. In some embodiments, the pigmentation disorder or disease includes, but is not limited to, Acanthosis Nigricans, age spots, albinism, Incontinentia Pigmenti, Lentigines, melasma, Pityriasis Albam, or Progressive Pigmentary Purpura.

Compositions as described herein, in some embodiments, improve pigmentation by reducing melanocyte activity, inhibiting melanin synthesis, reducing of melanin transfer, increasing melanosome autophagy, reducing inflammation, or a combination thereof. In some embodiments, the compositions as described herein improve pigmentation by at least or about 10%, 15%, 20%, 25%, 30%, 35%, 40%, 45%, 50%, 55%, 60%, 65%, 70%, 75%, 80%, 85%, 90%, 95%, or more than 95%. In some embodiments, the compositions as described herein improve pigmentation by at least or about 0.5×, 1.0×, 1.5×, 2.0×, 2.5×, 3.0×, 3.5×, 4.0×, 5.0×, 6.0×, 7.0×, 8.0×, 9.0×, 10×, or more than 10×.

Compositions as described herein may be used with various treatment regimens. In some instances, the topical compositions described herein are administered once per day, twice per day, three times per day or more. In some instances, the topical compositions described herein are administered twice per day. The topical compositions described herein, in some embodiments, are administered daily, every day, every alternate day, five days a week, once a week, every other week, two weeks per month, three weeks per month, once a month, twice a month, three times per month, or more. In some embodiments, the topical compositions described herein are administered twice daily, e.g., morning and evening. In some embodiments, the topical compositions described herein are administered for at least 1 day, 2 days, 3 days, 4 days, 5 days, 6 days, 1 week, 2 weeks, 3 weeks, 1 month, 2 months, 3 months, 4 months, 5 months, 6 months, 7 months, 8 months, 9 months, 10 months, 11 months, 12 months, 18 months, 2 years, 3 years, 4 years, 5 years, 10 years, or more. In some embodiments, the topical compositions described herein are administered twice daily for at least or about 1 week, 2 weeks, 3 weeks, 1 month, 2 months, 3 months, 4 months, 5 months, 6 months, or more. In some embodiments, the topical compositions described herein are administered once daily, twice daily, three times daily, four times daily, or more than four times daily for at least or about 1 week, 2 weeks, 3 weeks, 1 month, 2 months, 3 months, 4 months, 5 months, 6 months, or more.

Stability Testing

Stability testing of the compositions can be conducted as follows.

High temperature testing is now commonly used as a predictor of long-term stability. High temperature testing can be conducted at 37° C. (98° F.) and 45° C. (113° F.). If a product is stored at 45° C. for three months (and exhibits acceptable stability) then it should be stable at room temperature for two years. A good control temperature is 4° C. (39° F.) where most products will exhibit excellent stability. Sometime, the product is also be subjected to −10° C. (14° F.) for three months.

In some instances, stability of the product is assessed by passing three cycles of temperature testing from −10° C. (14° F.) to 25° C. (77° F.). In such cases, the product is placed at −10° C. for 24 hours and then placed at room temperature (25° C.) for 24 hours. This completes one cycle. An even more rigorous test is a −10° C. to 45° C. five-cycle test. This puts emulsions under a tremendous stress.

The dispersed phase (of an oil-in-water emulsion) has a tendency to separate and rise to the top of the emulsion forming a layer of oil droplets. This phenomenon is called creaming. Creaming is one of the first signs of impending emulsion instability. A test method to predict creaming is centrifugation. Heat the emulsion to 50° C. (122° F.) and centrifuge it for thirty minutes at 3000 rpm. Then inspect the resultant product for signs of creaming.

Both formulas and packaging can be sensitive to the UV radiation. The product is placed in glass and the actual package in a light box that has a broad-spectrum output. Another glass jar completely covered with aluminum foil serves as a control. Discoloration of the product may be observed.

For all the above mentioned tests the color, odor/fragrance, viscosity, pH value, and, if available, particle size uniformity and/or particle agglomeration under the microscope can be observed.

Kits for Non-Invasive Use

Some embodiments of the methods and compositions provided herein include kits comprising peptides provided herein. In some embodiments, kits can be provided to an administering physician, other health care professional, a patient, or a caregiver. In some embodiments, a kit comprises a container which contains the peptide compositions in a suitable topical composition, and instructions for administering the peptide composition to a subject. The kit can optionally also contain one or more additional therapeutic or other agents. For example, a kit containing a peptide composition in topical form can be provided along with other skin care agents, such as, cleansers, occlusive moisturizers, penetrating moisturizers, sunscreens, sunblocks, and the like. The kit may contain the peptide composition in bulk form, or can contain separate doses of the peptide composition for serial or sequential administration. The kit can optionally contain one or more diagnostic tools, administration tools, and/or instructions for use. The kit can contain suitable delivery devices, such as, syringes, pump dispensers, single dose packets, and the like, along with instructions for administering the peptide compositions and any other therapeutic or beneficial agents. The kit can optionally contain instructions for storage, reconstitution (if applicable), and administration of any or all therapeutic or beneficial agents included. The kits can include a plurality of containers reflecting the number of administrations to be given to a subject, or the different products to be administered to the subject.

In some embodiments, the composition also works with the skin's own natural regenerating process and assists in improving the skin's appearance, and skin tightness. The topical composition is suitable for all skin types and post-procedure skin. The topical compositions can be provided to the patient in bulk form, to permit a suitable amount of the peptides to be self-administered by the patient. For example, the patient can apply an amount of the composition sufficient to provide an even coating over the affected area or as otherwise instructed by the physician. In certain embodiments it can desirable to incorporate additional therapeutic or active agents into the topical composition. Alternatively, adjunct therapies or agents can be administered separately. For example, a cleanser, a sunblock, a sunscreen, a penetrating moisturizer, and/or an occlusive moisturizer can be provided for administration before or after the topical composition of the embodiments.

The various examples of creams, ointments, lotions, solutions, gels, sprays and patches may incorporate the peptide compositions as described herein as the active ingredient, in combination with penetration enhancing agents and other active agents acting synergistically on the skin for the promotion of wound healing or wound closure or the treatment of chronic cutaneous wound.

NUMBERED EMBODIMENTS

Numbered embodiment 1 comprises a topical composition for improving pigmentation comprising: one or more photosomes; one or more liposomes; hexapeptide-11; and hexapeptide-12; wherein the topical composition improves pigmentation. Numbered embodiment 2 comprises the topical composition of numbered embodiment 1, wherein the one or more photosomes is present in a range of about 0.1 wt. % to about 2 wt. %. Numbered embodiment 3 comprises the topical composition of numbered embodiments 1-2, wherein the one or more photosomes is present in a range of about 0.25 wt. % to about 1 wt. %. Numbered embodiment 4 comprises the topical composition of numbered embodiments 1-3, wherein the one or more photosomes encapsulates the one or more liposomes. Numbered embodiment 5 comprises the topical composition of numbered embodiments 1-4, wherein the hexapeptide-11 is present at 50-150 ppm. Numbered embodiment 6 comprises the topical composition of numbered embodiments 1-5, wherein the hexapeptide-11 is present in a range of about 0.004 by weight (wt. %) to about 0.100 wt. %. Numbered embodiment 7 comprises the topical composition of numbered embodiments 1-6, wherein the hexapeptide-11 is encapsulated in a first liposome of the one or more liposomes. Numbered embodiment 8 comprises the topical composition of numbered embodiments 1-7, wherein the hexapeptide-12 is encapsulated in a second liposome of the one or more liposomes. Numbered embodiment 9 comprises the topical composition of numbered embodiments 1-8, wherein the hexapeptide-11 and hexapeptide-12 are encapsulated in a first liposome of the one or more liposomes. Numbered embodiment 10 comprises the topical composition of numbered embodiments 1-9, wherein the hexapeptide-12 comprises palmitoyl hexapeptide-12, myristoyl hexapeptide-12, or a combination thereof. Numbered embodiment 11 comprises the topical composition of numbered embodiments 1-10, wherein the hexapeptide-12 is present at 1-10 ppm. Numbered embodiment 12 comprises the topical composition of numbered embodiments 1-11, wherein the hexapeptide-12 is present in a range of about 0.001 by weight (wt. %) to about 0.025 wt. %. Numbered embodiment 13 comprises the topical composition of numbered embodiments 1-12, wherein the topical further comprises lactoferrin. Numbered embodiment 14 comprises the topical composition of numbered embodiments 1-13, wherein the lactoferrin is present at no more than about 0.25 wt. %. Numbered embodiment 15 comprises the topical composition of numbered embodiments 1-14, wherein the lactoferrin is present in a range of about 0.005 wt. % to about 0.25 wt. %. Numbered embodiment 16 comprises the topical composition of numbered embodiments 1-15, wherein the lactoferrin is encapsulated in a third liposome of the one or more liposomes. Numbered embodiment 17 comprises the topical composition of numbered embodiments 1-16, wherein the topical further comprises lactoferrin, and wherein the lactoferrin, hexapeptide-11, and hexapeptide-12 are encapsulated in a first liposome of the one or more liposomes. Numbered embodiment 18 comprises the topical composition of numbered embodiments 1-17, wherein the topical further comprises a peptide derived from lactoferrin. Numbered embodiment 19 comprises the topical composition of numbered embodiments 1-18, wherein the peptide derived from lactoferrin comprises at least 2, 3, 4, 5, 6, 7, 8, 9, 10, 12, 14, 16, 18, 20, 22, 24, 26, 28, 30, or more than 30 amino acids of SEQ ID NO: 1. Numbered embodiment 20 comprises the topical composition of numbered embodiments 1-19, wherein the topical further comprises phosphatidylserine. Numbered embodiment 21 comprises the topical composition of numbered embodiments 1-20, wherein the phosphatidylserine is present at no more than about 0.075 wt. %. Numbered embodiment 22 comprises the topical composition of numbered embodiments 1-21, wherein the phosphatidylserine is present in a range of about 0.005 wt. % to about 0.1 wt. %. Numbered embodiment 23 comprises the topical composition of numbered embodiments 1-22, wherein the phosphatidylserine is present at no more than 5.0 wt %. Numbered embodiment 24 comprises the topical composition of numbered embodiments 1-23, wherein the topical further comprises silymarin. Numbered embodiment 25 comprises the topical composition of numbered embodiments 1-24, wherein the silymarin is present in a range of about 0.1 wt. % to about 1.0 wt. %. Numbered embodiment 26 comprises the topical composition of numbered embodiments 1-25, wherein the silymarin is present in a range of about 0.2 wt. % to about 3.0 wt. %. Numbered embodiment 27 comprises the topical composition of numbered embodiments 1-26, wherein the topical further comprises sesamol. Numbered embodiment 28 comprises the topical composition of numbered embodiments 1-27, wherein the sesamol is present in a range of about 0.002 wt. % to about 0.050 wt. %. Numbered embodiment 29 comprises the topical composition of numbered embodiments 1-28, wherein the topical further comprises tranexamic acid. Numbered embodiment 30 comprises the topical composition of numbered embodiments 1-29, wherein the tranexamic acid is present in a range of about 1 wt. % to about 10 wt %. Numbered embodiment 31 comprises the topical composition of numbered embodiments 1-30, wherein the tranexamic acid is present in a range of about 0.25 wt. % to about 6.25 wt %. Numbered embodiment 32 comprises the topical composition of numbered embodiments 1-31, wherein the topical further comprises phytoene, phytofluene, or combination thereof. Numbered embodiment 33 comprises the topical composition of numbered embodiments 1-32, wherein the phytoene, phytofluene, or combination thereof is present in a range of about 1 wt. % to about 10 wt %. Numbered embodiment 34 comprises the topical composition of numbered embodiments 1-33, wherein the topical further comprises *Withania somnifera* extract. Numbered embodiment 35 comprises the topical composition of numbered embodiments 1-34, wherein the *Withania somnifera* extract is present in a range of about 0.020 wt. % to about 0.500 wt. %. Numbered embodiment 36 comprises the topical composition of numbered embodiments 1-35, wherein the topical further comprises gallic acid. Numbered embodiment 37 comprises the topical composition of numbered embodiments 1-36, wherein the gallic acid is present in a range of about 0.40 wt. % to about 10 wt. %. Numbered embodiment 38 comprises the topical composition of numbered embodiments 1-37, wherein the topical further comprises hesperidin. Numbered embodiment 39 comprises the topical composition of numbered embodiments 1-38, wherein the hesperidin is present in a range of about 0.020 wt. % to about 0.50 wt. %. Numbered embodiment 40 comprises the topical composition of numbered embodiments 1-39, wherein the topical further comprises *Pancratium maritimum* Numbered embodiment 41 comprises the topical composition of numbered embodiments 1-40, wherein the *Pancratium maritimum* is present in a range of about 0.50 wt. % to about 5.0 wt. %. Numbered embodiment 42 comprises the topical composition of numbered embodiments 1-41, wherein the topical further comprises niacinamide. Numbered embodiment 43 comprises the topical composition of numbered embodiments 1-42, wherein the niacinamide is present in a range of about 1 wt % to about 10 wt %. Numbered embodiment 44 comprises the topical composition of numbered embodiments 1-43, wherein the topical further comprises oleuropein. Numbered embodiment 45 comprises the topical composition of numbered embodiments 1-44, wherein the oleuropein is present in a range of about 0.030 wt % to about 0.750 wt %. Numbered embodiment 46 comprises the topical composition of numbered embodiments 1-45, wherein the topical further comprises *Thermus thermophilus* ferment. Numbered embodiment 47 comprises the topical composition of numbered embodiments 1-46, wherein the *Thermus thermophilus* ferment is present in a range of about 0.30 wt. % to about 7.5 wt. %. Numbered embodiment 48 comprises the topical composition of numbered embodiments 1-47, wherein the topical further comprises *Tremella fuciformis*. Numbered embodiment 49 comprises the topical composition of numbered embodiments 1-48, wherein the *Tremella fuciformis* is present in a range of about 0.20 wt. % to about 5.0 wt. %. Numbered embodiment 50 comprises the topical composition of numbered embodiments 1-49, wherein the topical further comprises heptasodium hexacarboxymethyl dipeptide-12. Numbered embodiment 51 comprises the topical composition of numbered embodiments 1-50, wherein the heptasodium hexacarboxymethyl dipeptide-12 is present in a range of about 0.1 wt. % to about 10 wt %. Numbered embodiment 52 comprises the topical composition of numbered embodiments 1-51, wherein the heptasodium hexacarboxymethyl dipeptide-12 is present in a range of about 0.2 wt. % to about 5 wt %. Numbered embodiment 53 comprises the topical composition of numbered embodiments 1-52, wherein the topical composition is aqueous. Numbered embodiment 54 comprises a topical composition for improving pigmentation comprising: hexapeptide-11; hexapeptide-12; and a peptide derived from lactoferrin; wherein the topical composition improves pigmentation. Numbered embodiment 55 comprises the topical composition of numbered embodiments 1-54, wherein the hexapeptide-12 comprises palmitoyl hexapeptide-12, myristoyl hexapeptide-12, or a combination thereof. Numbered embodiment 56 comprises the topical composition of numbered embodiments 1-55, wherein the hexapeptide-12 is present at 1-10 ppm. Numbered embodiment 57 comprises the topical composition of numbered embodiments 1-56, wherein the hexapeptide-12 is present in a range of about 0.001 by weight (wt. %) to about 0.025 wt. %. Numbered embodiment 58 comprises the topical composition of numbered embodiments 1-57, wherein the hexapeptide-11 is present at 50-150 ppm. Numbered embodiment 59 comprises the topical composition of numbered embodiments 1-58, wherein the hexapeptide-11 is present in a range of about 0.004 by weight (wt. %) to about 0.100 wt. %. Numbered embodiment 60 comprises the topical composition of numbered embodiments 1-59, wherein the peptide derived from lactoferrin comprises at least 2, 3, 4, 5, 6, 7, 8, 9, 10, 12, 14, 16, 18, 20, 22, 24, 26, 28, 30, or more than 30 amino acids of SEQ ID NO: 1. Numbered embodiment 61 comprises the topical composition of numbered embodiments 1-60, wherein the topical composition further comprises phosphatidylserine. Numbered embodiment 62 comprises the topical composition of numbered embodiments 1-61, wherein the phosphatidylserine is present at no more than about 0.075% by wt. %. Numbered embodiment 63 comprises the topical composition of numbered embodiments 1-62, wherein the phosphatidylserine is present in a range of about 0.005 wt. % to about 0.1 wt. %. Numbered embodiment 64 comprises the topical composition of numbered embodiments 1-63, wherein the phosphatidylserine is present at no more than 5.0 wt %. Numbered embodiment 65 comprises the topical composition of numbered embodiments 1-64, wherein the topical composition further comprises lactoferrin. Numbered embodiment 66 comprises the topical composition of numbered embodiments 1-65, wherein the lactoferrin is present at no more than about 0.25 wt. %. Numbered embodiment 67 comprises the topical composition of numbered embodiments 1-66, wherein the lactoferrin is present in a range of about 0.005 wt. % to about 0.25 wt. %. Numbered embodiment 68 comprises the topical composition of numbered embodiments 1-67, wherein the topical composition further comprises a photosome. Numbered embodiment 69 comprises the topical composition of numbered embodiments 1-68, wherein the photosome is present in a range of about 0.1 wt. % to about 2 wt. %. Numbered embodiment 70 comprises the topical composition of numbered embodiments 1-69, wherein the topical composition further comprises silymarin, sesamol, tranexamic acid, phytoene, phytofluene, *Withania somnifera* extract, hesperidin, *Pancratium maritimum*, niacinamide, oleuropein, *Thermus thermophilus* ferment, *Tremella fuciformis*, heptasodium hexacarboxymethyl dipeptide-12, or combinations thereof. Numbered embodiment 71 comprises the topical composition of numbered embodiments 1-70, wherein the topical composition is aqueous. Numbered embodiment 72 comprises a method of improving pigmentation as a result of a pigmentation disorder or disease comprising administering the topical composition of numbered embodiments 1-71. Numbered embodiment 73 comprises a method of numbered embodiments 1-72, wherein the topical composition further comprises the pigmentation disorder or disease is hyperpigmentation. Numbered embodiment 74 comprises a method of numbered embodiments 1-73, wherein the topical composition further comprises the pigmentation disorder or disease is post-inflammatory hyperpigmentation (PIH). Numbered embodiment 75 comprises a method of numbered embodiments 1-74, wherein the topical composition further comprises the pigmentation disorder or disease is focal hypopigmentation or diffuse hypopigmentation. Numbered embodiment 76 comprises a method of numbered embodiments 1-75, wherein the topical composition further comprises the pigmentation disorder or disease is Acanthosis Nigricans, age spots, albinism, Incontinentia Pigmenti, Lentigines, melasma, Pityriasis Albam, or Progressive Pigmentary Purpura.

EXAMPLES

The following examples are given for the purpose of illustrating various embodiments of the disclosure and are not meant to limit the present disclosure in any fashion. The present examples, along with the methods described herein are presently representative of preferred embodiments, are exemplary, and are not intended as limitations on the scope of the disclosure. Changes therein and other uses which are encompassed within the spirit of the disclosure as defined by the scope of the claims will occur to those skilled in the art.

Example 1: Exemplary Compositions and Regulation of Gene Expression

An exemplary composition is seen in Table 2. Furthermore, compounds and concentration listed in Table 3 and Table 4 can be analyzed to assess their effect on the expression of genes important in regulating melanogenesis. Specifically, effect of these compounds on gene expression in endothelial cells, melanocytes, fibroblasts, and keratinocytes is analyzed. Gene sequencing analysis, bioinformatics, and gen-ontology analysis are performed.

TABLE 2

Formulation 1
Ingredient

Silymarin (0.1-1.0 wt. %)
Lactoferrin (1-10 ppm)
Peptide derived from lactoferrin
Cannabidiol (CBD)
Withania somnifera extract (1-20 ug/mL)
Gallic acid
Sesamol (20-100 uM)
Acteoside (200-1000 uM)
Hesperidin
Sideroxylon inerme L. stem bark
Parthenolide
Pancratium maritimum
Niacinamide (1-10 wt. %)
Melatrepein ™
Palmitoyl Hexapeptide-12 (0.0001-1 wt. %)
Palmitoyl Tripeptide-1 (0.0001-1 wt. %)
Hexapeptide-11 (0.001-0.010 wt. %)
Oleuropein
Tranexamic acid (1-10 wt. %)
Thermus thermophilus ferment
Phytoene, phytofluene
White horehound
Tremella fuciformis
Octapeptide

TABLE 3

Formulation 2

| Compound | Concentration | Cell type |
|---|---|---|
| Lactoferrin | 5 ppm (500 ug/mL)- | endothelial cells, melanocytes, keratinocytes |
| Peptide derived from lactoferrin | 1000 ppm (100 ug/mL) | endothelial cells, melanocytes, keratinocytes |
| Tripeptide-1 | 100 ppm (2.9 ug/mL) | melanocytes, keratinocytes |
| Hexapeptide-12 | 100 ppm (2.9 ug/mL) | melanocytes, keratinocytes |
| Tripeptide-1 and Hexapeptide-12 | 200 ppm (2.9 ug/mL each) | melanocytes, keratinocytes |
| Hexapeptide-11 | 1000 ppm (100 ug/mL) | melanocytes, keratinocytes |
| Tranexamic acid | 5% (500 ug/mL) | endothelial cells, melanocytes, keratinocytes |
| Octapeptide | 100 ppm (100 ug/mL) | |
| Phosphatidylserine | 1000 ppm (500-1000 ug/mL) | |
| CBD | (100 ug/mL) | melanocytes, keratinocytes |

TABLE 4

Formulation 3

| Compound | Concentration (in weight %; wt. %) |
|---|---|
| Lactoferrin | 0.020%-0.50% |
| Hexapeptide-12 | 0.001%-0.025% |
| Hexapeptide-11 | 0.004%-0.10% |
| Phosphatidylserine | 0.010%-0.25% |
| Silymarin | 0.20%-3.00% |
| Sesamol | 0.002%-0.05% |
| Tranexamic acid | 0.25%-6.25% |
| Phytoene/Phytofluene | 1.0%-25.0% |
| Withania somnifera extract | 0.020%-0.50% |
| Tremella fuciformis | 0.20%-5.0% |
| Gallic acid | 0.40%-10.0% |
| Thermus thermophilus ferment | 0.30%-7.5% |
| Oleuropein | 0.030%-0.750% |
| Pancratium maritimum | 0.30%-7.5% |
| Niacinamide | 0.40%-10.0% |
| Heptasodium hexacarboxymethyl dipeptide-12 (HHD12) | 0.20%-5.0% |
| Melatrepein | 0.30%-7.5% |
| Photosome | 0.10%-2.5% |
| Hesperidin | 0.020%-0.50% |

Example 2: Synergy in Combining Tripeptide-1 and Hexapeptide-12—Skin Pigmentation Microphthalmia-associated transcription factor (MITF) is a master regulator of pigmentation and melanin transfer and a potential new target for hyperpigmentation and melanoma. In vitro MITF gene expression tests were carried out to ascertain differences between individual peptides (tripeptide-1 and hexapeptide-12) and their combination in terms of MITF downregulation.

Specifically, the tests were conducted by culturing fibroblasts and then adding tripeptide-1, hexapeptide-12, or a combination of both. After 48 hours, MITF gene expression was analyzed. As shown in Table 5 below, the MITF gene analyses showed that individual peptides had limited effect on MITF down regulation. In fact, while hexapeptide-12 alone showed negligible MITF downregulation (−1.16), tripeptide-1 alone showed slight MITF upregulation (+1.72). However, when combined together in a blend, MITF downregulation was significantly increased (−4.17). This increased expression continued to manifest and increased even further at the 72 hour time point.

TABLE 5

| Gene | 80 ppm Hexapeptide (48 hours) | 120 xppm Tripeptide (48 hours) | Peptide Blend (Hex 80 ppm + Trip 120 ppm) (48 hours) |
|---|---|---|---|
| MITF | −1.16 | 1.72 | −4.17 |

* 80 ppm Hexapeptide refers to concentration of Hexapeptide-12 in a carrier; 120 ppm Tripeptide refers to concentration of Tripeptide-1 in a carrier; Peptide blend of 80 ppm Hexapeptide and 120 ppm Tripeptide The data shows tripeptide-1 and hexapeptide-12 have a synergistic effect on MITF gene expression.

Example 3: Gene Expression Studies

Four cell types associated with pigmentation pathways-melanocytes, keratinocytes, fibroblasts and endothelial (HUVEC) cells-were analyzed for gene expression.

Methods

To simulate the UV stimulatory pigmentation pathway process, melanocytes were pre-treated with PGE2, a normal direct consequence of UV light exposure usually emanating from exposed keratinocytes. After the 48 hour attachment culture, these melanocytes were induced with 10 uM PGE2 in melanocyte media for 24 hrs. The four primary human adult dermal cell lines were cultured and plated in well plates in triplicate and then treated with 11 different compound treatments (plus DMSO control). After 48 hours of attachment culture, the remaining fibroblasts, HUVECs and keratinocytes were treated with the test compounds listed in Table 6.

TABLE 6

Compounds Used in Gene Expression Studies

| Compound |
| --- |
| Lactoferrin (Lacto) |
| Peptide derived from lactoferrin (TCV) |
| Tripeptide-1 (Tri) |
| Hexapeptide-12 (Hex12) |
| Tripeptide-1 and Hexapeptide-12 (TriHex) |
| Hexapeptide-11 (Hex-11) |
| Tranexamic acid 5% (Tran Acid) |
| Octapeptide (Octa) |
| Phosphatidylserine (Phos) |
| Cannabidiol (CBD) |
| Entire formulation (total) |
| No treatment |

After 24 hours of compound exposure, RNA lysate preparation was carried out and samples were shipped to MedGenome for RNA extraction, library construction and sequencing to 25M paired end 100 bp reads per sample. Library prep and sequencing was completed at MedGenome.

Results

Figure 4:
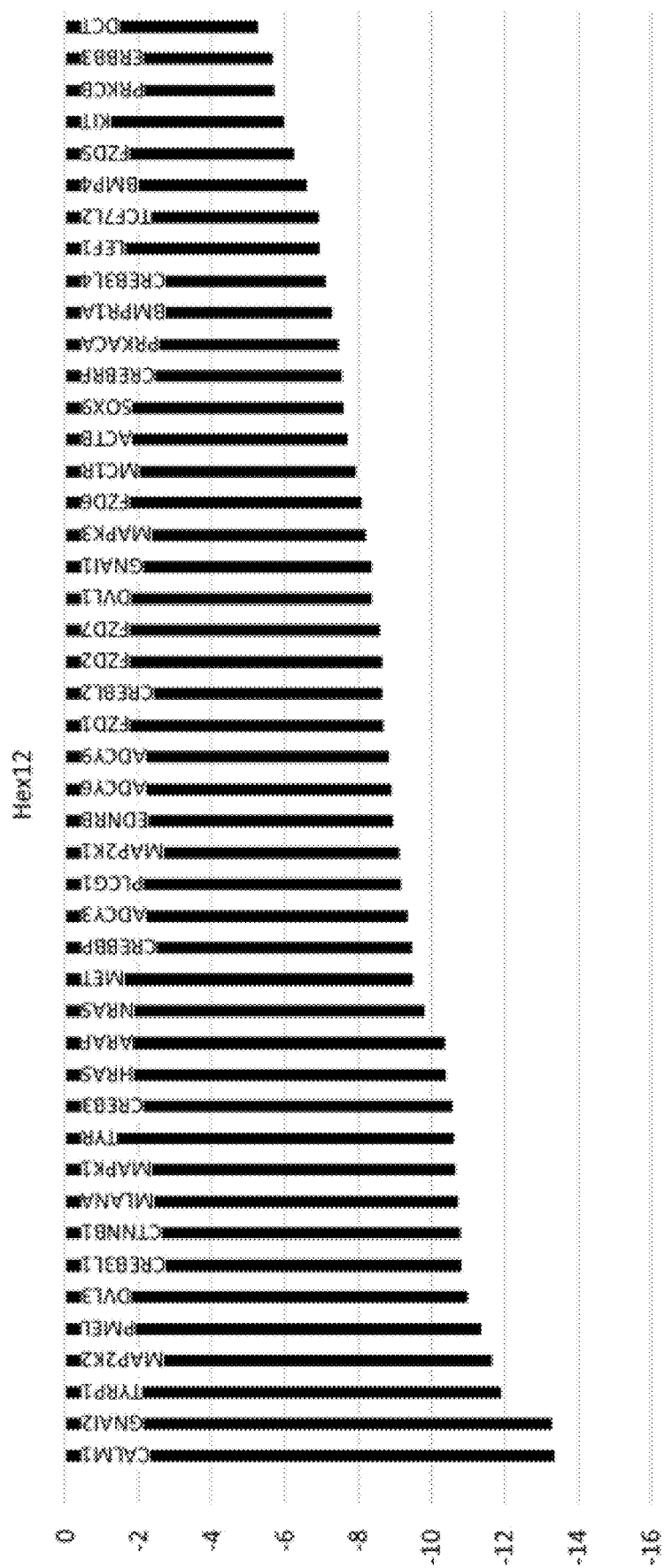
FIG. 4 illustrates the expression of various genes after treatment of melanocytes with hexapeptide-12 (Hex-12).
Figure 5:
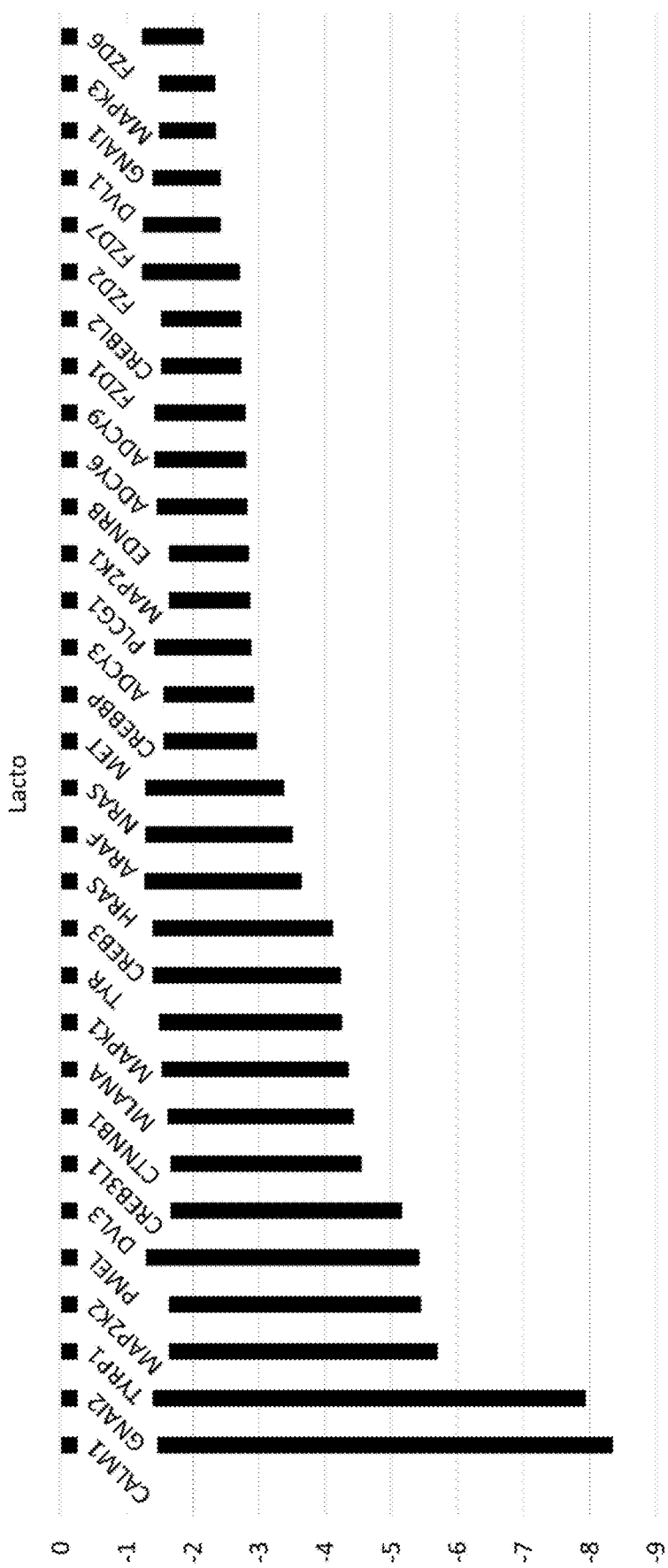
FIG. 5 illustrates the expression of various genes after treatment of melanocytes with lactoferrin (Lacto).
Figure 6A:
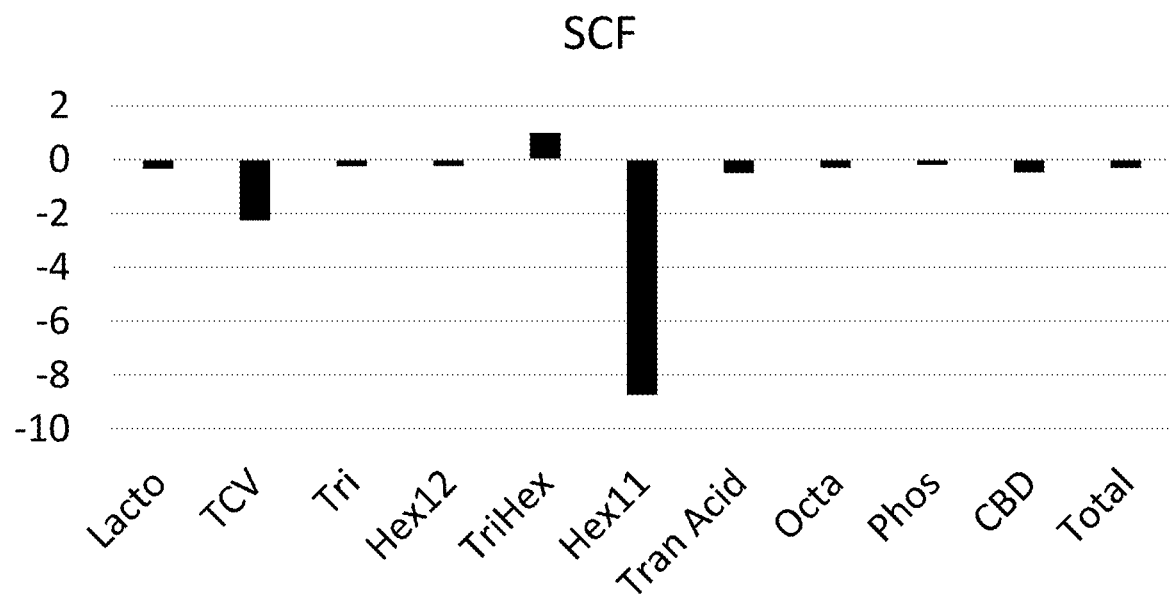
FIGS. 6A-6F illustrate the expression of SCF (FIG. 6A), LIF (FIG. 6B), POMC (FIG. 6C), endothelin genes (FIG. 6D), PGE2 (FIG. 6E), and NGF (FIG. 6F) in keratinocytes after treatment with lactoferrin (Lacto), peptide derived from lactoferrin (TCV), tripeptide-1 (Tri), hexapeptide-12 (Hex12), tripeptide-1 and hexapeptide-12 (TriHex), hexapeptide-11 (Hex11), tranexamic acid (Tran acid), octapeptide (Octa), phosphatidylserine (phos), Cannabidiol (CBD), and all (total).
Figure 6B:
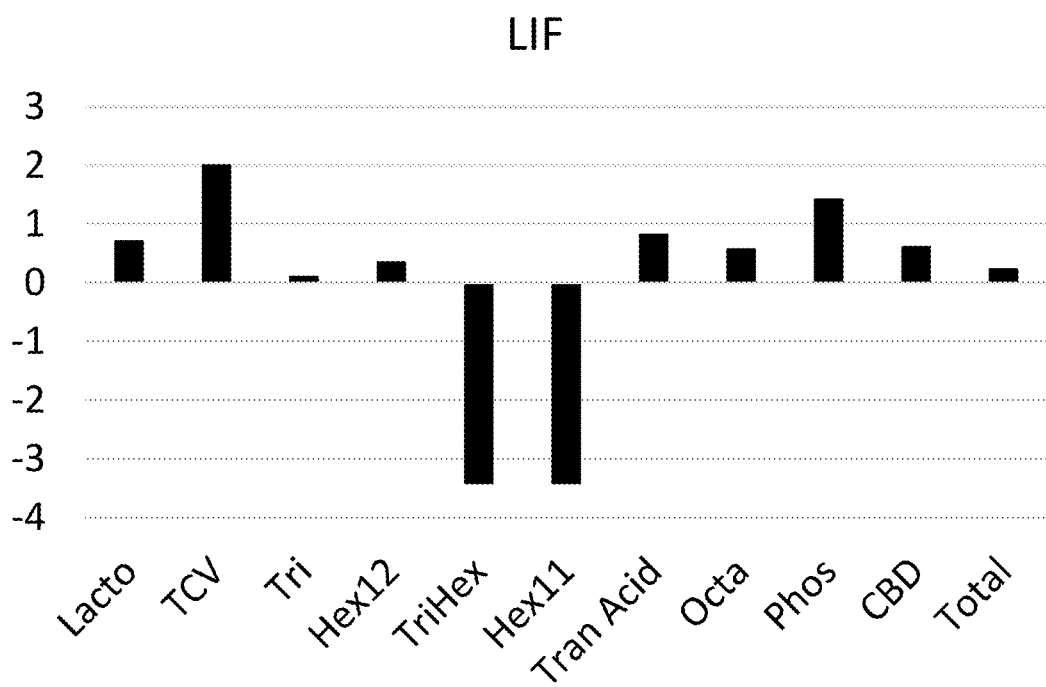
Figure 6C:
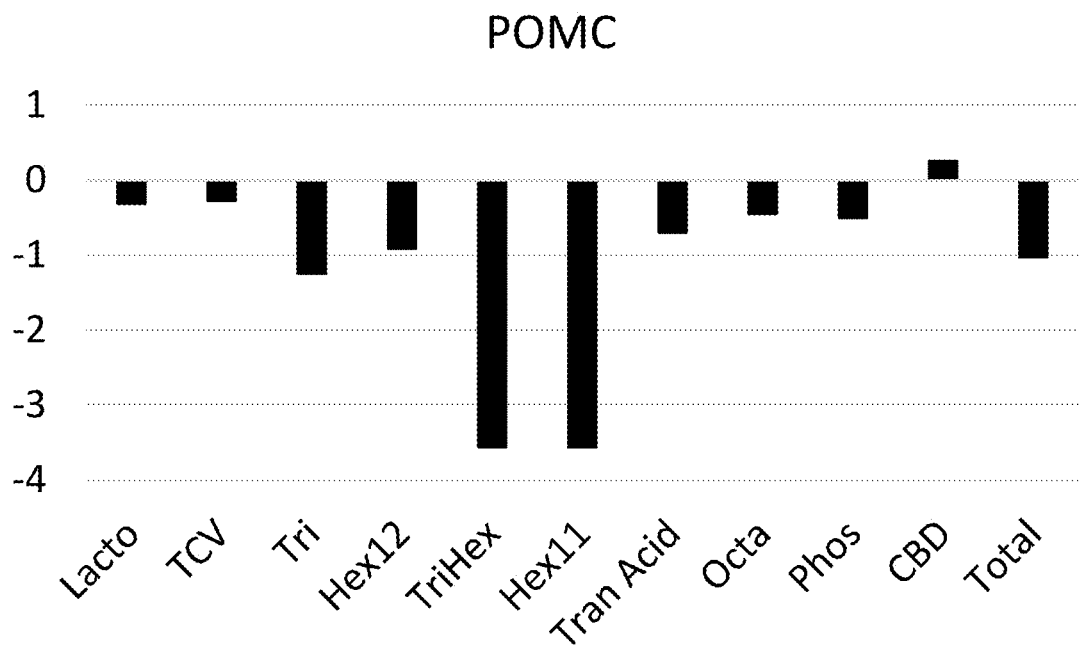
Figure 6D:
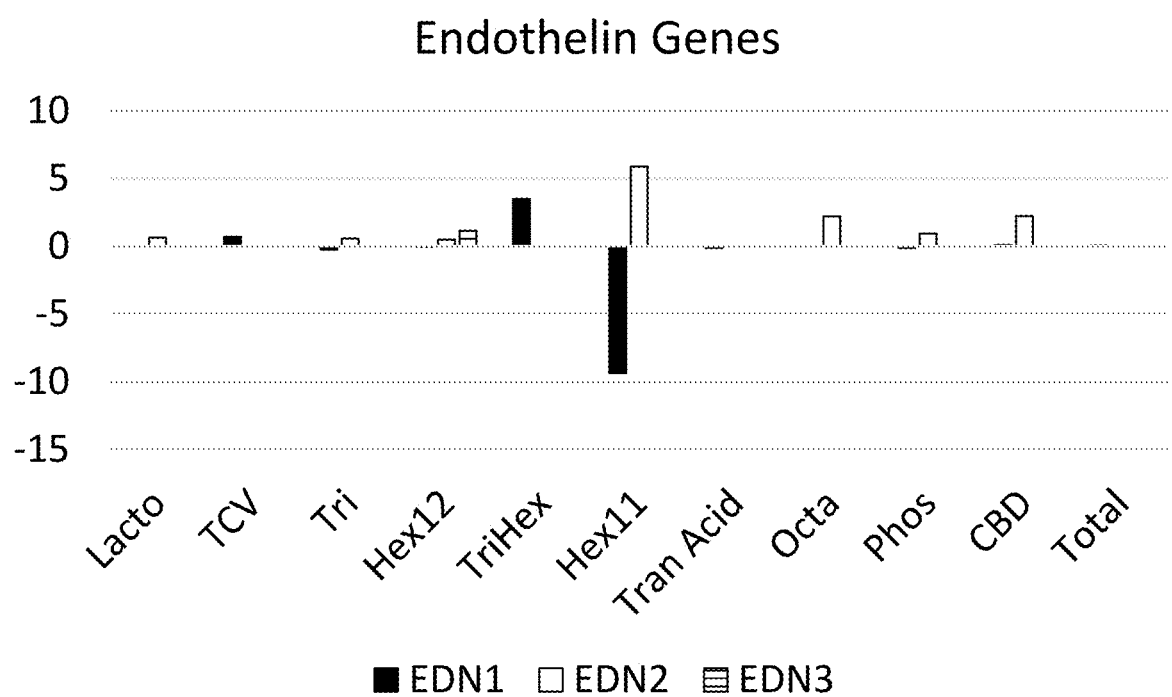
Figure 6E:
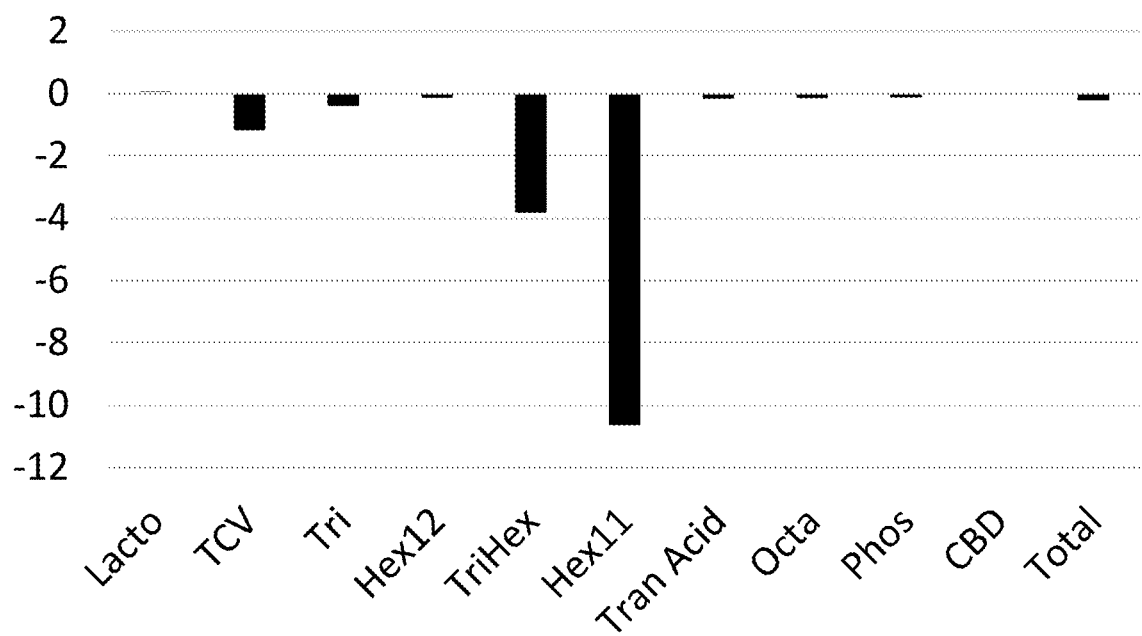
Figure 6F:
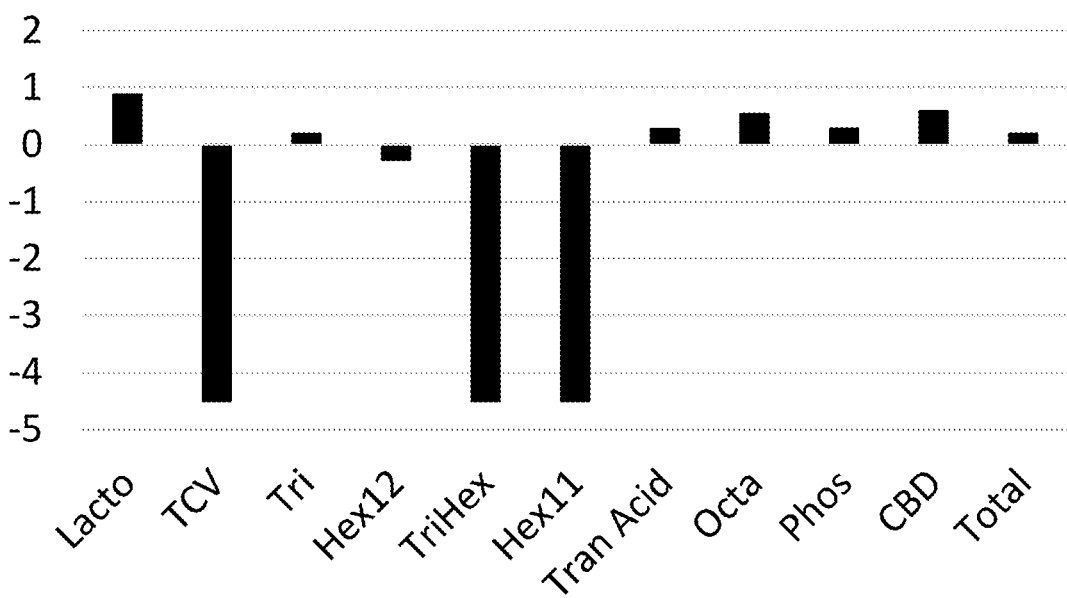
Figure 7:
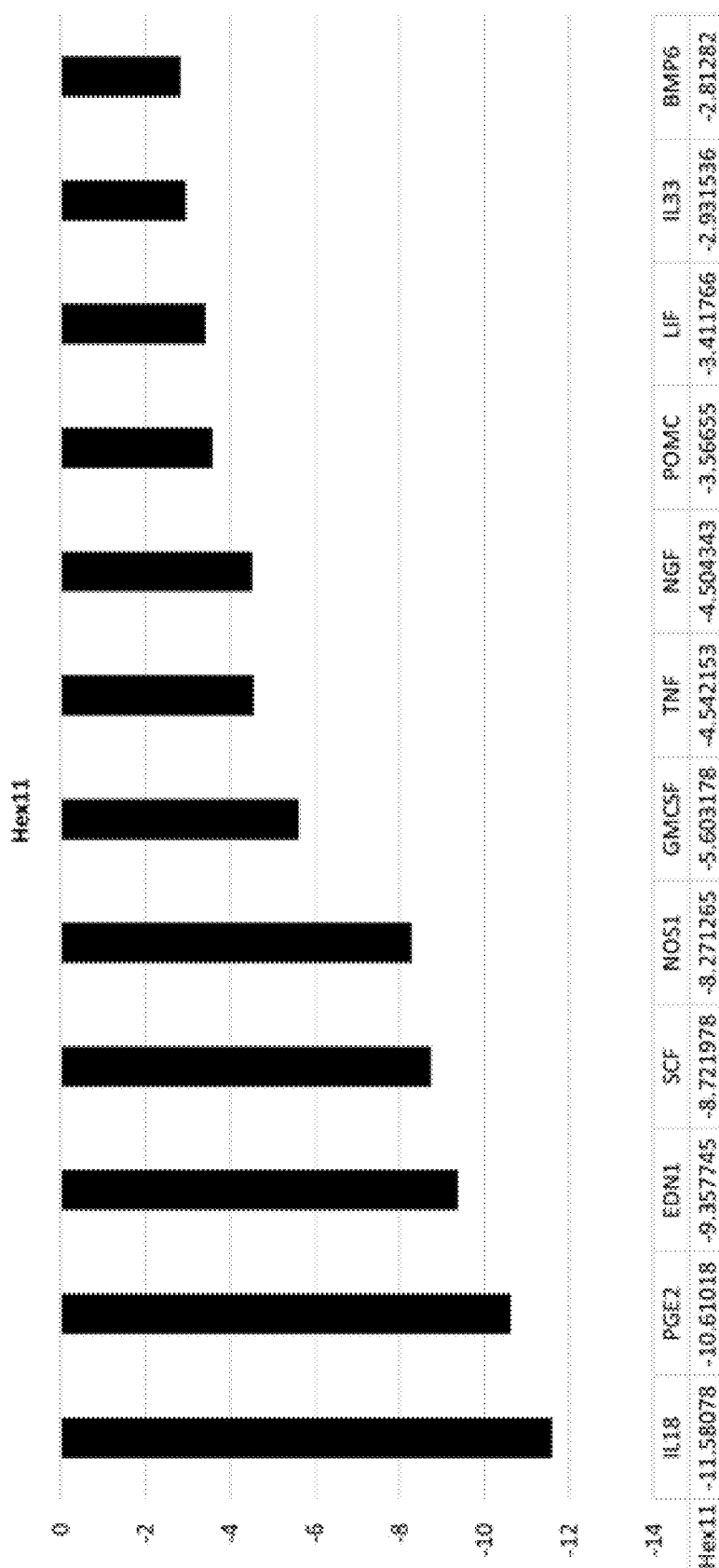
FIG. 7 illustrates individual hexapeptide-11 (Hex-11) activity with respect to various genes.
Figure 8A:
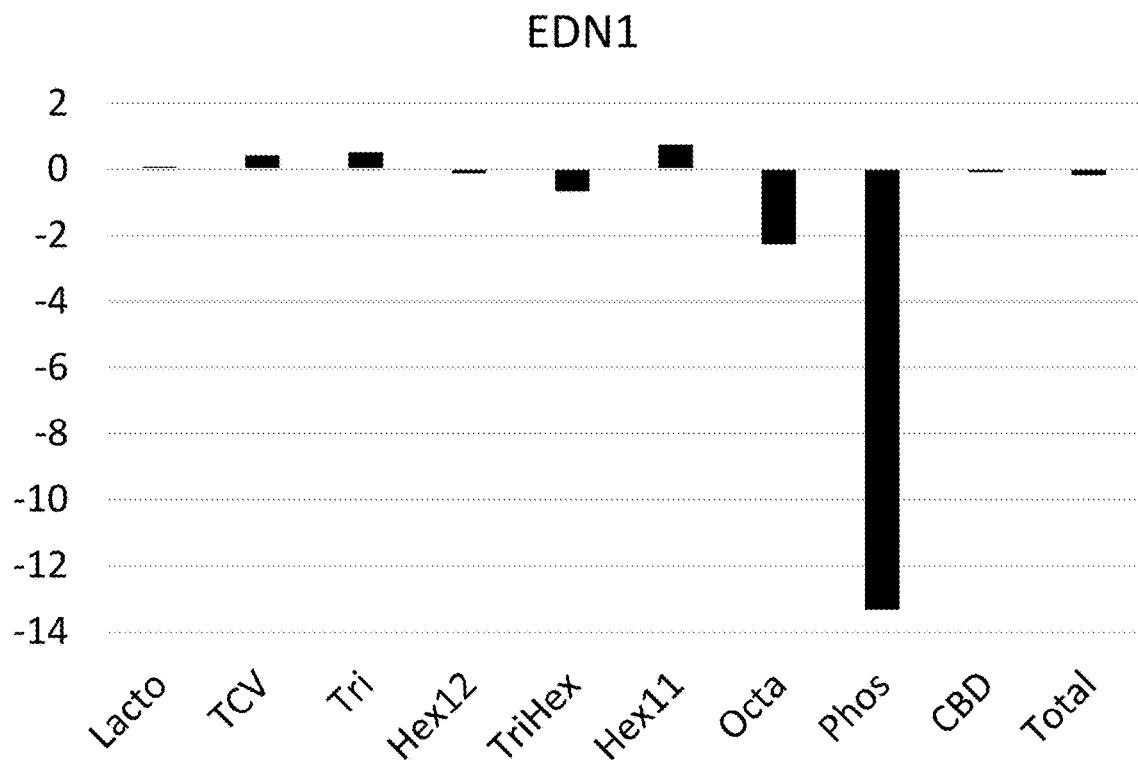
FIGS. 8A-8C illustrate the expression of EDN1 (FIG. 8A), SCF (FIG. 8B), and TGFB1 (FIG. 8C) after treatment of endothelial cells with lactoferrin (Lacto), peptide derived from lactoferrin (TCV), hexapeptide-12 (Hex12), tripeptide-1 and hexapeptide-12 (TriHex), hexapeptide-11 (Hex11), tranexamic acid (Tran acid), octapeptide (Octa) phosphatidylserine (phos), Cannabidiol (CBD), and all (total).
Figure 8B:
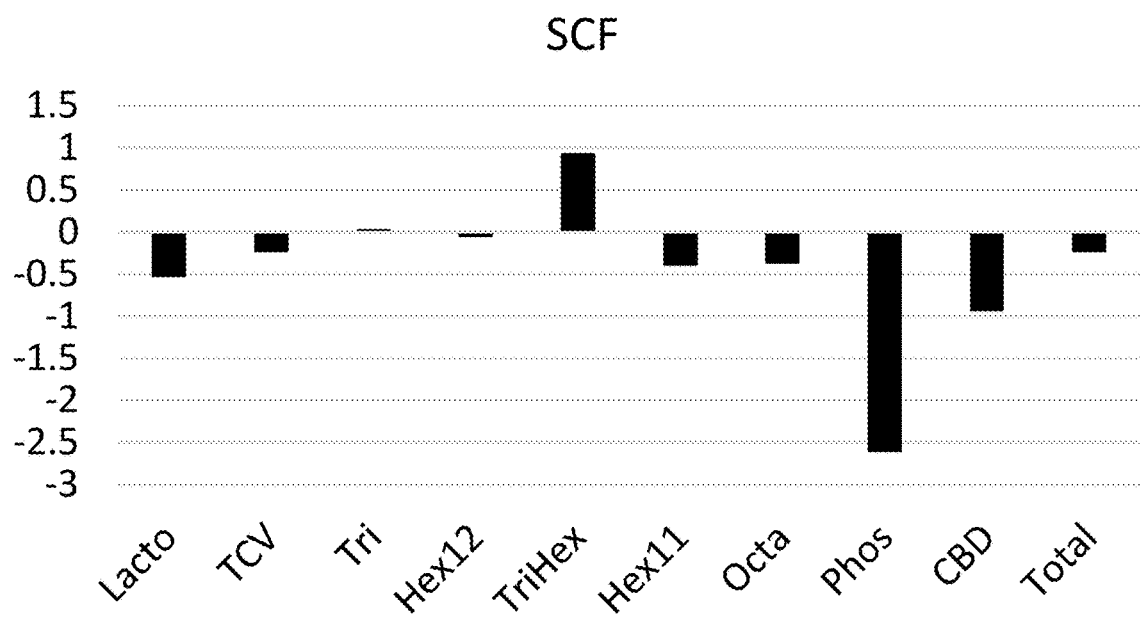
Figure 8C:
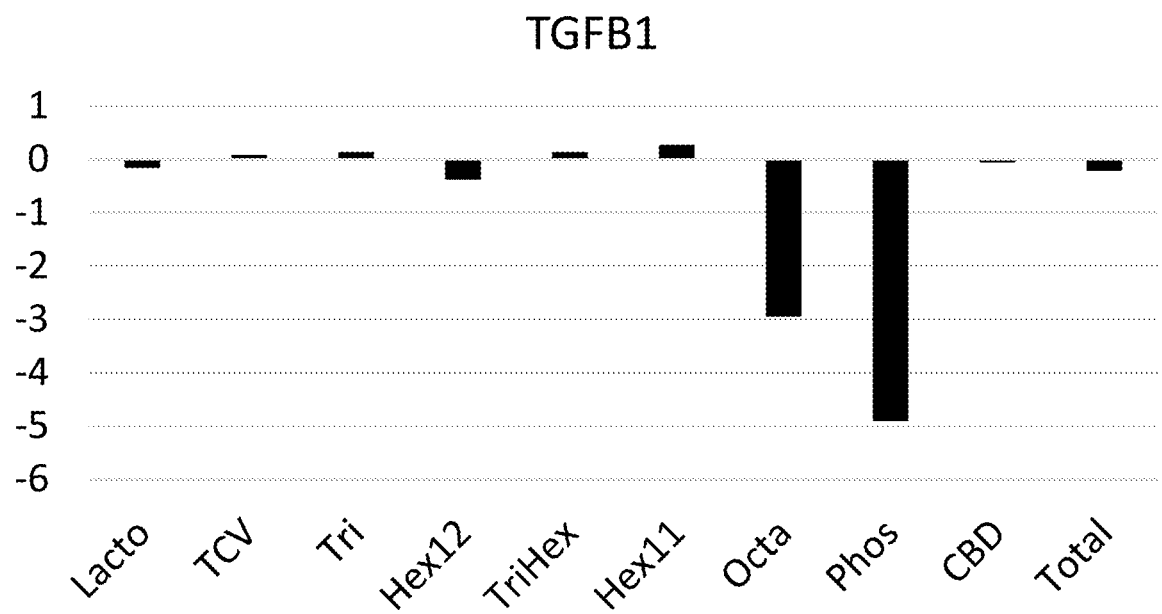
Figure 9:
FIG. 9 illustrates the individual phosphatidylserine activity on EDN1 and other melanogenic genes.
Figure 10A:
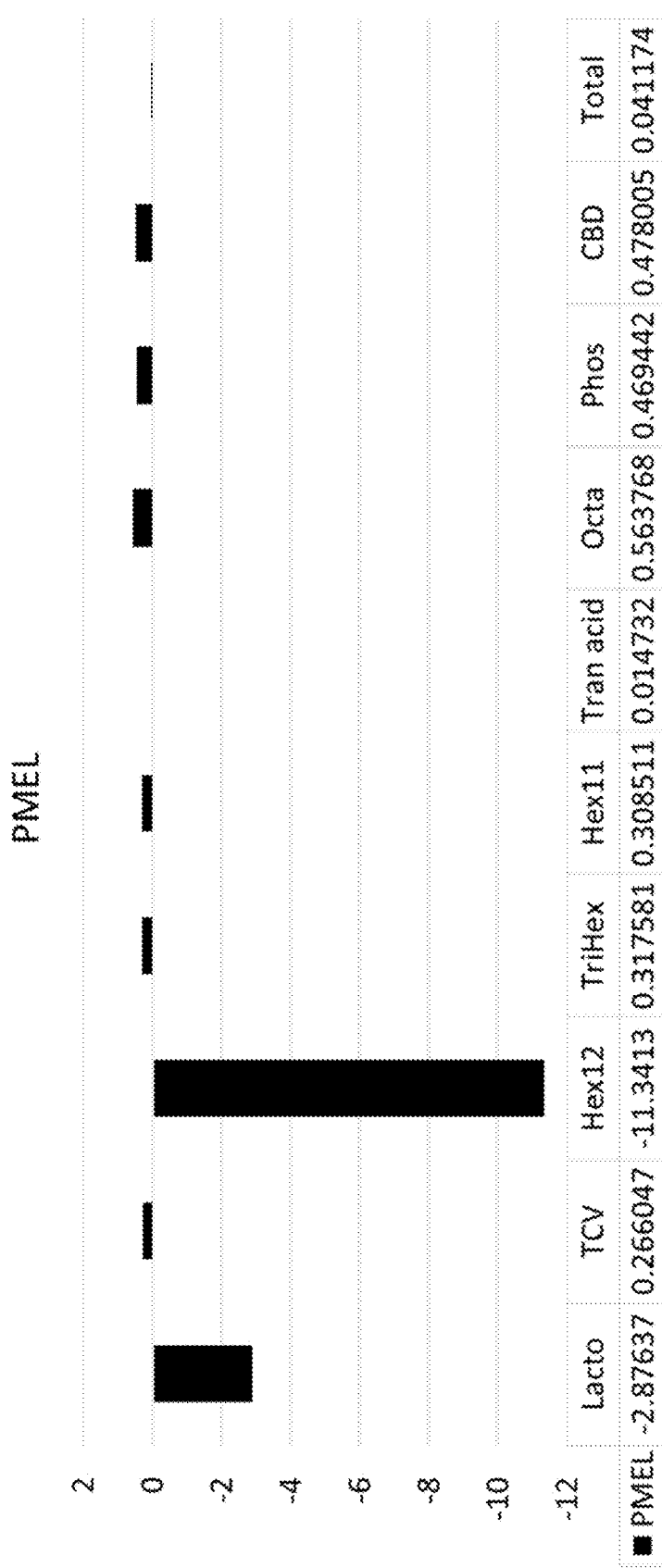
FIG. 10A-10D illustrates the expression of PMEL (FIG. 10A), Tyrosinase genes (FIG. 10B), MC1/4R (FIG. 10C), and EDNRB (FIG. 10D) after treatment of endothelial cells with lactoferrin (Lacto), peptide derived from lactoferrin (TCV), hexapeptide-12 (Hex12), tripeptide-1 and hexapeptide-12 (TriHex), hexapeptide-11 (Hex11), tranexamic acid (Tran acid) octapeptide (Octa), phosphatidylserine (phos), Cannabidiol (CBD), and all (total).
Figure 10B:
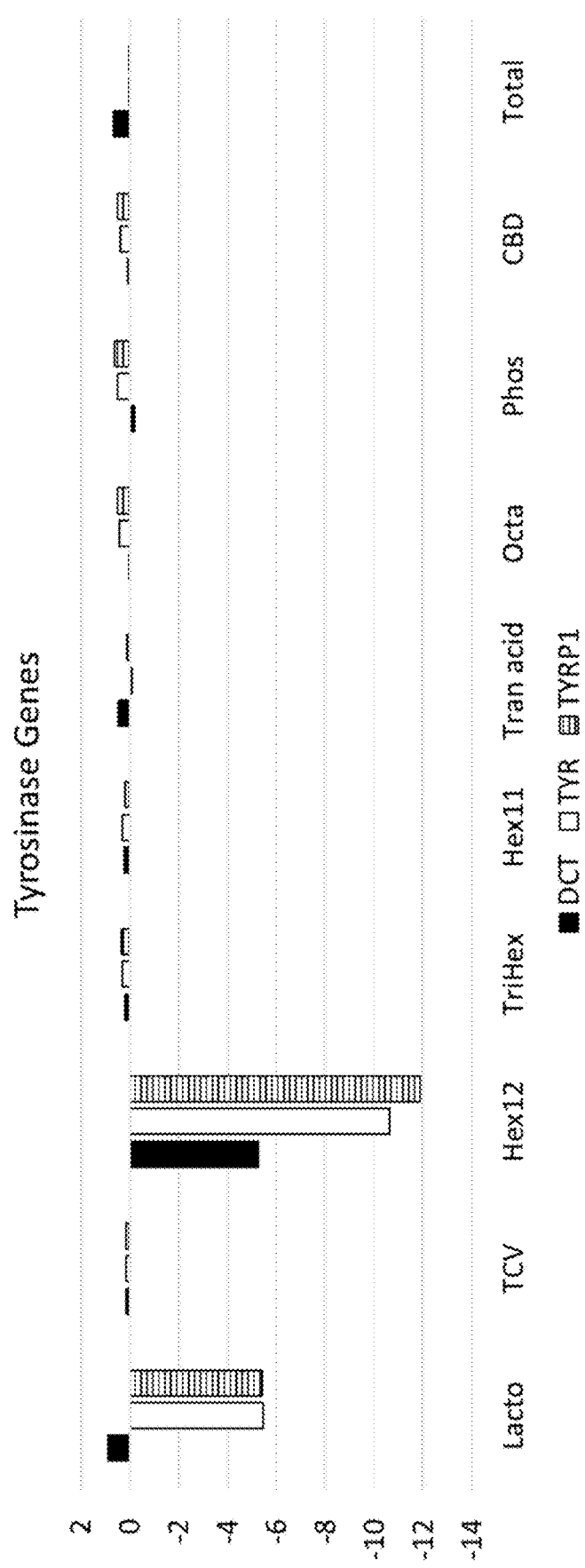
Figure 10C:
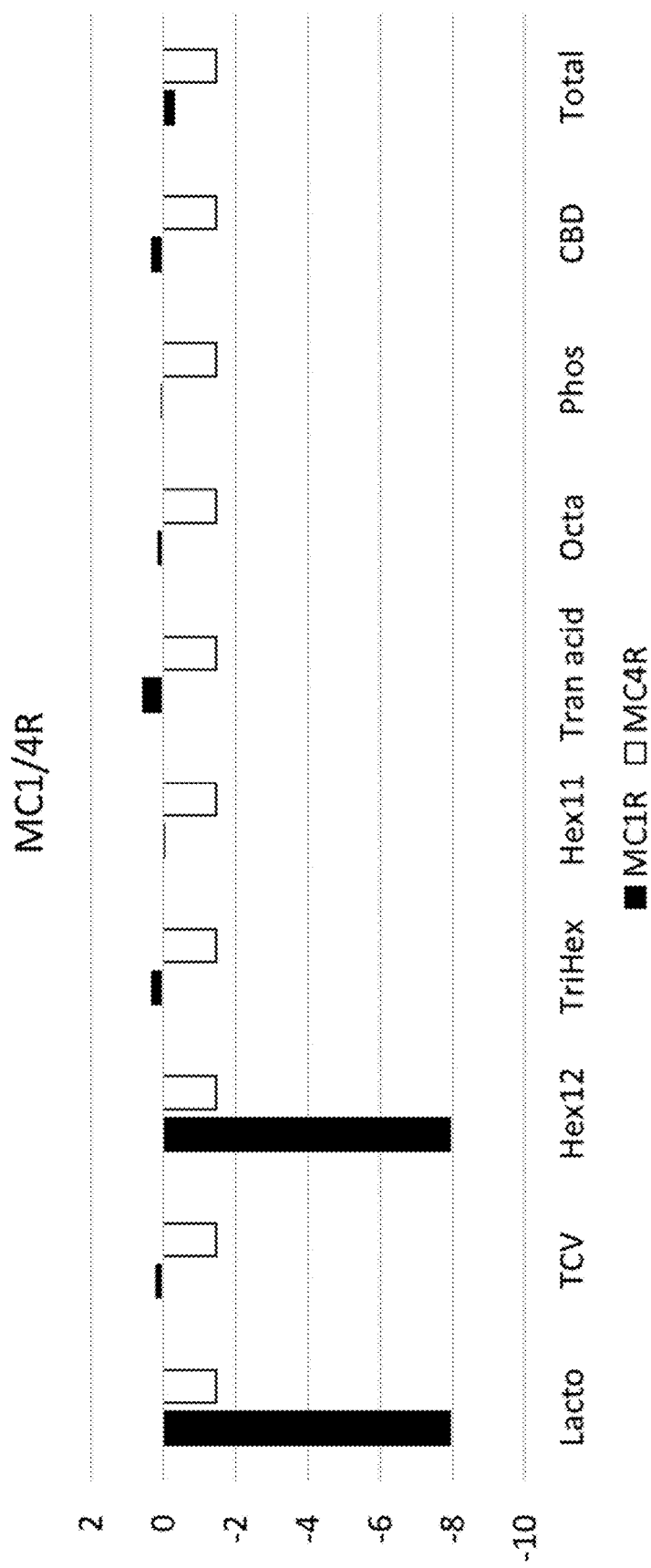
Figure 10D:
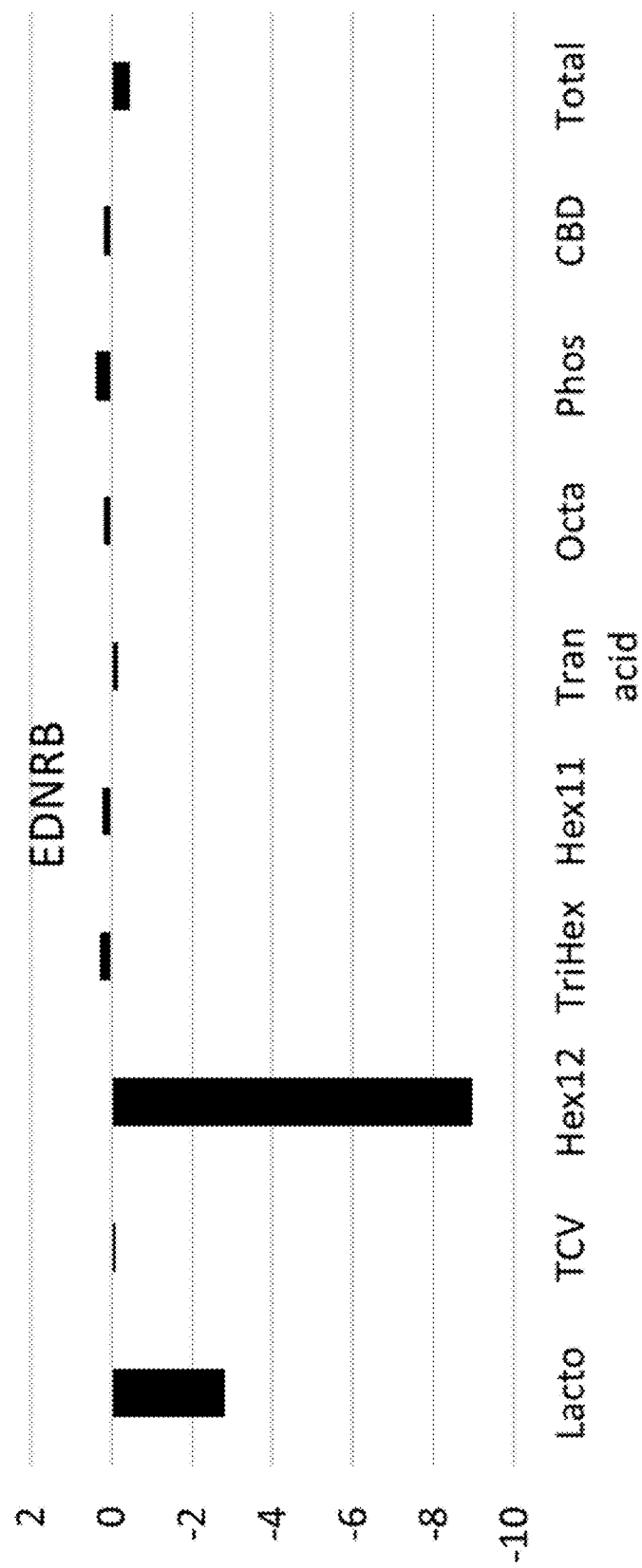

Out of the 4 cell lines, it was possible to identify actives with significant melanogenesis activity in three cell lines-melanocytes, keratinocytes and HUVECS. The fibroblast cell line demonstrated various functions (predominantly wound healing) that were not related to melanogenesis activity and not used further. The melanocytic activity pathways were found to be activated (FIGS. 3A-3D). Hexapeptide-12 (Hex12) and lactoferrin (lacto) were particularly dominant in melanogenic activity. FIG. 4 and FIG. 5 demonstrate downregulation of melanogenic genes related to hexapeptide-12 (Hex12) and lactoferrin (lacto). Similarly, FIGS. 6A-6F demonstrate gene expression data for SCF, LIF, POMC, endothelin genes, PGE2, and NGF in keratinocyte cell in response to the various compounds listed in Table 6. The data demonstrates hexapeptide-11 (Hex11) as an active ingredient in melanogenesis activity, while FIG. 7 demonstrates the individual Hex-11 activity. FIGS. 8A-8C demonstrate data with HUVECs for gene expression of EDN-1 (EDN1) (FIG. 8A), SCF (FIG. 8B), and TGFB1 (FIG. 8C) in response to the various compounds listed in Table 6. FIG. 9 demonstrates the potent activity of phosphatidylserine on EDN1 and other melanogenic genes.

Conclusion

Cell line melanogenic gene activity testing identified lactoferrin, hexapeptide-11, hexapeptide-12, and phosphatidylserine as having significant effects on melanogenesis activity.

Example 4: In Vitro Melanocyte Comparative Analysis Via Absorptance Readings A melanocyte model was designed to test agents to demonstrate direct effects on the melanocyte cell and melanin production from compound-treated melanocyte samples via absorption.

Methods

Melanocytes were cultured in 6-well plates containing growth media. Once confluent, 2 concentrations of each of the 10 compounds were added to the cells in triplicate wells for 4 days. There were a total of eleven 6-well plates, one for each compound treatment and one for the vehicle control. Absorbance readings were taken on the lysates prepared for each well of the 6-well plates, normalizing for cells counts. The model was initially tested for accuracy and validated using hexapeptide-12 in view of strong gene expression results with melanocyte cell line in the first study-confirmation of decreased stimulation was obtained. Additional validation was carried out using MSH addition to media to confirm increased stimulation of melanin production. The following compounds used in this study are seen in Table 7.

TABLE 7

Test Compounds Used in In Vitro Melanocyte Comparative Analysis

| Compound | Concentration |
| --- | --- |
| Lactoferrin | 1000 ug/mL |
| Hexapeptide-12 | 4.9 ug/mL |
| Hexapeptide-11 | 200 ug/mL |
| Phosphatidylserine | 500 ug/mL |
| Silymarin 0.7% | 20 ug/mL |
| Sesamol | 100 ug/mL |
| Tranexamic acid | 1000 ug/mL |
| Phytoene, phytofluene | 5% |

Results

Table 8 demonstrates results in 3 absorption spectra with 2 concentrations of selected compounds.

TABLE 8

Absorption Spectra of Selected Compounds at 405 nm, 490 nm, and 492 nm

| Compound | Concentration | Absorbance 405 nm | Absorbance 490 nm | Absorbance 492 nm |
| --- | --- | --- | --- | --- |
| Lactoferrin | 0.0 ug/uL | 0.887 | 0.576 | 0.411 |
| Lactoferrin | 500 ug/uL | 0.509 | 0.334 | 0.217 |
| Lactoferrin | 1000 ug/uL | 0.519 | 0.312 | 0.226 |

TABLE 8-continued

Absorption Spectra of Selected Compounds at 405 nm, 490 nm, and 492 nm

| Compound | Concentration | Absorbance 405 nm | Absorbance 490 nm | Absorbance 492 nm |
|---|---|---|---|---|
| HEX-11 | 0.0 ug/mL | 0.91 | 0.576 | 0.411 |
| HEX-11 | 100 ug/mL | 0.461 | 0.288 | 0.209 |
| HEX-11 | 200 ug/mL | 0.338 | 0.227 | 0.163 |
| Phosphatidylserine | 0.0 ug/uL | 0.779 | 0.501 | 0.35 |
| Phosphatidylserine | 250 ug/uL | 0.686 | 0.438 | 0.338 |
| Phosphatidylserine | 500 ug/uL | 0.61 | 0.38 | 0.288 |
| Silymarin 0.7% | 0.0 ug/uL | 0.887 | 0.576 | 0.411 |
| Silymarin 0.7% | 10 ug/mL | 1.634 | 0.513 | 0.344 |
| Silymarin 0.7% | 20 ug/mL | 0.592 | 0.341 | 0.246 |
| Sesamol | 0.0 ug/uL | 0.779 | 0.501 | 0.35 |
| Sesamol | 50 ug/mL | 0.602 | 0.361 | 0.24 |
| Sesamol | 100 ug/mL | 0.465 | 0.252 | 0.183 |
| Tranexamic Acid | 0.0 ug/uL | 0.887 | 0.576 | 0.411 |
| Tranexamic Acid | 500 ug/uL | 0.395 | 0.254 | 0.187 |
| Tranexamic Acid | 1000 ug/uL | 0.406 | 0.243 | 0.176 |
| Phytoene/Phytofluene | 0.0 ug/uL | 0.887 | 0.576 | 0.411 |
| Phytoene/Phytofluene | 2.50% | 0.726 | 0.453 | 0.322 |
| Phytoene/Phytofluene | 5.00% | 0.428 | 0.275 | 0.2 |
| HEX-12 | 0.0 ug/mL | 1.67 | 1.12 | 0.74 |
| HEX-12 | 2.9 ug/mL | 1.32 | 0.94 | 0.64 |
| HEX-12 | 4.9 ug/mL | 0.96 | 0.64 | 0.46 |
| MSH | 0.0 ug/mL | 1.649 | 0.971 | 0.501 |
| MSH | 10 nm media | 1.921 | 1.155 | 0.573 |

This testing confirmed the efficacy of these selected agents for reducing melanogenesis (% decrease absorption denoting decreased melanin formation) in melanocytes. Regulation of melanogenesis was observed for lactoferrin, hexapeptide-11, hexapeptide-12 and phosphatidylserine. Regulation of melanogenesis was also observed for silymarin, sesamol, tranexamic acid, and phytoene/phytofluene (Table 8).

Example 5: Gene Expression Studies

A melanocyte model was designed to test agents to demonstrate direct effects on the melanocyte cell and melanin production from compound-treated melanocyte samples via absorption.

Methods

The methods similar to Examples 3-4 were used to measure expression of PMEL, tyrosinase genes, MC1/4R, EDNRB, MITF, ERK1/2, JNK, and ANKT1.

Results

Figure 11:
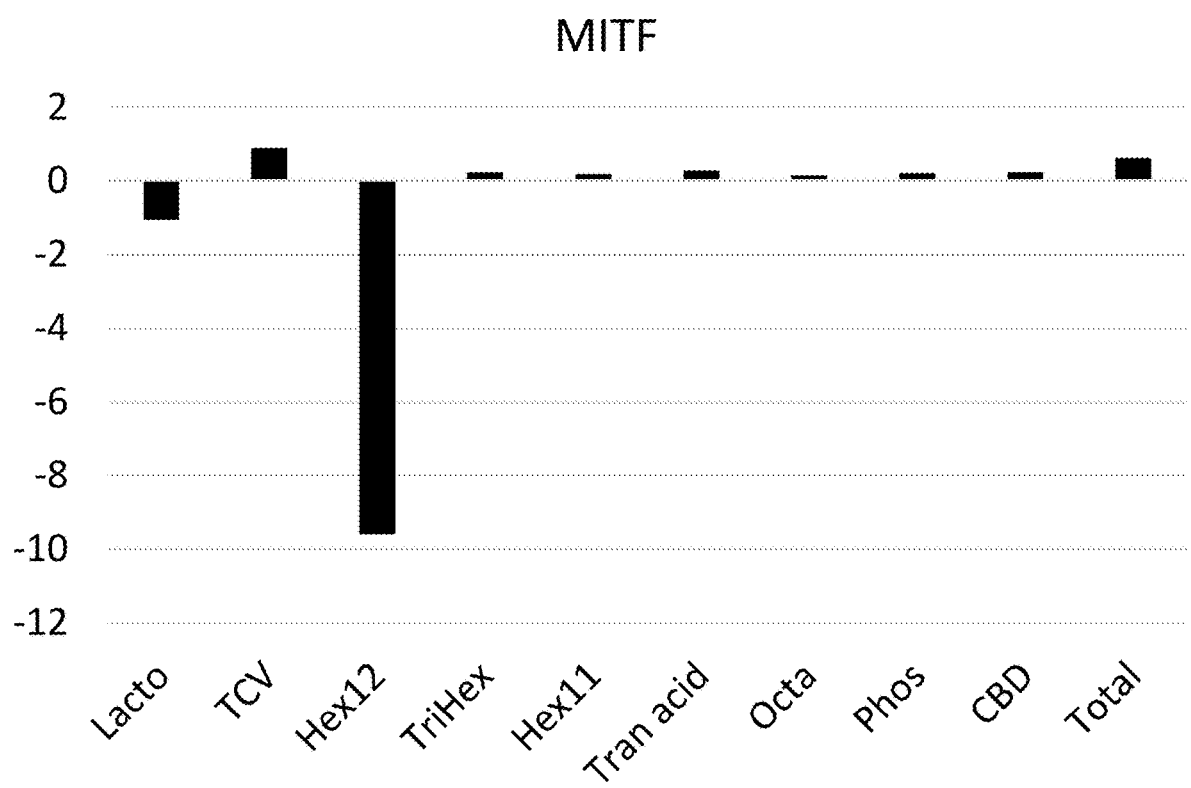
FIG. 11 illustrates the expression of expression of MITF after treatment of endothelial cells with lactoferrin (Lacto), peptide derived from lactoferrin (TCV), hexapeptide-12 (Hex12), tripeptide-1 and hexapeptide-12 (TriHex), hexapeptide-11 (Hex11), tranexamic acid (Tran acid), octapeptide (Octa), phosphatidylserine (phos), Cannabidiol (CBD), and all (total).

FIGS. 10A-10D illustrates the expression of PMEL (FIG. 10A), Tyrosinase genes (FIG. 10B), MC1/4R (FIG. 10C), and EDNRB (FIG. 10D) after treatment of endothelial cells with lactoferrin (Lacto), peptide derived from lactoferrin (TCV), hexapeptide-12 (Hex12), tripeptide-1 and hexapeptide-12 (TriHex), hexapeptide-11 (Hex11), tranexamic acid (Tran acid) octapeptide (Octa), phosphatidylserine (phos), Cannabidiol (CBD), and all (total). FIGS. 10A-10D demonstrate hexapeptide-12 and lactoferrin demonstrated robust melanogenic activity. FIG. 11 demonstrates data from hexapeptide-12.

Figure 12A:
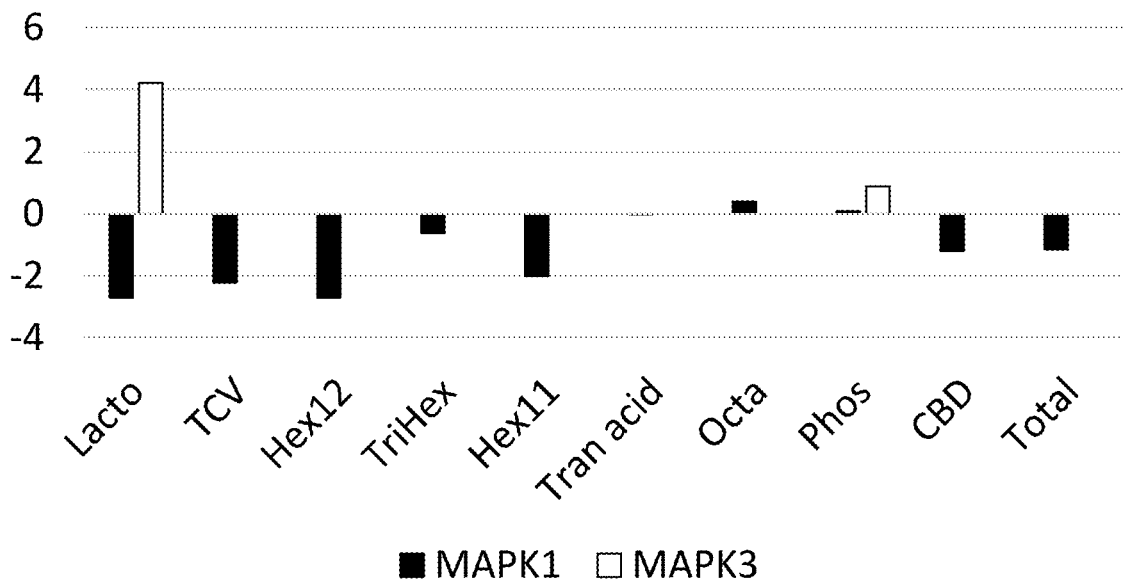
FIGS. 12A-12C illustrate the expression of ERK1/2 (MAPK3/MAPK1) (FIG. 12A), JNK (FIG. 12B), AKT1 (FIG. 12C) after treatment of endothelial cells with lactoferrin (Lacto), peptide derived from lactoferrin (TCV), hexapeptide-12 (Hex12), tripeptide-1 and hexapeptide-12 (TriHex), hexapeptide-11 (Hex11), octapeptide (Octa), phosphatidylserine (phos), Cannabidiol (CBD), and all (total).
Figure 12B:
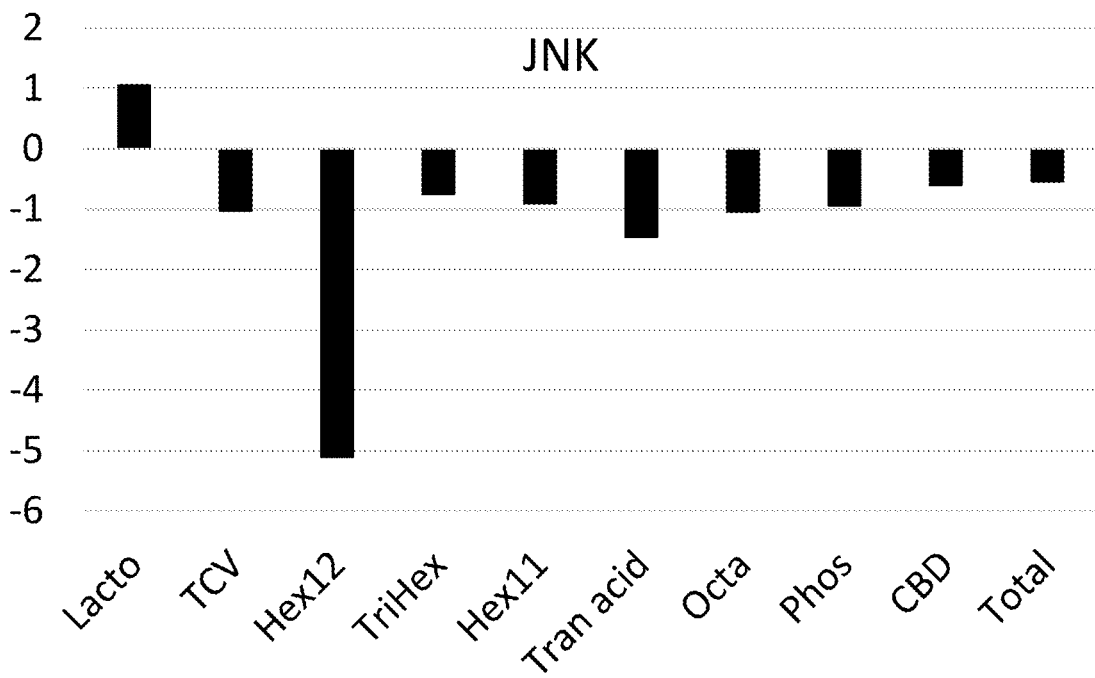
Figure 12C:
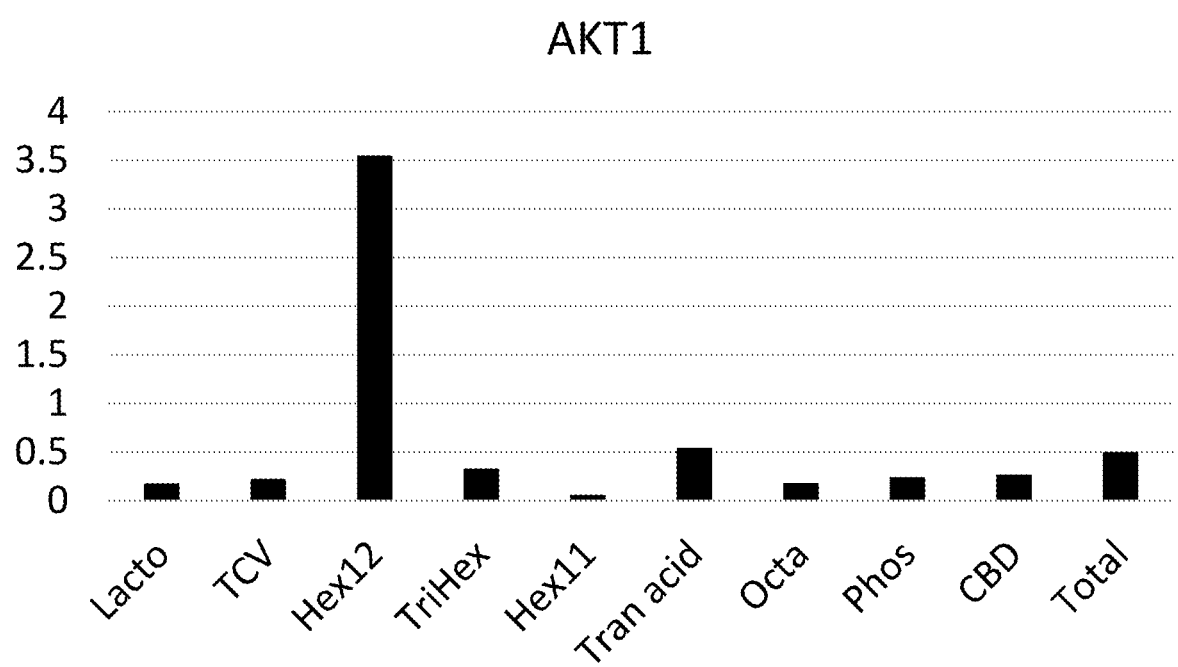

MITF is regulated by phosphorylation. Specifically, the MAPK and Akt pathways are known to phosphorylate MITF at certain sites. FIGS. 12A-12C illustrate the expression of ERK1/2 (MAPK3/MAPK1) (FIG. 12A), JNK (FIG. 12B), AKT1 (FIG. 12C) after treatment of endothelial cells with lactoferrin (Lacto), peptide derived from lactoferrin (TCV), hexapeptide-12 (Hex12), tripeptide-1 and hexapeptide-12 (TriHex), hexapeptide-11 (Hex11), octapeptide (Octa), phosphatidylserine (phos), Cannabidiol (CBD), and all (total).

Conclusion

Taken, together the increased expression of these kinases may be linked to the decreased expression of MITF and thus, may contribute to reducing melanogenesis. Hexapeptide-12 and lactoferrin have significant effects on such melanogenic activity.

Example 6: Melanocyte Assay hTERT-immortalized dermal melanocytes were treated with various compounds. The experimental materials and results are presented below.

Methods

Primary human melanocytes were sourced from ATCC (Catalog #ATCC CRL-4059). Melanocytes were initially plated in 6-well tissue culture plate ($1.5 \times 10^3$ cells per well) in melanocyte growth media (Dermal Cell Basal Medium (ATCC® PCS-200-030 supplemented with Melanocyte Growth Kit (ATCC® PCS-200-041). Melanocytes were then expanded into 10 cm tissue culture plates at concentrations recommended by ATCC. The cells appear to fully adhere to the plate/dish while culturing with a webbed morphology. Cells were cultured at 37° C. 5% $CO_2$ incubator.

Stocks of compounds 1 through 10 on the list below were suspended in either complete melanocyte growth media or DMSO (indicated in parentheses.) Each compound re-suspension was then diluted in melanocyte growth media to the final concentrations in Table 9.

TABLE 9

Compounds Used in In Vitro Melanocyte Comparative Analysis

| Compound | Concentration # 1 | Concentration # 2 |
|---|---|---|
| HEX-12 (melanocyte media) | 2.9 ug/mL | 4.9 ug/mL |
| Lactoferrin (melanocyte media) | 500 ug/mL | 1000 ug/mL |
| HEX-11 (melanocyte media) | 100 ug/mL | 200 ug/mL |
| Phosphatidylserine (DMSO) | 250 ug/mL | 500 ug/mL |
| Silymarin 0.7% (melanocyte media) | 10 ug/mL | 20 ug/mL |
| Sesamol (DMSO) | 50 ug/mL | 100 ug/mL |
| Tranexamic Acid (melanocyte media) | 500 ug/mL | 1000 ug/mL |
| Phytoene/Phytofluene (melanocyte media) | 2.50% | 5.00% |
| Oleuropein (melanocyte media) | 500 ug/mL | 1000 ug/mL |
| Withania Somnifera (melanocyte media) | 10 ug/mL | 20 ug/mL |

Once the melanocytes were 100% confluent in 6-well plates, the melanocyte growth media was removed and the melanocytes were treated with media containing the above compounds; duplicate wells for each compound/concentration listed above. The duplicate vehicle control wells were fed melanocyte growth media only or melanocyte growth media with DMSO (10 uL per 10 mL melanocyte growth media).

The cells were fed the appropriate media for the next 5 days. Each day, the cells were inspected for morphology. All cells maintained normal morphology for the full five-day dosing period except as noted below:

The melanocytes cultured in the lactoferrin containing media (both 500 and 1000 ug/mL concentrations) developed a circular morphology rather the normal webbed morphology 24 hour post-initial dosing. Interestingly, at 48 hours post-initial dosing, the melanocytes returned to normal morphology and maintained normal morphology through the 5 day dosing period.

The melanocytes cultured in the *Withania Somnifera* containing media (both the 10 and 20 ug/mL concentrations) started dying 24 hours post-initial dosing and continued to die-off until all melanocytes were dead 48 hours post-initial dosing.

The melanocytes in the oleuropein containing media (both the 500 and 1000 ug/mL concentrations) started dying 24 hours post-initial dosing and continued to die-off daily until nearly all melanocytes were dead 72 hours post-initial dosing.

Lysates were prepared for each sample. Briefly, 6.6×10^5 cells from each sample was spun down and collected in a vial. 150 uL of CHAPS lysis buffer was added to each duplicate sample, vortexed and placed in a dry-ice/ethanol bath for 2 minutes, then left at room temp until completed thawed. This freeze thaw was done one more time, for a total of two freeze/thaw cycles. The lysate samples were spun for 15 minutes at 14,800 rpm. The supernatant was removed, leaving a black pellet in the vial. The pellet was re-suspended in 100 uL of a 1 M NaOH/10% DMSO solution and incubated at 80° C. for 90 minutes, pipet mixing at 30 minutes, 60 minutes and at 90 minutes.

Results 100 uL of each duplicate sample at each concentration was added to individual wells of a flat bottom 96 well plate and absorbance readings were taken at 405 nm, 490 nm and 492 nm on the Envision 2103 Multilabel Reader.

TABLE 10

Absorbance readings at 405 nm, 490 nm, and 492 nm

| Compound | Concentration | Absorbance (405 nm) | Absorbance (490 nm) | Absorbance (492 nm) |
|---|---|---|---|---|
| Lactoferrin | 0.0 ug/uL | 0.887 | 0.576 | 0.411 |
| Lactoferrin | 500 ug/uL | 0.509 | 0.334 | 0.217 |
| Lactoferrin | 1000 ug/uL | 0.519 | 0.312 | 0.226 |
| HEX-11 | 0.0 ug/uL | 0.91 | 0.576 | 0.411 |
| HEX-11 | 100 ug/mL | 0.461 | 0.288 | 0.209 |
| HEX-11 | 200 ug/mL | 0.338 | 0.227 | 0.163 |
| Phosphatidylserine | 0.0 ug/uL | 0.779 | 0.501 | 0.35 |
| Phosphatidylserine | 250 ug/uL | 0.686 | 0.438 | 0.338 |
| Phosphatidylserine | 500 ug/uL | 0.61 | 0.38 | 0.288 |
| Silymarin 0.7% | 0.0 ug/uL | 0.887 | 0.576 | 0.411 |
| Silymarin 0.7% | 10 ug/uL | 1.634 | 0.513 | 0.344 |
| Silymarin 0.7% | 20 ug/mL | 0.592 | 0.341 | 0.246 |
| Sesamol | 0.0 ug/uL | 0.779 | 0.501 | 0.35 |
| Sesamol | 50 ug/mL | 0.602 | 0.361 | 0.24 |
| Sesamol | 100 ug/mL | 0.465 | 0.252 | 0.183 |
| Tranexamic Acid | 0.0 ug/uL | 0.887 | 0.576 | 0.411 |
| Tranexamic Acid | 500 ug/uL | 0.395 | 0.254 | 0.187 |
| Tranexamic Acid | 1000 ug/uL | 0.406 | 0.243 | 0.176 |
| Phytoene/Phytofluene | 0.0 ug/uL | 0.887 | 0.576 | 0.411 |
| Phytoene/Phytofluene | 2.50% | 0.726 | 0.453 | 0.322 |
| Phytoene/Phytofluene | 5.00% | 0.428 | 0.275 | 0.2 |

Example 7: Full Formulation Melanocyte Assay

Compounds and concentrations were combined from the original stock solutions of Example 6 to create full formulation media for melanocytes culture.

Methods

The compounds and concentrations of Table 11 below were combined from the original stock solutions to create a 50 mL full formulation media which melanocytes were cultured in for 5 days in 6-well plates. The media used is shown in parentheses.

TABLE 11

Compounds and Concentrations Used in Example 7

| Compound | Concentration |
|---|---|
| HEX-12 (melanocyte media) | 4.9 ug/mL |
| Lactoferrin (melanocyte media) | 1000 ug/mL |
| HEX-11 (melanocyte media) | 200 ug/mL |
| Phosphatidylserine (DMSO) | 500 ug/mL |
| Silymarin 0.7% (melanocyte media) | 20 ug/mL |
| Sesamol (DMSO) | 100 ug/mL |
| Tranexamic Acid (melanocyte media) | 1000 ug/mL |
| Phytoene/Phytofluene (melanocyte media) | 5.00% |

Once the melanocytes were 100% confluent in 6-well plates, the melanocyte growth media was removed and the melanocytes were treated with media containing the above full formulation media in duplicate wells. Duplicate vehicle control wells were fed melanocyte growth media with DMSO (20 uL per 10 mL melanocyte growth media). The cells were fed the appropriate media for the next 5 days.

Each day, the cells were inspected for morphology. All cells maintained normal morphology for the full five-day dosing period.

Lysates were prepared as in Example 6 for each duplicate well sample containing melanocytes grown in the full formulation media and the duplicate wells containing melanocytes grown in vehicle control media.

Results 100 uL of each duplicate sample was added to a flat bottom 96 well plate and absorbance readings are taken at 405 nm, 490 nm and 492 nm on the Envision 2103 Multi-label Reader. Readings are shown in Table 12.

TABLE 12

Absorbance Readings at 405 nm, 490 nm, and 492 nm

| Formulation | Absorbance 405nm | Absorbance 490nm | Absorbance 492nm |
|---|---|---|---|
| Full Formulation Media | 0.887 | 0.576 | 0.411 |
| Vehicle Control Media | 0.509 | 0.334 | 0.217 |

Example 8: Dual Liposome

This example demonstrates preparation of the dual liposome for use in the formulations described herein.

In a first step, 0.90% by weight (wt. %) of Pro-Lipo-NEO, 0.02 wt. % of hexapeptide-11, 0.005 wt. % of hexapeptide-12, and 0.10 wt. % of lactoferrin were combined to form a liposome solution. To the liposome solution, 0.50 wt. % of Photosome Liposome was added to generate a dual liposome.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

SEQUENCE LISTING

```
Sequence total quantity: 26
SEQ ID NO: 1              moltype = AA  length = 689
FEATURE                   Location/Qualifiers
REGION                    1..689
                          note = Description of Artificial Sequence: Synthetic
                          polypeptide
source                    1..689
                          mol_type = protein
                          organism = synthetic construct
SEQUENCE: 1
APRKNVRWCT ISQPEWFKCR RWQWRMKKLG APSITCVRRA FALECIRAIA EKKADAVTLD   60
GGMVFEACRD PYKLRPVAAE IYGTKESPQT HYYAVAVVKK GSNFQLDQLQ GRKSCHTGLG  120
RSAGWIIPMG ILRPYLSWTE SLEPLQGAVA KFFSASCVPC IDRQAYPNLC QLCKGEGENQ  180
CACSSREPYF GYSGAFKCLQ DGAGDVAFVK ETTVFENLPE KADRDQYELL CLNNSRAPVD  240
AFKECHLAQV PSHAVVARSV DGKEDLIWKL LSKAQEKFGK NKSRSFQLFG SPPGQRDLLF  300
KDSALGFLRI PSKVDSALYL GSRYLTTLKN LRETAEEVKA RYTRVVWCAV GPEEQKKCQQ  360
WSQQSGQNVT CATASTTDDC IVLVLKGEAD ALNLDGGYIY TAGKCGLVPV LAENRKSSKH  420
SSLDCVLRPT EGYLAVAVVK KANEGLTWNS LKDKKSCHTA VDRTAGWNIP MGLIVNQTGS  480
CAFDEFFSQS CAPGADPKSR LCALCAGDDQ GLDKCVPNSK EKYYGYTGAF RCLAEDVGDV  540
AFVKNDTVWE NTNGESTADW AKNLNREDFR LLCLDGTRKP VTEAQSCHLA VAPNHAVVSR  600
SDRAAHVKQV LLHQQALFGK NGKNCPDKFC LFKSETKNLL FNDNTECLAK LGGRPTYEEY  660
LGTEYVTAIA NLKKCSTSPL LEACAFLTR                                   689

SEQ ID NO: 2              moltype = AA  length = 9
FEATURE                   Location/Qualifiers
REGION                    1..9
                          note = Description of Artificial Sequence: Synthetic peptide
source                    1..9
                          mol_type = protein
                          organism = synthetic construct
SEQUENCE: 2
PRKNVRWCT                                                           9

SEQ ID NO: 3              moltype = AA  length = 7
FEATURE                   Location/Qualifiers
REGION                    1..7
                          note = Description of Artificial Sequence: Synthetic peptide
source                    1..7
                          mol_type = protein
                          organism = synthetic construct
SEQUENCE: 3
LGFLRIP                                                             7

SEQ ID NO: 4              moltype = AA  length = 8
FEATURE                   Location/Qualifiers
REGION                    1..8
                          note = Description of Artificial Sequence: Synthetic peptide
```

```
                        source              1..8
                                            mol_type = protein
                                            organism = synthetic construct
SEQUENCE: 4
GYSGAFKC                                                                                       8

SEQ ID NO: 5            moltype = AA  length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 5
TCVRR                                                                                          5

SEQ ID NO: 6            moltype = AA  length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 6
TCVRRAF                                                                                        7

SEQ ID NO: 7            moltype = AA  length = 11
FEATURE                 Location/Qualifiers
REGION                  1..11
                        note = Description of Artificial Sequence: Synthetic peptide
source                  1..11
                        mol_type = protein
                        organism = synthetic construct
SEQUENCE: 7
WNSLKDKKSC H                                                                                  11

SEQ ID NO: 8            moltype = AA  length = 13
FEATURE                 Location/Qualifiers
REGION                  1..13
                        note = Description of Artificial Sequence: Synthetic peptide
source                  1..13
                        mol_type = protein
                        organism = synthetic construct
SEQUENCE: 8
LFNDNTECLA KLG                                                                                13

SEQ ID NO: 9            moltype = AA  length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 9
TTLKNLR                                                                                        7

SEQ ID NO: 10           moltype = AA  length = 12
FEATURE                 Location/Qualifiers
REGION                  1..12
                        note = Description of Artificial Sequence: Synthetic peptide
source                  1..12
                        mol_type = protein
                        organism = synthetic construct
SEQUENCE: 10
QGLDKCVPNS KE                                                                                 12

SEQ ID NO: 11           moltype = AA  length = 6
FEATURE                 Location/Qualifiers
REGION                  1..6
                        note = Description of Artificial Sequence: Synthetic peptide
source                  1..6
                        mol_type = protein
                        organism = synthetic construct
SEQUENCE: 11
VKKANE                                                                                         6

SEQ ID NO: 12           moltype = AA  length = 8
FEATURE                 Location/Qualifiers
REGION                  1..8
```

```
                        note = Description of Artificial Sequence: Synthetic peptide
source                  1..8
                        mol_type = protein
                        organism = synthetic construct
SEQUENCE: 12
LAKLGGRP                                                                            8

SEQ ID NO: 13           moltype = AA   length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 13
GDVAFVK                                                                             7

SEQ ID NO: 14           moltype = AA   length = 9
FEATURE                 Location/Qualifiers
REGION                  1..9
                        note = Description of Artificial Sequence: Synthetic peptide
source                  1..9
                        mol_type = protein
                        organism = synthetic construct
SEQUENCE: 14
NLNREDFRL                                                                           9

SEQ ID NO: 15           moltype = AA   length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 15
ALGFLRI                                                                             7

SEQ ID NO: 16           moltype = AA   length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 16
TTLKNLR                                                                             7

SEQ ID NO: 17           moltype = AA   length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 17
DALNLDG                                                                             7

SEQ ID NO: 18           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 18
LAEDV                                                                               5

SEQ ID NO: 19           moltype = AA   length = 7
FEATURE                 Location/Qualifiers
REGION                  1..7
                        note = Description of Artificial Sequence: Synthetic peptide
source                  1..7
                        mol_type = protein
                        organism = synthetic construct
SEQUENCE: 19
RAFALEC                                                                             7

SEQ ID NO: 20           moltype = AA   length = 8
FEATURE                 Location/Qualifiers
```

```
REGION                  1..8
                        note = Description of Artificial Sequence: Synthetic peptide
source                  1..8
                        mol_type = protein
                        organism = synthetic construct
SEQUENCE: 20
GAVAKFFS                                                                          8

SEQ ID NO: 21           moltype = AA  length = 6
FEATURE                 Location/Qualifiers
REGION                  1..6
                        note = Description of Artificial Sequence: Synthetic peptide
source                  1..6
                        mol_type = protein
                        organism = synthetic construct
SEQUENCE: 21
NLRETA                                                                            6

SEQ ID NO: 22           moltype = AA  length = 6
FEATURE                 Location/Qualifiers
REGION                  1..6
                        note = Description of Artificial Sequence: Synthetic peptide
source                  1..6
                        mol_type = protein
                        organism = synthetic construct
SEQUENCE: 22
EEQKKC                                                                            6

SEQ ID NO: 23           moltype = AA  length = 9
FEATURE                 Location/Qualifiers
REGION                  1..9
                        note = Description of Artificial Sequence: Synthetic peptide
source                  1..9
                        mol_type = protein
                        organism = synthetic construct
SEQUENCE: 23
CVPNSKEKY                                                                         9

SEQ ID NO: 24           moltype = AA  length = 6
FEATURE                 Location/Qualifiers
REGION                  1..6
                        note = Description of Artificial Sequence: Synthetic peptide
source                  1..6
                        mol_type = protein
                        organism = synthetic construct
SEQUENCE: 24
QAYPNL                                                                            6

SEQ ID NO: 25           moltype = AA  length = 6
FEATURE                 Location/Qualifiers
REGION                  1..6
                        note = Description of Artificial Sequence: Synthetic peptide
REGION                  1..6
                        note = N-term palmitoyl
source                  1..6
                        mol_type = protein
                        organism = synthetic construct
SEQUENCE: 25
VGVAPG                                                                            6

SEQ ID NO: 26           moltype = AA  length = 6
FEATURE                 Location/Qualifiers
REGION                  1..6
                        note = Description of Artificial Sequence: Synthetic peptide
REGION                  1..6
                        note = N-term myristoyl
source                  1..6
                        mol_type = protein
                        organism = synthetic construct
SEQUENCE: 26
VGVAPG                                                                            6
```

The invention claimed is:

1. A method of improving pigmentation resulting from a pigmentation disorder or disease, the method comprising administering to the skin of a subject in need thereof a topical composition for modulating melanogenesis in skin melanocytes and keratinocytes, and endothelial cells to improve skin pigmentation, wherein the topical composition comprises:
   a first liposome comprising photolyase;
   a second liposome;
   0.004 wt. % to about 0.100 wt. % of hexapeptide-11, wherein the hexapeptide-11 downregulates SCF, LIF, POMC, EDN1, PGE2, or NGF gene expression in human keratinocytes; and
   0.001 wt. % to about 0.025 wt. % of a hexapeptide-12, wherein the hexapeptide-12 downregulates MAPK1, MITF, JNK, EDNRB, DCT, TYR, TYRP1, or PMEL gene expression in endothelial cells, or downregulates MAPK1, MAPK3, MAP2K1, MAP2K2, POMC, or CTNNB1 gene expression in melanocytes.

2. The method of claim 1, wherein the pigmentation disorder or disease is at least one selected from:
   hyperpigmentation;
   post-inflammatory hyperpigmentation (PIH);
   focal hypopigmentation or diffuse hypopigmentation;
   Acanthosis Nigricans;
   age spots;
   albinism;
   Incontinentia Pigmenti;
   Lentigines;
   melasma;
   Pityriasis Albam; and
   Progressive Pigmentary Purpura.

3. The method of claim 1, wherein the topical composition further comprises up to 0.25 wt. % of lactoferrin.

4. The method of claim 1, wherein the topical composition further comprises up to 0.075 wt. % of phosphatidylserine.

5. The method of claim 3, wherein the second liposome encapsulates the hexapeptide-11, the hexapeptide-12, the lactoferrin, and the first liposome.

6. The method of claim 1, wherein the topical composition improves pigmentation by reducing or inhibiting melanocyte activation or synthesis.

7. The method of claim 1, wherein the first liposome is present in a range of about 0.1 wt. % to about 2 wt. %.

8. The method of claim 1, wherein the topical composition further comprises one or more peptides selected from the group consisting of SEQ ID NOS: 2-24.

9. The method of claim 1, wherein the topical composition further comprises a peptide selected from SEQ ID NO: 5 or SEQ ID NO: 6.

10. The method of claim 1, wherein the topical composition further comprises silymarin, present in a range of about 0.1 wt. % to about 1.0 wt. %.

11. The method of claim 1, wherein the topical composition further comprises sesamol, present in a range of about 0.002 wt. % to about 0.050 wt. %.

12. The method of claim 1, wherein the topical composition further comprises tranexamic acid, present in a range of about 1 wt. % to about 10 wt. %.

13. The method of claim 1, wherein the topical composition further comprises phytoene, phytofluene, or a combination thereof, present in a range of about 1 wt. % to about 10 wt. %.

14. The method of claim 1, wherein the second liposome comprises lecithin, propanediol, or a combination thereof.

15. The method of claim 1, wherein the pigmentation disorder is hyperpigmentation.

* * * * *